(12) United States Patent
Kitagawa et al.

(10) Patent No.: US 7,557,899 B2
(45) Date of Patent: Jul. 7, 2009

(54) LIQUID CRYSTAL DISPLAY DEVICE AND METHOD OF FABRICATING THE SAME

(75) Inventors: Yoshiro Kitagawa, Kanagawa (JP); Satoshi Kimura, Akita (JP); Tsuyoshi Satoh, Akita (JP); Hidenori Kusanagi, Akita (JP); Juko Funaki, Akita (JP); Sounosuke Takahashi, Kanagawa (JP); Takayuki Konno, Kanagawa (JP); Shinichi Nishida, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 0 days.

(21) Appl. No.: 12/024,643

(22) Filed: Feb. 1, 2008

(65) Prior Publication Data

US 2008/0212013 A1    Sep. 4, 2008

Related U.S. Application Data

(62) Division of application No. 11/519,865, filed on Sep. 13, 2006, now Pat. No. 7,355,670, which is a division of application No. 10/802,843, filed on Mar. 18, 2004, now Pat. No. 7,142,274.

(30) Foreign Application Priority Data

Mar. 19, 2003  (JP)  ............................. 2003-076169
Mar. 12, 2004  (JP)  ............................. 2004-070110

(51) Int. Cl.
G02F 1/1368 (2006.01)
G02F 1/1343 (2006.01)

(52) U.S. Cl. .................... 349/187; 349/43; 349/138; 349/141

(58) Field of Classification Search .................. 349/42, 349/43, 122, 138, 141, 145, 146, 187; 345/92; 438/30; 257/59, 72
See application file for complete search history.

(56) References Cited

U.S. PATENT DOCUMENTS 6,208,399 B1   3/2001   Ohta et al.
6,710,836 B2   3/2004   Lee (Continued)

FOREIGN PATENT DOCUMENTS

JP       10-186407 A       7/1998

(Continued)

*Primary Examiner*—Dung Nguyen
*Assistant Examiner*—Tai Duong
(74) *Attorney, Agent, or Firm*—Sughrue Mion, PLLC

(57) ABSTRACT

A liquid crystal display device includes a first substrate including a thin film transistor, a data line, a pixel electrode, and a common electrode, a second substrate, and liquid crystal sandwiched between the first and second substrates, wherein an image signal is applied to the thin film transistor through the data line to generate an electric field between the pixel electrode receiving the image signal and the common electrode such that the liquid crystal is rotated by the electric field in a plane which is in parallel with the first substrate. The first substrate includes an electrically insulating inorganic film covering the data line therewith, a first island-shaped electrically insulating organic film formed on the electrically insulating inorganic film above the data line, and a shield common electrode covering the first island-shaped electrically insulating organic film therewith and overlapping the data line when viewed vertically.

7 Claims, 36 Drawing Sheets

U.S. PATENT DOCUMENTS

| | | |
|---|---|---|
| 6,950,166 B2 | 9/2005 | Kadotani |
| 2002/0159016 A1* | 10/2002 | Nishida et al. .............. 349/141 |
| 2004/0070718 A1 | 4/2004 | Saigo et al. |
| 2005/0024567 A1 | 2/2005 | Sawasaki et al. |
| 2005/0275784 A1 | 12/2005 | Ashizawa et al. |

FOREIGN PATENT DOCUMENTS

| | | |
|---|---|---|
| JP | 11-119237 A | 4/1999 |
| JP | 2000-89240 A | 3/2000 |
| JP | 2002-258321 A | 9/2002 |
| JP | 2002-277889 A | 9/2002 |
| JP | 2002-287163 A | 10/2002 |
| JP | 2002-323706 A | 11/2002 |
| JP | 2003-66482 A | 3/2003 |

* cited by examiner

INITIAL ORIENTATION OF LIQUID CRYSTAL (RUBBING) R

US 7,557,899 B2

LIQUID CRYSTAL DISPLAY DEVICE AND METHOD OF FABRICATING THE SAME

This is a Divisional of U.S. application Ser. No. 11/519,865, filed Sep. 13, 2006, now U.S. Pat. No. 7,355,670, which is a Divisional of U.S. application Ser. No. 10/802,843, filed Mar. 18, 2004, now U.S. Pat. No. 7,142,274, which claims priority from prior Japanese Application Nos. JP 2003-076169 and 2004-070110. The complete disclosures of the prior applications are incorporated into this application by reference.

BACKGROUND OF THE INVENTION

1. Field of the Invention

The invention relates to a liquid crystal display device and a method of fabricating the same, and more particularly to an in-plane switching active matrix type liquid crystal display device and a method of fabricating the same.

2. Description of the Related Art

For instance, Japanese Patent Application Publications Nos. 11-119237 and 10-186407 suggest in-plane switching active matrix type liquid crystal display devices in which a common electrode is designed to overlap a data line to shield an electric field generated at the data line in order to prevent the electric field from reaching a pixel for achieving a high numeral aperture and high accuracy.

However, the in-plane switching active matrix type liquid crystal display devices are accompanied with a problem of an increase in parasitic capacity between a common electrode and a data line. In order to reduce such parasitic capacity, there is suggested a colorless transparent film having a low dielectric constant, as an interlayer insulating film to be formed between a common electrode and a data line. For instance, such a colorless transparent film is comprised of a silicon nitride (SiNx) film as an inorganic film or an acrylic film as an organic film.

However, since a silicon nitride film is formed slowly by chemical vapor deposition (CVD), it would take much time to form a silicon nitride film having a thickness of 1 micrometer or greater. In addition, it is necessary to prepare a photolithography line including an expensive coating unit in order to form an acrylic organic film.

FIGS. 1 and 2 illustrate a conventional in-plane switching active matrix type liquid crystal display device. FIG. 1 is a plan view of a TFT substrate 100 on which a thin film transistor (TFT) is fabricated, viewed from liquid crystal, and FIG. 2 is a cross-sectional view taken along the line II-II in FIG. 1.

As illustrated in FIG. 2, the liquid crystal display device is comprised of a TFT substrate 100, a substrate 200 opposed to the TFT substrate 100, and a layer of liquid crystal 220 sandwiched between the TFT substrate 100 and the substrate 200.

The TFT substrate 100 is comprised of a first transparent substrate 101 composed of glass, a comb-shaped common electrode 127 formed on an upper surface of the first transparent substrate 101 (hereinafter, a surface of a substrate closer to the liquid crystal 220 is called an "upper" surface, and a surface of a substrate remoter from the liquid crystal 220 is called a "lower" surface), a gate line 105 (see FIG. 1) formed on an upper surface of the first transparent substrate 101, a first interlayer insulating inorganic film 106 formed on an upper surface of the first transparent substrate 101, covering the common electrode 127 therewith, a data line 112 formed on the first interlayer insulating inorganic film 106, a comb-shaped pixel electrode formed on the first interlayer insulating inorganic film 106, a second interlayer insulating inorganic film (passivation film) 115 formed on the first interlayer insulating inorganic film 106, covering the data line 112 and the pixel electrode 113 therewith, an alignment film 120 formed on the second interlayer insulating inorganic film 115, a polarizer 130 formed on a lower surface of the first transparent substrate 101, and a thin film transistor (not illustrated in FIG. 2).

The thin film transistor is comprised of an island 109 formed in the same layer as the common electrode 127, a drain electrode 110 and a source electrode 111 both formed in the same layer as the data line 112, and the above-mentioned gate line 105.

The substrate 200 is comprised of a second transparent substrate 201 composed of glass, a black matrix layer 202 formed partially on an upper surface of the second transparent substrate 201, a color layer 203 formed partially on both an upper surface of the second transparent substrate 201 and the black matrix layer 202, a planarized layer 204 covering the black matrix layer 202 the color layer 203 therewith, an alignment film 120 formed on the planarized layer 204, an electrically conductive layer 205 formed on a lower surface of the second transparent substrate 201, and a polarizer 210 formed on the electrically conductive layer 205.

Spacers (not illustrated) are sandwiched between the TFT substrate 100 and the substrate 200 to provide a layer of the liquid crystal 220 with a constant thickness.

Seal (not illustrated) is sandwiched between the TFT substrate 100 and the substrate 200 at their marginal areas in order to prevent leakage of the liquid crystal 220.

In the liquid crystal display device illustrated in FIGS. 1 and 2, the common electrode 127 located beside the data line 112 was necessary to have a large area in order to prevent electric lines of force derived from the data line 112 from entering the pixel electrode 113. As a result, the liquid crystal display device illustrated in FIGS. 1 and 2 is accompanied with a problem that it is not possible to increase a numerical aperture.

In order to increase a numerical aperture, the common electrode 127 may be formed in a layer closer to the liquid crystal 220 than the data line 112 for shielding the data line 112 with the common electrode 127, in which case, an interlayer insulating organic film is formed between the data line 112 and the common electrode 127 for reducing a coupling capacity of the data line 112 and the common electrode 127.

An interlayer insulating organic film is formed generally by steps of coating photoresist, that is, liquid of organic resin fluidized by solvent and having photosensitivity, onto a film in a predetermined thickness by slit-coating or spin-coating by means of a coating unit, applying photolithography (exposure of the photoresist to light, development of the photoresist, and baking the photoresist) to the photoresist, and carrying out etching to the film with the photoresist being used as a mask.

An interlayer insulating organic film is composed usually of acrylic resin.

Acrylic resin has an advantage that a pixel in a liquid crystal display device may be composed of acrylic resin, because it is transparent, however, has disadvantages as follows.

First, it is impossible to use a coating unit through which novolak photoresist is coated onto a film, in a photolithography step, for coating acrylic resin together with novolak resin onto an object. Hence, it is necessary to prepare a coating unit used only for coating acrylic resin onto an object.

Second, since developing solutions used for acrylic photoresist and novolak photoresist are different from each other, it is not possible to develop acrylic photoresist together with novolak photoresist in a photolithography step by means of a developing unit used for developing novolak photoresist. Hence, it is necessary to prepare a developing unit used only for developing acrylic photoresist.

Third, it is not possible to store acrylic photoresist at room temperature. Hence, it is necessary to keep acrylic photoresist cool.

Fourth, acrylic photoresist tends to increase its viscosity with the lapse of time at room temperature.

Fifth, since acrylic photoresist is readily caked, it would be unavoidable to frequently carry out maintenance to a coating unit.

Sixth, acrylic photoresist is more expensive than novolak photoresist.

In contrast, novolak resin has only one disadvantage that since it is colored, it is impossible to compose a pixel in a liquid crystal display device of novolak resin.

SUMMARY OF THE INVENTION

In view of the above-mentioned problems in the prior art, it is an object of the present invention to provide an in-plane switching active matrix type liquid crystal display device and a method of fabricating the same both of which are capable of preventing electric lines of force derived from a data line from entering a pixel electrode, and presenting an increased numerical aperture.

A further object of the present invention is to provide an in-plane switching active matrix type liquid crystal display device and a method of fabricating the same both of which are capable of avoiding a disadvantage of a novolak organic film that it has a color, in order to make it possible to use a novolak organic film which is generally used in a photolithography step as an interlayer insulating organic film.

In one aspect of the present invention, there is provided a liquid crystal display device, including (a) a first substrate including a thin film transistor, a data line, a pixel electrode, and a common electrode, (b) a second substrate, and (c) liquid crystal sandwiched between the first and second substrates, wherein an image signal is applied to the thin film transistor through the data line to generate an electric field between the pixel electrode receiving the image signal and the common electrode such that the liquid crystal is rotated by the electric field in a plane which is in parallel with the first substrate, and the first substrate includes an electrically insulating inorganic film covering the data line therewith, a first island-shaped electrically insulating organic film formed on the electrically insulating inorganic film above the data line, and a shield common electrode covering the first island-shaped electrically insulating organic film therewith and overlapping the data line when viewed vertically.

The first substrate may further include a gate line through which one of thin film transistors is selected, a gate line terminal electrode to which the gate line is electrically connected in a marginal area of the first substrate, a data line terminal electrode to which the data line is electrically connected in the marginal area, a second island-shaped electrically insulating organic film formed above the gate line terminal electrode, the second island-shaped electrically insulating organic film being formed concurrently with the first island-shaped electrically insulating organic film, a third island-shaped electrically insulating organic film formed above the data line terminal electrode, the third island-shaped electrically insulating organic film being formed concurrently with the first island-shaped electrically insulating organic film, a gate terminal extension electrode formed concurrently with the common electrode above the second island-shaped electrically insulating organic film, the gate line terminal electrode being electrically connected to the gate terminal extension electrode, and a data terminal extension electrode formed concurrently with the common electrode above the third island-shaped electrically insulating organic film, the data line terminal electrode being electrically connected to the data terminal extension electrode.

The first substrate may further include a gate line terminal underlying electrode formed below the second island-shaped electrically insulating organic film, and making direct contact with the gate line terminal electrode, and a data line terminal underlying electrode formed below the third island-shaped electrically insulating organic film, and making direct contact with the data line terminal electrode, and wherein the second island-shaped electrically insulating organic film is sandwiched between the gate line extension electrode and the gate line terminal underlying electrode, and the third island-shaped electrically insulating organic film is sandwiched between the data line extension electrode and the data line terminal underlying electrode.

The first substrate may further include a gate line through which one of thin film transistors is selected, a gate line terminal electrode to which the gate line is electrically connected in a marginal area of the first substrate, a data line terminal electrode to which the data line is electrically connected in the marginal area, a gate terminal extension electrode formed concurrently with the common electrode above the electrically insulating inorganic film, the gate line terminal electrode being electrically connected to the gate terminal extension electrode, and a data terminal extension electrode formed concurrently with the common electrode above the electrically insulating inorganic film, the data line terminal electrode being electrically connected to the data terminal extension electrode.

The first substrate may further include a first electrically conductive transparent layer formed between the gate line terminal electrode and the gate terminal extension electrode both of which are electrically connected to each other, and a second electrically conductive transparent layer formed between the data line terminal electrode and the data terminal extension electrode both of which are electrically connected to each other.

As an alternative, the first substrate may further include a first electrically conductive opaque layer formed between the gate line terminal electrode and the gate terminal extension electrode both of which are electrically connected to each other, and a second electrically conductive opaque layer formed between the data line terminal electrode and the data terminal extension electrode both of which are electrically connected to each other.

The first substrate may further include a first multi-layer comprised of an electrically conductive transparent layer and an electrically conductive opaque layer, and formed between the gate line terminal electrode and the gate terminal extension electrode both of which are electrically connected to each other, and a second multi-layer comprised of an electrically conductive transparent layer and an electrically conductive opaque layer, and formed between the data line terminal electrode and the data terminal extension electrode both of which are electrically connected to each other.

It is preferable that the shield common electrode is comprised of an electrically conductive transparent film.

It is preferable that the shield common electrode has a multi-layered structure comprised of an electrically conductive transparent layer and an electrically conductive opaque layer It is preferable that the pixel electrode extends in parallel with the common electrode, and the pixel and common electrodes are formed in a common layer.

It is preferable that the pixel electrode extends in parallel with the common electrode, and the pixel and common electrodes are formed in separate layers.

It is preferable that the pixel electrode extends in parallel with the common electrode, each of the pixel and common electrodes is comprised of a zigzag-shaped electrode, and each of the data line and the first island-shaped electrically insulating organic film is comprised of a zigzag-shaped electrode extending in parallel with the zigzag-shaped electrode of which each of the pixel and common electrodes is comprised.

It is preferable that the pixel electrode extends in parallel with the common electrode, each of the pixel and common electrodes is comprised of a zigzag-shaped electrode, and each of the data line and the first island-shaped electrically insulating organic film is comprised of first portions extending in almost parallel with the pixel and common electrodes and second portions extending in almost parallel with a rubbing direction.

It is preferable that the first island-shaped electrically insulating organic film is formed further on an electrically insulating inorganic film formed on the gate line, and is covered with the shield common electrode.

It is preferable that the first island-shaped electrically insulating organic film is formed further on an electrically insulating inorganic film formed on the thin film transistor, and is covered with the shield common electrode.

It is preferable that the first island-shaped electrically insulating organic film is formed further on an electrically insulating inorganic film formed on the data line in an area other than an area around the gate line, and is covered with the shield common electrode.

It is preferable that the shield common electrodes in pixels vertically adjacent to each other and controlled through separate scanning lines are electrically connected to each other through an electrically conductive layer of which the shield common electrodes are comprised and which does not overlap the data line.

It is preferable that the electrically conductive layer through which the shield common electrodes in pixels vertically adjacent to each other are electrically connected to each other overlaps the gate line by 60% or more in each of pixels which gate line is not shielded by any other electrically conductive layers.

It is preferable that the first island-shaped electrically insulating organic film is composed of novolak resin.

It is preferable that the first island-shaped electrically insulating organic film is covered at its surface facing the liquid crystal with the shield common electrode.

It is preferable that the second substrate includes a black matrix layer, a color layer and a planarized layer covering the black matrix layer and the color layer therewith and having a thickness equal to or greater than 1.5 micrometers.

It is preferable that the second substrate includes a black matrix layer having a resistivity equal to or greater than 1E9 Ω·cm.

It is preferable that the second substrate includes a light-shielding film located facing the data line, the light-shielding film having a multi-layered structure including two color layers having colors different from each other.

In another aspect of the present invention, there is provided a method of fabricating a liquid crystal display device including a first substrate, a second substrate, and liquid crystal sandwiched between the first and second substrates, the first substrate including a gate line, a data line intersecting with the gate line, a pixel electrode, a common electrode extending in parallel with the pixel electrode, and a plurality of thin film transistors located at intersections of the gate line and the data line, the pixel electrode being fabricated concurrently with a source electrode of each of the thin film transistors, the method including the step of forming the common electrode so as to be closer to the liquid crystal than the data line, to overlap the data line, and to have a shield common electrode which covers a first island-shaped electrically insulating organic film formed on an electrically insulating inorganic film formed above the data line.

It is preferable that the first island-shaped electrically insulating organic film is covered at its surface facing the liquid crystal with the shield common electrode.

It is preferable that the first island-shaped electrically insulating organic film is composed of novolak resin, and further including the step of baking the first island-shaped electrically insulating organic film at a temperature in the range of 200 to 270 degrees centigrade both inclusive for 30 to 120 minutes both inclusive.

The method may further include the step of thermally annealing the first island-shaped electrically insulating organic film at a temperature in the range of 100 to 150 degrees centigrade both inclusive for 30 seconds to 15 minutes both inclusive before the first island-shaped electrically insulating organic film is baked.

It is preferable that the first island-shaped electrically insulating organic film is baked at a temperature-raising rate of 5 to 15 degrees per a minute both inclusive.

It is preferable that the first island-shaped electrically insulating organic film is heated at a fixed temperature in the range of 100 to 150 degrees centigrade both inclusive for a certain period of time before the first island-shaped electrically insulating organic film is baked at a temperature in the range of 200 to 270 degrees centigrade both inclusive.

There is further provided a method of fabricating a liquid crystal display device including a first substrate, a second substrate, and liquid crystal sandwiched between the first and second substrates, the first substrate including a gate line, a data line intersecting with the gate line, a pixel electrode being electrically connected to a source electrode of a thin film transistor, a common electrode extending in parallel with the pixel electrode, and a plurality of thin film transistors located at intersections of the gate line and the data line, the method including the steps of forming the common electrode so as to be closer to the liquid crystal than the data line, to overlap the data line, and to have a shield common electrode which covers a first island-shaped electrically insulating organic film formed on an electrically insulating inorganic film formed above the data line, and forming the pixel electrode concurrently with the common electrode.

It is preferable that the first island-shaped electrically insulating organic film is covered at its surface facing the liquid crystal with the shield common electrode.

It is preferable that the first island-shaped electrically insulating organic film is composed of novolak resin, and further including the step of baking the first island-shaped electrically insulating organic film at a temperature in the range of 200 to 270 degrees centigrade both inclusive for 30 to 120 minutes both inclusive.

The method may further include the step of thermally annealing the first island-shaped electrically insulating organic film at a temperature in the range of 100 to 150 degrees centigrade both inclusive for 30 seconds to 15 minutes both inclusive before the first island-shaped electrically insulating organic film is baked.

It is preferable that the first island-shaped electrically insulating organic film is baked at a temperature-raising rate of 5 to 15 degrees per a minute both inclusive.

It is preferable that the first island-shaped electrically insulating organic film is heated at a fixed temperature in the range of 100 to 150 degrees centigrade both inclusive for a certain period of time before the first island-shaped electrically insulating organic film is baked at a temperature in the range of 200 to 270 degrees centigrade both inclusive.

The advantages obtained by the aforementioned present invention will be described hereinbelow.

First, the common electrode is designed to be located closer to liquid crystal than the data line and overlap the data line, and further to include the shield common electrode covering therewith the first island-shaped electrically insulating organic film formed on an electrically insulating inorganic film above the data line. This ensures that the shield common electrode can terminate electric lines of force derived from the data line. As a result, the pixel electrode can be arranged close to the data line, ensuring an increase in a numerical aperture.

Second, since an interlayer insulating film of a TFT substrate is comprised of an organic film composed of novolak resin or material analogous to novolak resin, it would be possible to reduce a parasitic capacity between the data line and the common electrode which shields the data line, ensuring it possible to suppress signal delay and power consumption.

When an interlayer insulating organic film composed of novolak resin is formed above the gate line, and the interlayer insulating organic film is shielded by the common electrode, it would be possible to reduce a parasitic capacity of the gate line, ensuring it possible to suppress flickers and non-uniformity in applying signals into pixels both caused by delay in the gate line.

Third, a TFT substrate can be fabricated cheaper than a conventional one by using novolak photoresist cheaper than acrylic photoresist.

Fourth, since an organic film as an interlayer insulating film in a TFT substrate is designed to have a minimum area, and the organic film is not formed in a pixel, it would be possible to enhance film quality of a comb-shaped electrode arranged in a pixel which comb-shaped electrode is comprised of an electrically conductive transparent film. As a result, it would be possible to form a comb-shaped electrode pattern with high accuracy.

Fifth, since an electrode composed of metal, such as molybdenum (Mo) and copper (Cu), which is corroded in atmosphere is covered with an organic film, the electrode is no longer exposed to atmosphere, and hence, have enhanced resistance to atmospheric corrosion.

Sixth, since an electrode composed of metal such as molybdenum (Mo) and copper (Cu) which are corroded in atmosphere is covered with an electrically conductive transparent film having two-layered structure, the electrode is no longer exposed to atmosphere, and hence, have enhanced resistance to atmospheric corrosion.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 3:
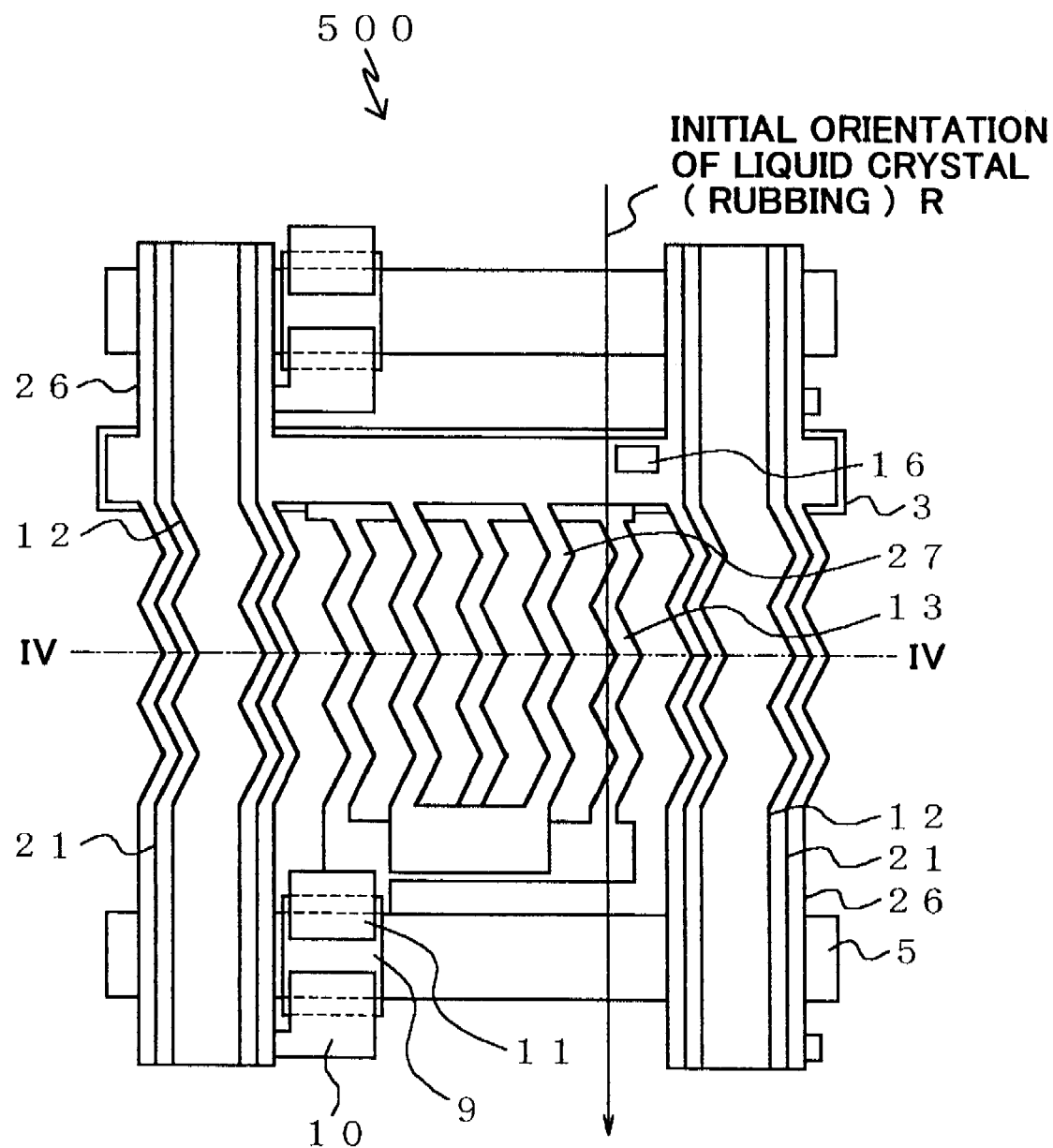
FIG. 3 is a plan view of a TFT substrate on which a thin film transistor (TFT) is fabricated, viewed from liquid crystal, in a liquid crystal display device in accordance with the first embodiment of the present invention.
Figure 4:
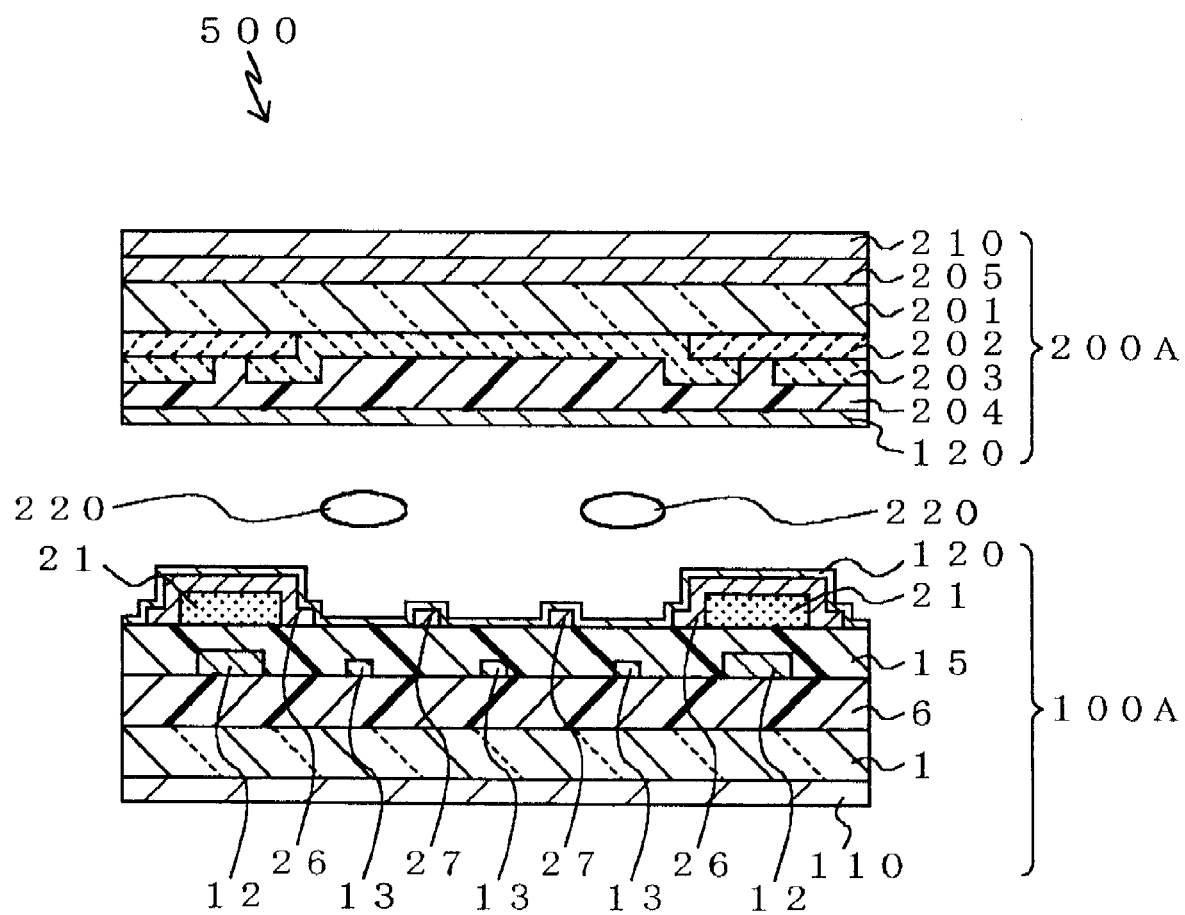
FIG. 4 is a cross-sectional view taken along the line IV-IV in FIG. 3.

FIGS. 3 and 4 illustrate an in-plane switching (IPS) active matrix type liquid crystal display device 500 in accordance with the first embodiment of the present invention. FIG. 3 is a plan view of a TFT substrate 100A on which a thin film transistor (TFT) is fabricated, viewed from liquid crystal, in the liquid crystal display device 500, and FIG. 4 is a cross-sectional view taken along the line IV-IV in FIG. 3.

As illustrated in FIG. 4, the liquid crystal display device 500 is comprised of a TFT substrate 100A, a substrate 200A opposed to the TFT substrate 100A, and a layer of liquid crystal 220 sandwiched between the TFT substrate 100A and the substrate 200A.

The TFT substrate 100A is comprised of a first transparent substrate 1 composed of glass, a first interlayer insulating inorganic film 6 formed on an upper surface of the first transparent substrate 1, a data line 12 formed on the first interlayer insulating inorganic film 6, a comb-shaped common electrode 13 formed on the first interlayer insulating inorganic film 6, a second interlayer insulating inorganic film (passivation film) 15 formed on the first interlayer insulating inorganic film 6, covering the data line 12 and the pixel electrode 13 therewith, a first island-shaped electrically insulating organic film 21 composed of novolak and formed on the second interlayer insulating inorganic film 15 above the data line 12, a comb-shaped common electrode 27 formed on the second interlayer insulating inorganic film 15 between combs of the pixel electrode 13, a data line shield 26 formed on the second interlayer insulating inorganic film 15 so as to cover the first island-shaped electrically insulating organic film 21, and formed in the same layer as the common electrode 27, an alignment film 120 covering the common electrode 27, the data line shield 26 and the second interlayer insulating inorganic film 15 therewith, a polarizer 110 formed on a lower surface of the first transparent substrate 1, a gate line 5 formed on an upper surface of the first transparent substrate 1 (see FIG. 3), and a thin film transistor (not illustrated in FIG. 4).

As illustrated in FIG. 3, the thin film transistor is comprised of an island 9, a drain electrode 10 and a source electrode 11 both formed in the same layer as the data line 12, and the above-mentioned gate line 5.

A specific thin film transistor is selected through the gate line 5. The gate line 5 and the data line 12 are electrically connected to a gate line terminal electrode 51 (see FIG. 26) and a data line terminal electrode 53 (see FIG. 26), respectively, at a marginal area of the TFT substrate 100A.

The substrate 200A is comprised of a second transparent substrate 201 composed of glass, a black matrix layer 202 formed partially on an upper surface of the second transparent substrate 201, a color layer 203 formed partially on both an upper surface of the second transparent substrate 201 and the black matrix layer 202, a planarized layer 204 covering the black matrix layer 202 the color layer 203 therewith, an alignment film 120 formed on the planarized layer 204, an electrically conductive layer 205 formed on a lower surface of the second transparent substrate 201, and a polarizer 210 formed on the electrically conductive layer 205.

Figure 1:
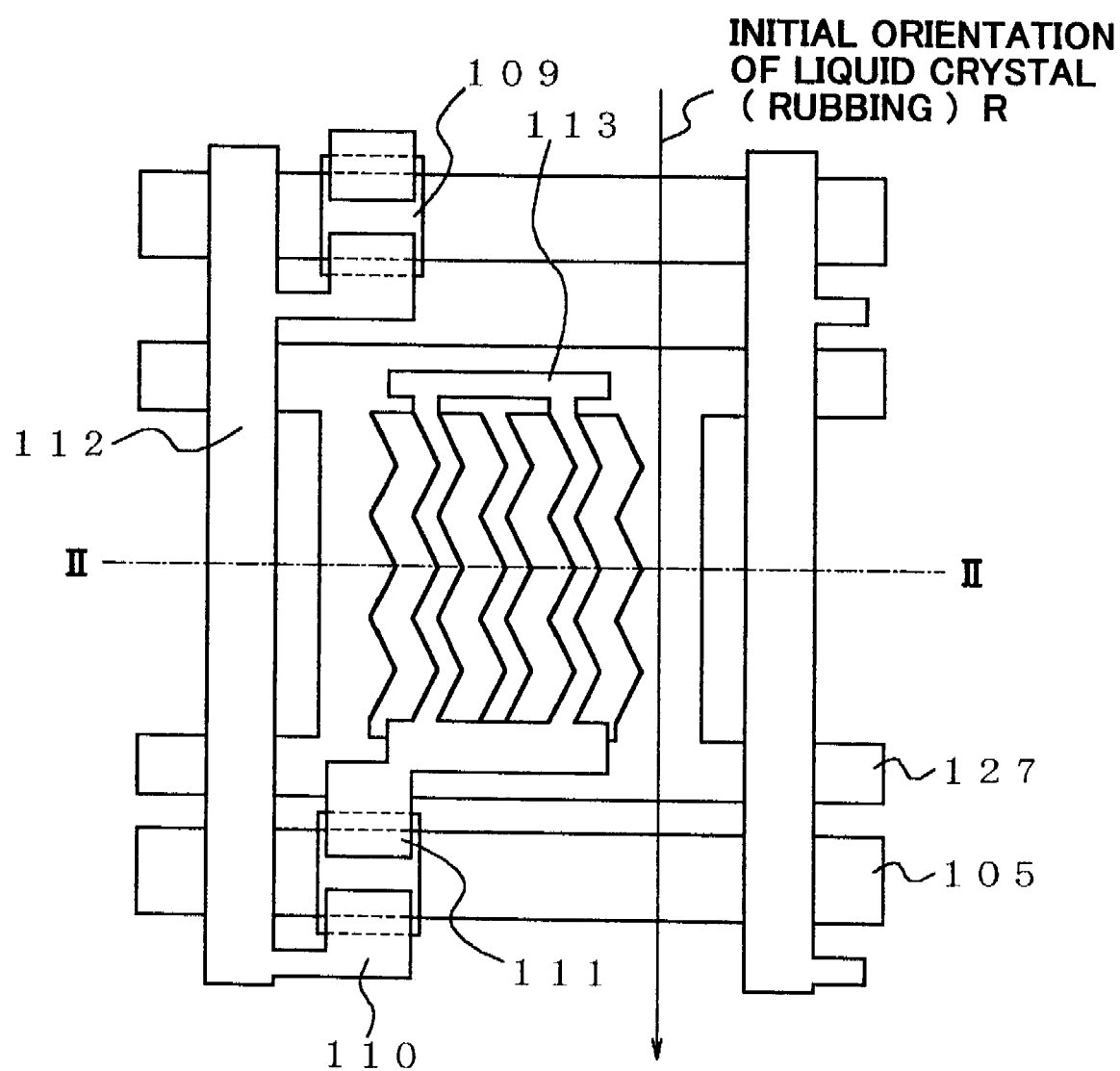
FIG. 1 is a plan view of a TFT substrate on which a thin film transistor (TFT) is fabricated, viewed from liquid crystal, in a conventional liquid crystal display device.
Figure 2:
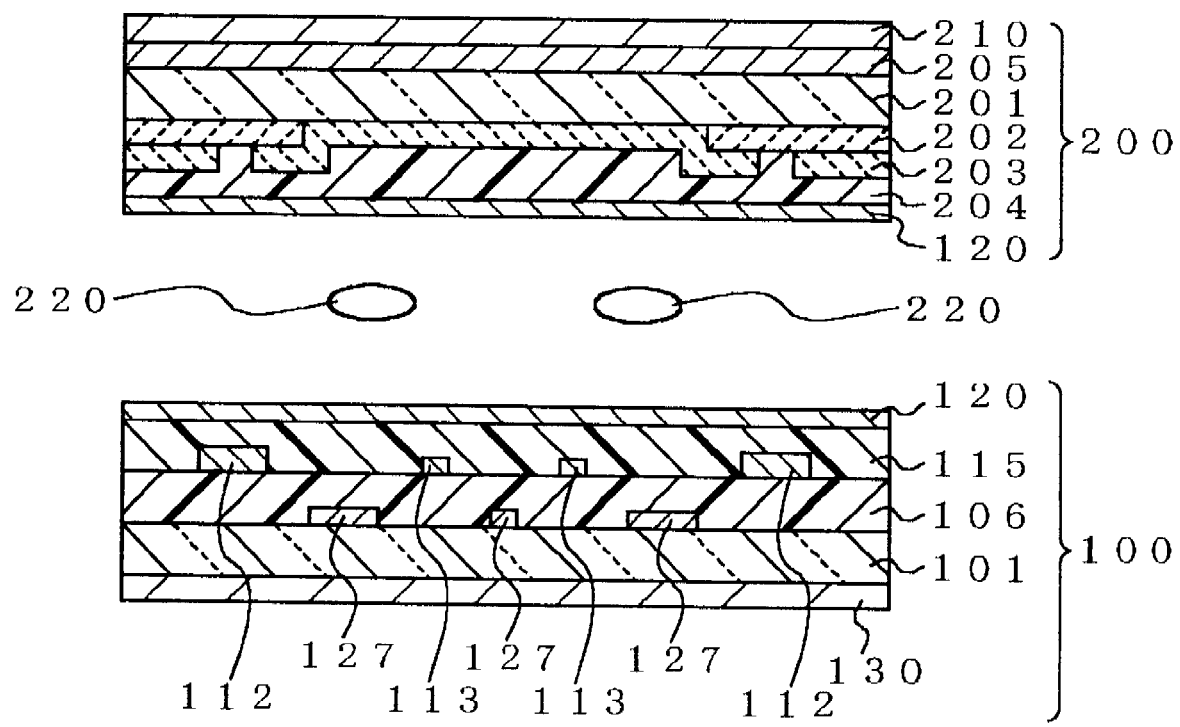
FIG. 2 is a cross-sectional view taken along the line II-II in FIG. 1.

That is, the substrate 200A has the same structure as that of the substrate 200 illustrated in FIG. 2.

Spacers (not illustrated) are sandwiched between the TFT substrate 100A and the substrate 200A to provide a layer of the liquid crystal 220 with a constant thickness.

Seal (not illustrated) is sandwiched between the TFT substrate 100A and the substrate 200A at their marginal areas in order to prevent leakage of the liquid crystal 220.

In the liquid crystal display device in accordance with the present embodiment, as illustrated in FIG. 4, the data line shield 26 is formed above the data line 12 in the same layer as the common electrode 27 with both of the second interlayer insulating inorganic film 15 and the first island-shaped electrically insulating organic film 21 being arranged therebetween such that the data line shield 26 overlaps the data line 12.

Hence, electric lines of force derived from the data line 12 are terminated by the data line shield 26, resulting in that it is possible to prevent the electric lines of force derived from the data line 12, from entering the pixel electrode 13.

If there is formed a high parasitic capacity between the data line 12 and the data line shield 26 arranged just above the data line 12, there would be caused problems of signal delay and an increase in poser consumption. In order to solve the problems, the first island-shaped electrically insulating organic film 21 composed mainly of novolak resin is designed to have a thickness greater than a thickness of the second interlayer insulating film 15, ensuring reduction in the parasitic capacity.

In addition, by designing the data line shield 26 to terminate the electric lines of force derived from the data line 12, it would be possible to arrange the pixel electrode 13 in the vicinity of the data line 12, ensuring an increase in a numerical aperture.

As illustrated in FIG. 3, the pixel electrode 13, the common electrode 27 and the data line 12 rotate the liquid crystal 220 in two directions symmetrical with each other about a direction (rubbing direction) R in which the liquid crystal 220 is initially oriented, such that the liquid crystal 220 is parallel with one another in the direction R. In other words, the liquid crystal display device 500 in accordance with the present embodiment constitutes a multi-domain IPS. Since domain rotating in one of the above-mentioned two directions and domain rotating in the other direction compensate for each other in a multi-domain IPS, it is possible to enhance a viewing-angle characteristic.

The planarized film 204 covering the black matrix layer 202 and the color layer 203 therewith preferably has a thickness of 1.5 micrometers or greater. By designing the planarized film 204 to have a thickness of 1.5 micrometers or greater, it would be possible to have a sufficiently wide gap between the black matrix layer 202 and the first island-shaped electrically insulating organic film 21. This ensures that the electric field is not interrupted by the black matrix layer 202, and hence, display quality is enhanced.

The black matrix layer 202 preferably has a resistivity equal to or greater than 1E9 ($1\times10^9$) $\Omega\cdot$cm. This ensures that the electric field is not interrupted by the black matrix layer 202, and hence, display quality is enhanced.

The black matrix layer 202 may be replaced with a light-shielding film having a multi-layered structure including two or more color layers having colors different from one another. The light-shielding film comprised of two or more color layers has a function of sufficiently shielding excessive light, and further has a high resistance. Hence, the light-shielding film is less influenced by interruption of the electric field than the black matrix layer 202 having a high resistivity, ensuring enhanced display-quality.

Figure 5A:
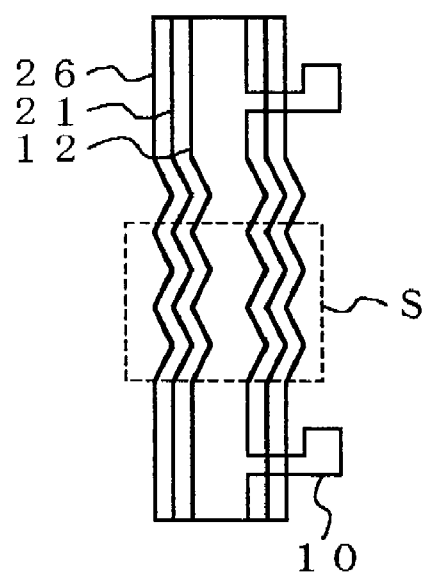
FIG. 5A is a plan view partially illustrating a data line in a liquid crystal display device in accordance with the first embodiment of the present invention.
Figure 5B:
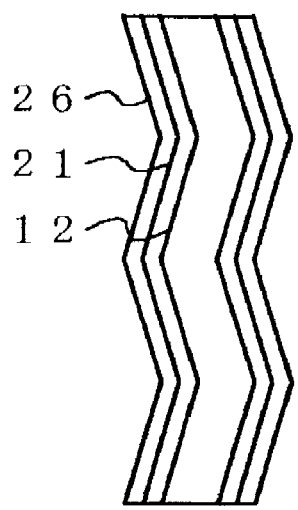
FIG. 5B is an enlarge view of a rectangular area S indicated with a broken line in FIG. 5A.

FIG. 5A is a plan view partially illustrating the data line 12, and FIG. 5B is an enlarge view of a rectangular area S indicated with a broken line in FIG. 5A.

As illustrated in FIG. 5B, the data line 12 is designed to have a zigzag or comb-shaped structure. By designing the data line 12 to have a zigzag structure extending in parallel with the pixel electrode 13 and the common electrode 27, it would be possible for a display area in a pixel to have a sufficient area through which a light can pass.

Figure 5C:
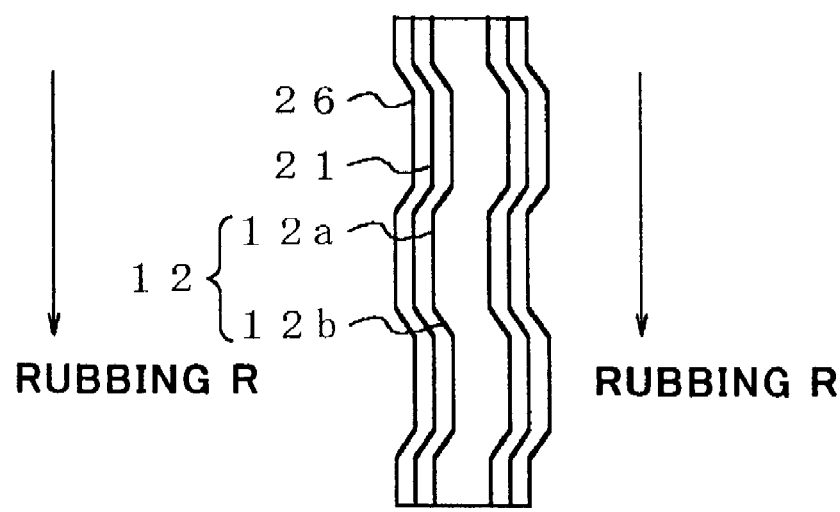
FIG. 5C is a plan view partially illustrating another example of a data line in a liquid crystal display device in accordance with the first embodiment of the present invention.

FIG. 5C is a plan view partially illustrating another example of the data line 12.

As illustrated in FIG. 5C, the data line 12 may be designed to be comprised of linear portions 12a extending in parallel with the rubbing direction R and spaced away from one another by a predetermined pitch in a direction perpendicular to the rubbing direction R, and inclined portions 12b connecting the linear portions 12a to each other. The data line 12 illustrated in FIG. 5C does not reduce an efficiency by which light is used.

The first island-shaped electrically insulating organic film 21 extending in parallel with the data line 12 may be patterned to extend in parallel with the rubbing direction R in association with the linear portions 12a of the data line 12. This ensures that a rubbing cloth is less influenced by the pattern of the first island-shaped electrically insulating organic film 21 in a rubbing step, and hence, the alignment film 120 located close to the pattern of the first island-shaped electrically insulating organic film 21 can be uniformly aligned. Thus, the liquid crystal 220 could be stably oriented in a desired direction, and contrast in displaying images could be enhanced.

Second Embodiment

Figure 6:
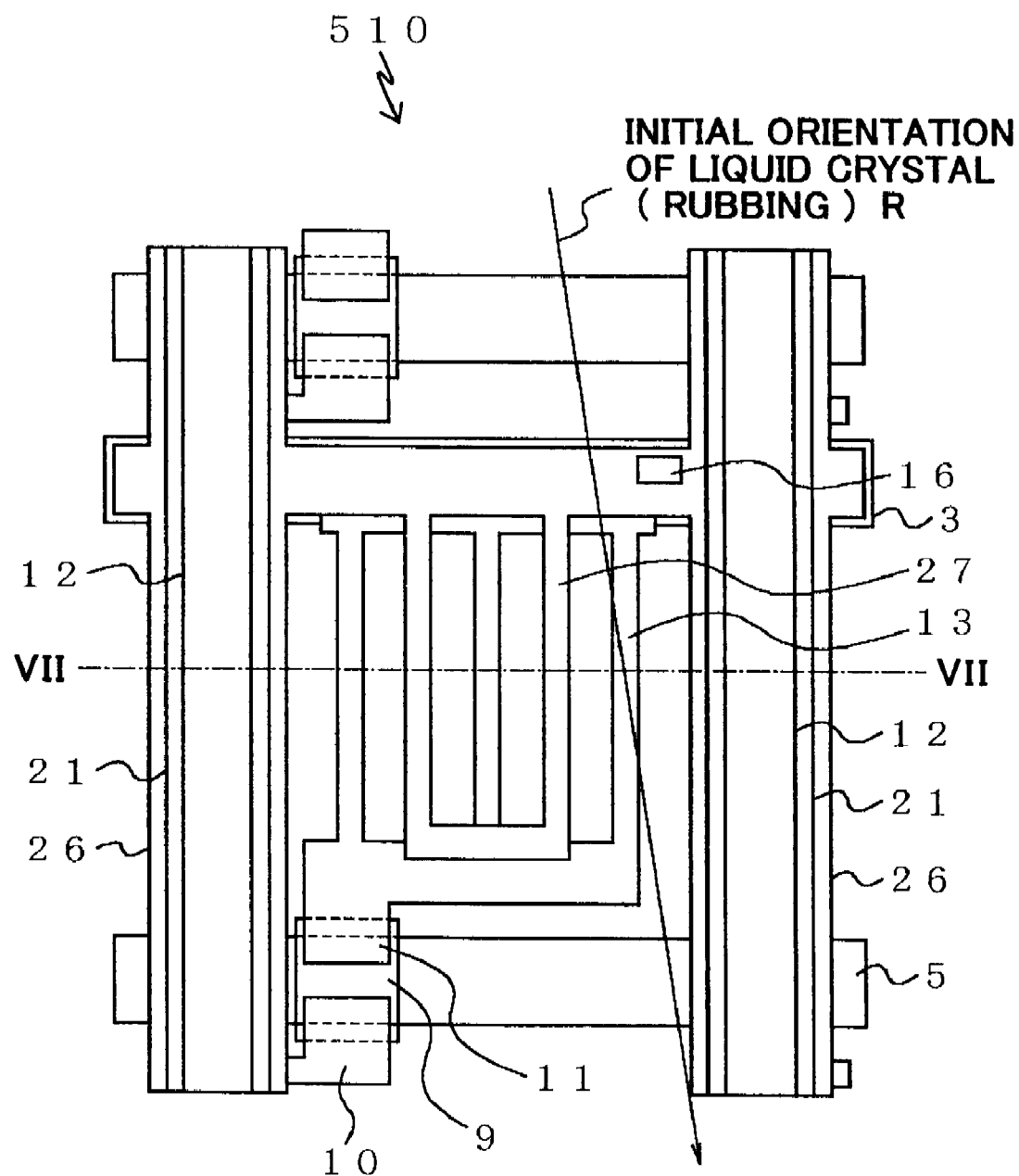
FIG. 6 is a plan view of a TFT substrate on which a thin film transistor (TFT) is fabricated, viewed from liquid crystal, in a liquid crystal display device in accordance with the second embodiment of the present invention.
Figure 7:
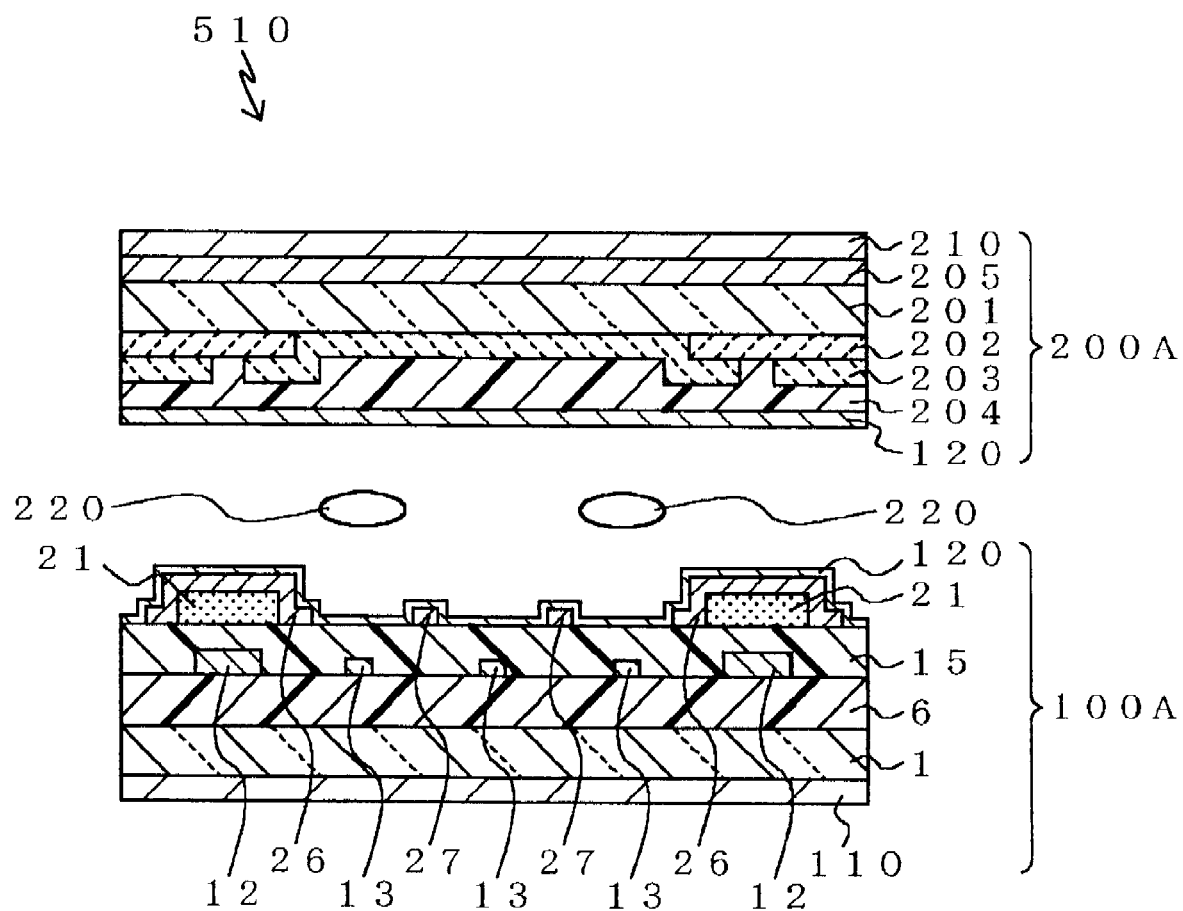
FIG. 7 is a cross-sectional view taken along the line VII-VII in FIG. 6.

FIGS. 6 and 7 illustrate an in-plane switching (IPS) active matrix type liquid crystal display device 510 in accordance with the second embodiment of the present invention. FIG. 6 is a plan view of a TFT substrate 100A on which a thin film transistor (TFT) is fabricated, viewed from liquid crystal, in the liquid crystal display device 510, and FIG. 7 is a cross-sectional view taken along the line VII-VII in FIG. 6.

In the liquid crystal display device 500 in accordance with the first embodiment, the pixel electrode 13, the common electrode 27 and the data line 12 are all in the zigzag or comb-shaped form such that they are in parallel with the rubbing direction R. Thus, they can generate horizontal electric fields in two directions, and resultingly, the liquid crystal 220 is rotated in two directions symmetrical with each other about the rubbing direction R. Since domain rotating in one of the above-mentioned two directions and domain rotating in the other direction compensate for each other, it is possible to enhance a viewing-angle characteristic.

In other words, the liquid crystal display device 500 in accordance with the first embodiment, illustrated in FIGS. 3 and 4, constitutes a multi-domain IPS.

In contrast with the liquid crystal display device 500 in accordance with the first embodiment, as is obvious in view of comparison of FIG. 6 to FIG. 3, the data line 12, the pixel electrode 13 and the common electrode 27 including the data line shield 26 in the liquid crystal display device 510 in accordance with the present embodiment are designed to extend straight without being bent, in a direction perpendicular to the gate line 5.

That is, the liquid crystal display device 510 in accordance with the present embodiment constitutes a single-domain IPS. The first and second embodiments indicate that the present invention can be applied to a single-domain IPS as well as a multi-domain IPS.

The first island-shaped electrically insulating organic film 21 and the data line shield (common electrode) 26 covering the first island-shaped electrically insulating organic film 21 therewith, both formed on the second interlayer insulating inorganic film 15 may be formed so as to entirely overlap the data line 12, as illustrated in FIG. 6. By designing the first island-shaped electrically insulating organic film 21 and the data line shield (common electrode) 26 to overlap the data line 12, it would be possible to prevent etchant used for patterning the data line shield (common electrode) 26, from penetrating a pinhole in the second interlayer insulating inorganic film 15 and further breaking the data line 12.

Third Embodiment

Figure 8:
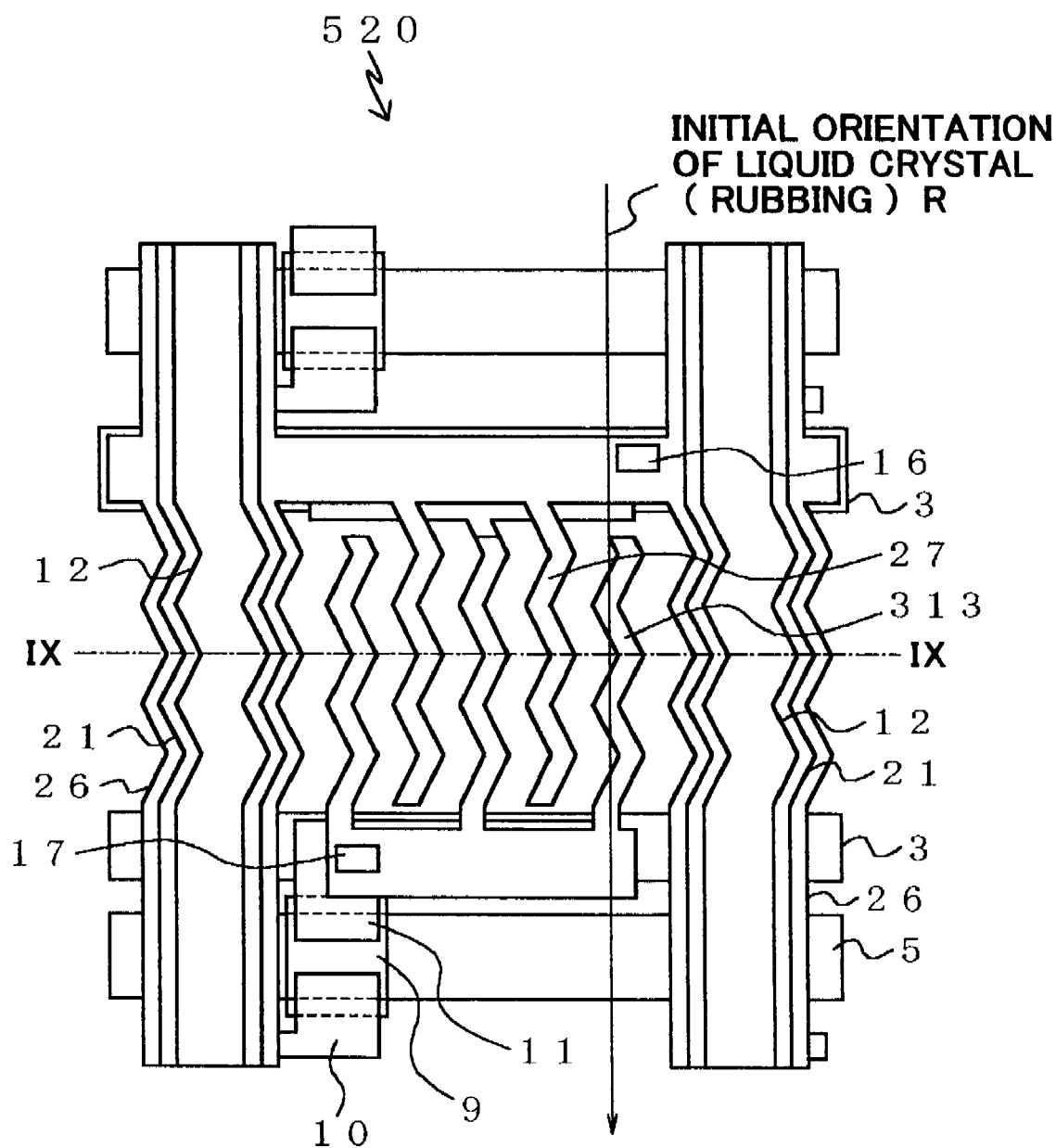
FIG. 8 is a plan view of a TFT substrate on which a thin film transistor (TFT) is fabricated, viewed from liquid crystal, in a liquid crystal display device in accordance with the third embodiment of the present invention.
Figure 9:
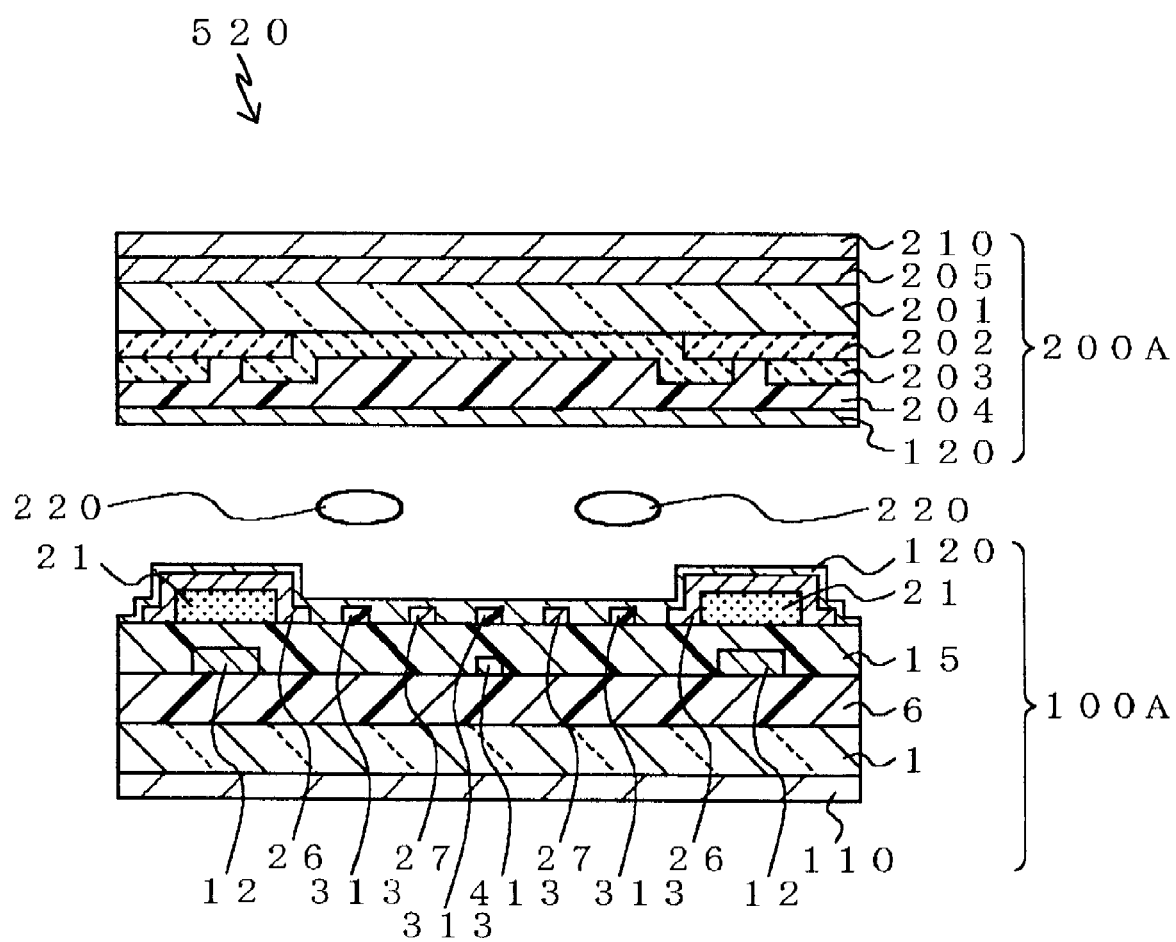
FIG. 9 is a cross-sectional view taken along the line IX-IX in FIG. 8.

FIGS. 8 and 9 illustrate an in-plane switching (IPS) active matrix type liquid crystal display device 520 in accordance with the third embodiment of the present invention. FIG. 8 is a plan view of a TFT substrate 100A on which a thin film transistor (TFT) is fabricated, viewed from liquid crystal, in the liquid crystal display device 520, and FIG. 9 is a cross-sectional view taken along the line IX-IX in FIG. 8.

The liquid crystal display device 520 in accordance with the present embodiment is structurally different from the liquid crystal display device 500 in accordance with the first embodiment, illustrated in FIGS. 3 and 4, in that a pixel electrode has a two-layered structure. That is, a pixel electrode in the liquid crystal display device 520 is comprised of an upper-layer pixel electrode 313 and a lower-layer pixel electrode 413.

Whereas the pixel electrode 13 in the liquid crystal display device 500 in accordance with the first embodiment is formed on the first interlayer insulating film 6, the lower-layer pixel electrode 413 is formed on the first interlayer insulating film 6, and the upper-layer pixel electrode 313 is formed on the second interlayer insulating film (passivation film) 15, that is, in an uppermost layer in the liquid crystal display device 520 in accordance with the present embodiment. The liquid crystal display device 520 in accordance with the present embodiment has the same structure as that of the liquid crystal display device 500 in accordance with the first embodiment except a location of the upper-layer pixel electrode 313.

The liquid crystal display device 520 in accordance with the present embodiment provides the same advantages as those provided by the liquid crystal display device 500 in accordance with the first embodiment.

Similarly to the liquid crystal display device 510 in accordance with the second embodiment, in the liquid crystal display device 520 in accordance with the present embodiment, the first island-shaped electrically insulating organic film 21 and the data line shield (common electrode) 26 covering the first island-shaped electrically insulating organic film 21 therewith, both formed on the second interlayer insulating inorganic film 15 may be formed so as to entirely overlap the data line 12, as illustrated in FIG. 8. By designing the first island-shaped electrically insulating organic film 21 and the data line shield (common electrode) 26 to overlap the data line 12, it would be possible to prevent etchant used for patterning the data line shield (common electrode) 26, from penetrating a pinhole in the second interlayer insulating inorganic film 15 and further breaking the data line 12.

Fourth Embodiment

Figure 10:
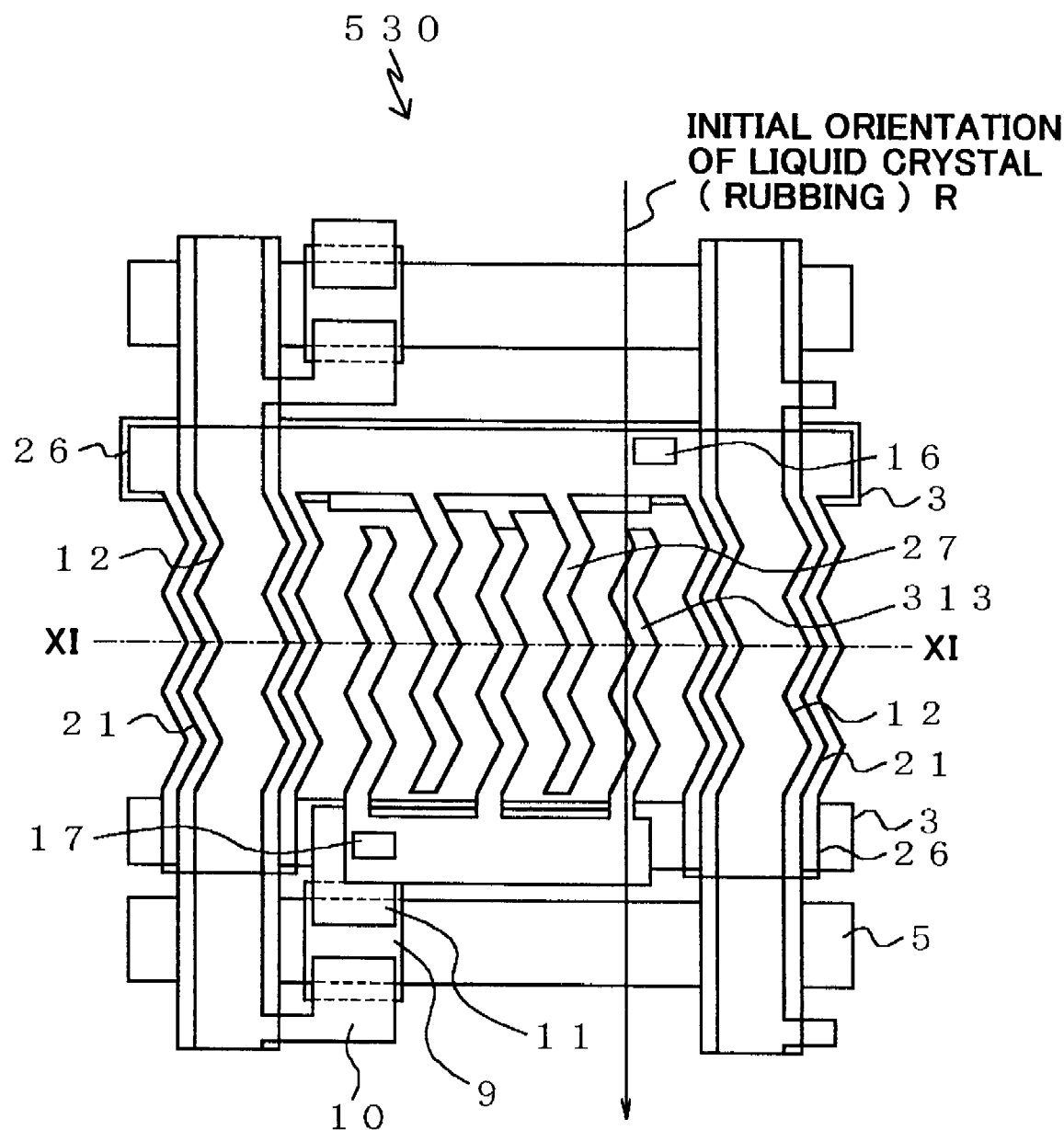
FIG. 10 is a plan view of a TFT substrate on which a thin film transistor (TFT) is fabricated, viewed from liquid crystal, in a liquid crystal display device in accordance with the fourth embodiment of the present invention.
Figure 11:
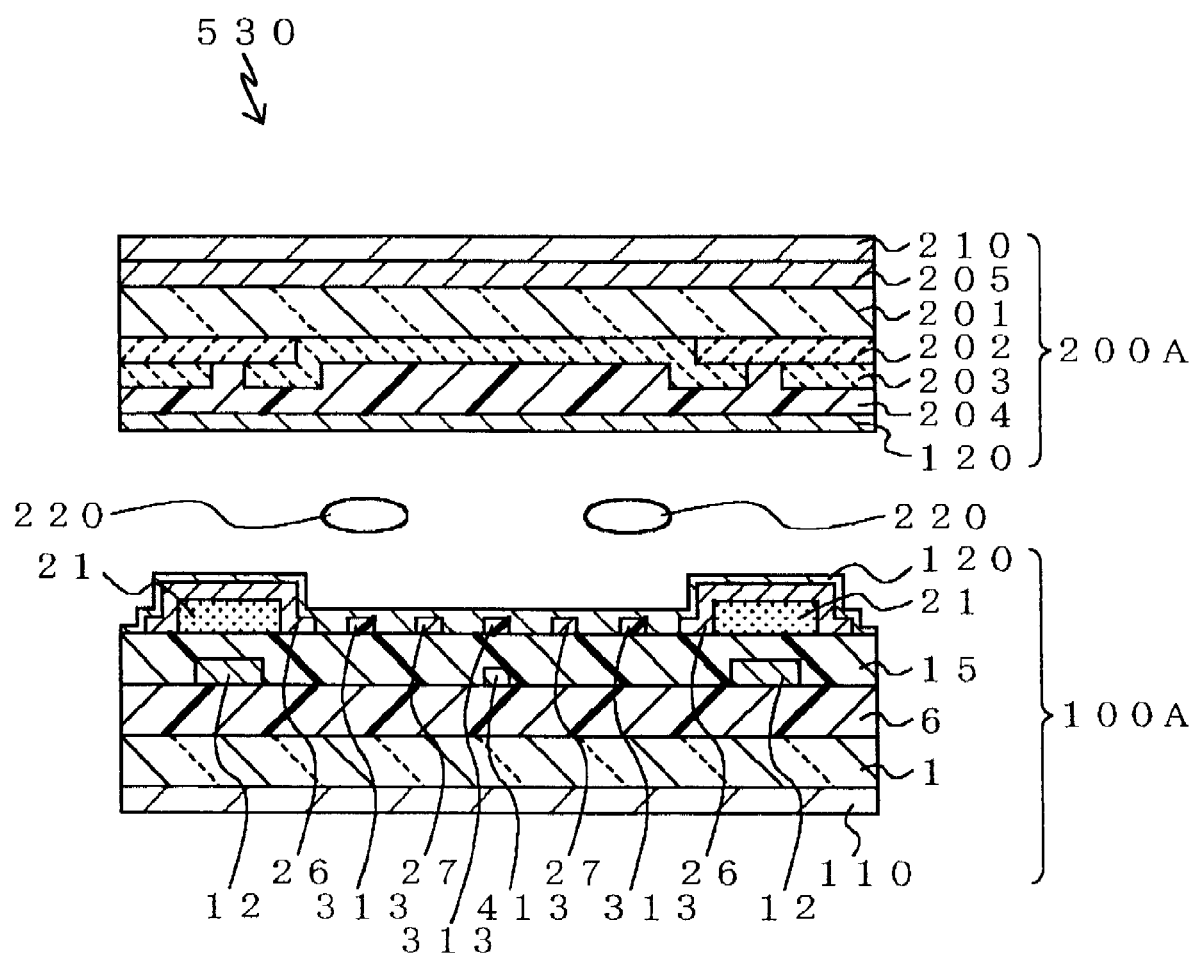
FIG. 11 is a cross-sectional view taken along the line XI-XI in FIG. 10.

FIGS. 10 and 11 illustrate an in-plane switching (IPS) active matrix type liquid crystal display device 530 in accordance with the fourth embodiment of the present invention. FIG. 10 is a plan view of a TFT substrate 100A on which a thin film transistor (TFT) is fabricated, viewed from liquid crystal, in the liquid crystal display device 530, and FIG. 11 is a cross-sectional view taken along the line XI-XI in FIG. 10.

Similarly to the pixel electrode in the liquid crystal display device 520 in accordance with the third embodiment, a pixel electrode in the liquid crystal display device 530 in accordance with the present embodiment is comprised of an upper-layer pixel electrode 313 and a lower-layer pixel electrode 413. The lower-layer pixel electrode 413 is formed on the first interlayer insulating film 6, and the upper-layer pixel electrode 313 is formed on the second interlayer insulating film (passivation film) 15, that is, in an uppermost layer. The liquid crystal display device 530 in accordance with the present embodiment has the same structure as that of the liquid crystal display device 500 in accordance with the first embodiment except a location of the upper-layer pixel electrode 313.

The liquid crystal display device 530 in accordance with the present embodiment provides the same advantages as those provided by the liquid crystal display device 500 in accordance with the first embodiment.

In the liquid crystal display device 530 in accordance with the present embodiment, as illustrated in FIG. 10, the first island-shaped electrically insulating organic film 21 formed on the second interlayer insulating inorganic film 15 may be designed to entirely overlap the data line 12, and the data line shield (common electrode) 26 covering the first island-shaped electrically insulating organic film 21 therewith may be formed only in an area in which images are displayed.

Since the first island-shaped electrically insulating organic film 21 overlaps the data line 12, the first island-shaped electrically insulating organic film 21 and the data line shield (common electrode) 26 in the present embodiment make it possible to prevent etchant used for patterning the data line shield (common electrode) 26, from penetrating a pinhole in the second interlayer insulating inorganic film 15 and further breaking the data line 12.

In addition, since the data line shield (common electrode) 26 is formed only in a minimum area, it would be possible to prevent an increase in a capacity between the data line 12 and the data line shield (common electrode) 26.

Fifth Embodiment

Figure 12:
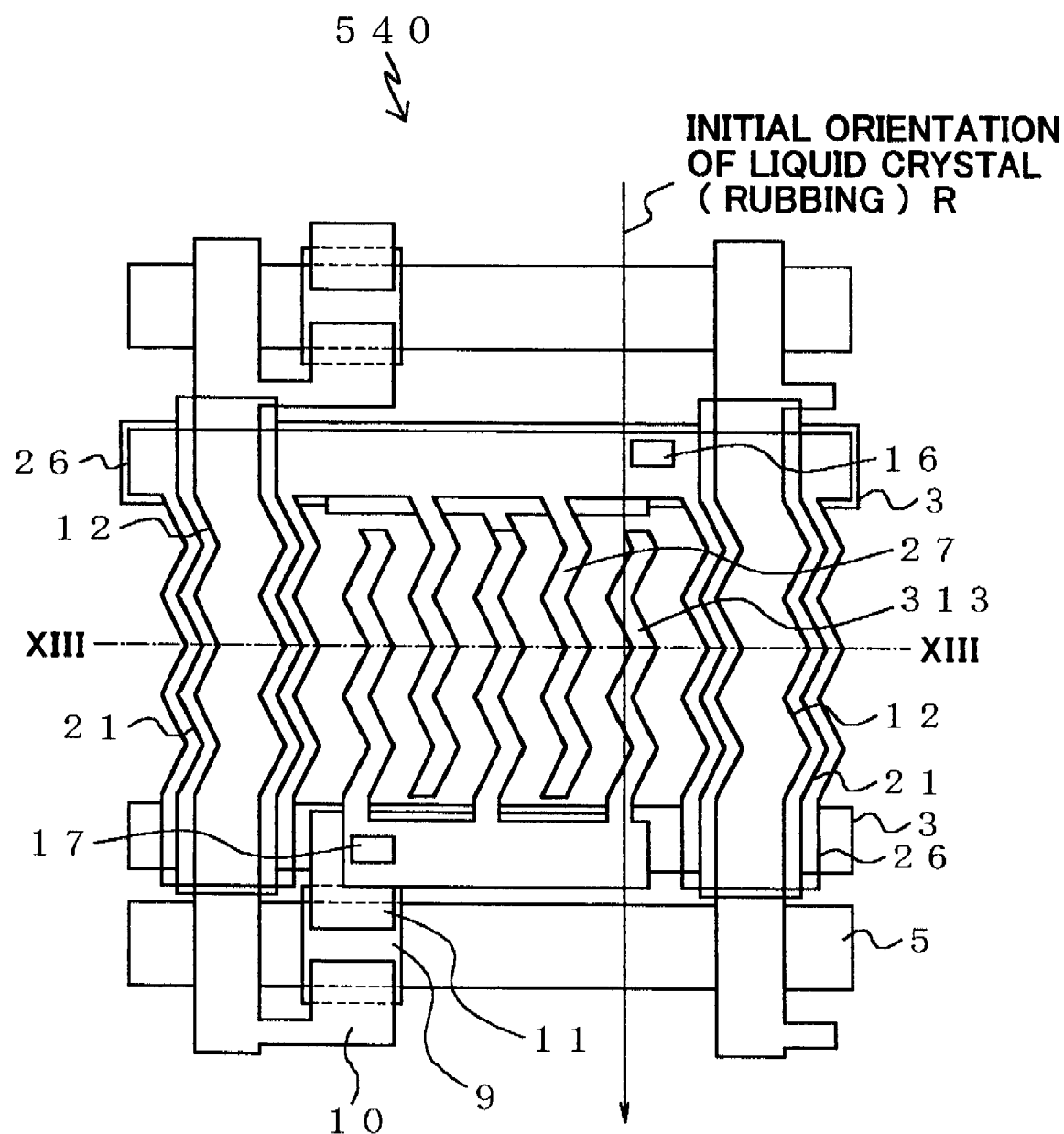
FIG. 12 is a plan view of a TFT substrate on which a thin film transistor (TFT) is fabricated, viewed from liquid crystal, in a liquid crystal display device in accordance with the fifth embodiment of the present invention.
Figure 13:
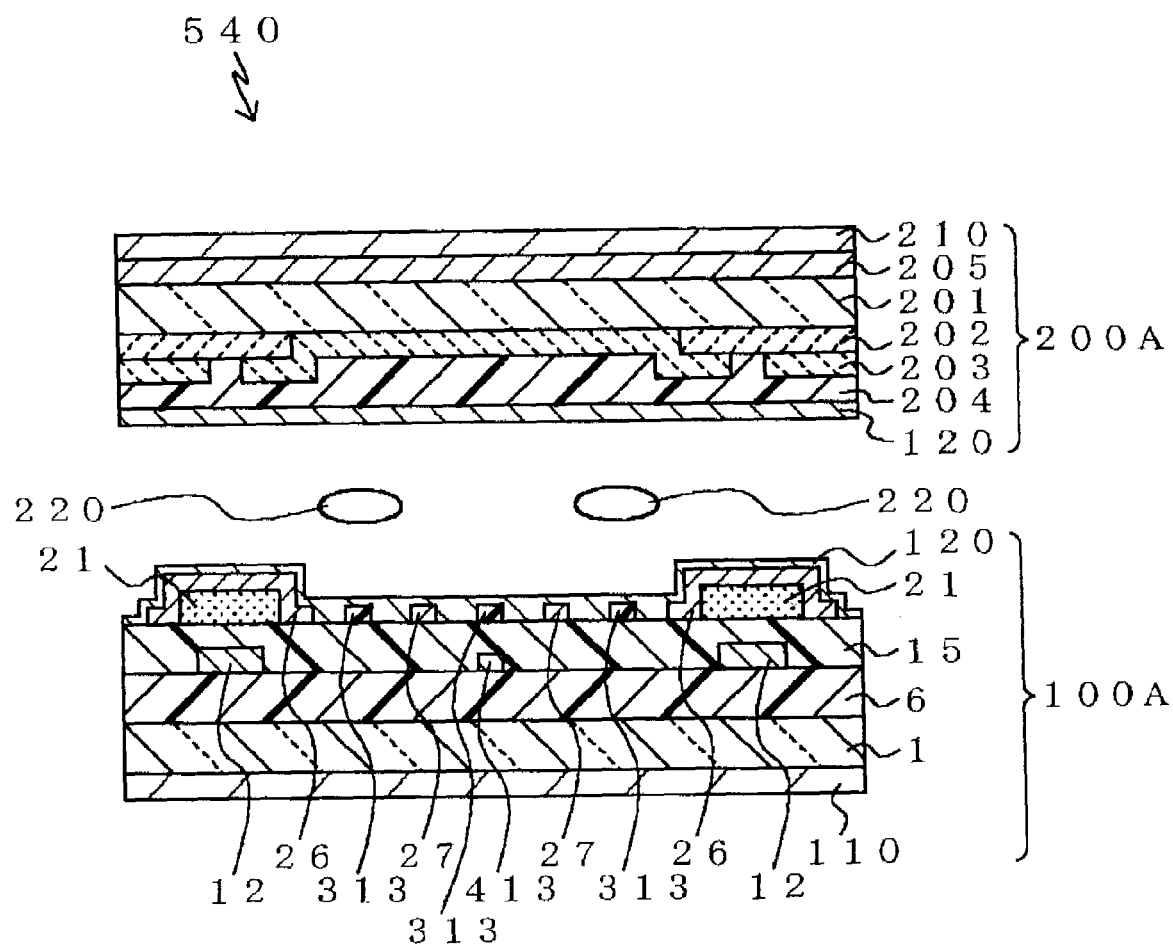
FIG. 13 is a cross-sectional view taken along the line XIII-XIII in FIG. 12.

FIGS. 12 and 13 illustrate an in-plane switching (IPS) active matrix type liquid crystal display device 540 in accordance with the fifth embodiment of the present invention. FIG. 12 is a plan view of a TFT substrate 100A on which a thin film transistor (TFT) is fabricated, viewed from liquid crystal, in the liquid crystal display device 540, and FIG. 13 is a cross-sectional view taken along the line XIII-XIII in FIG. 12.

Similarly to the pixel electrode in the liquid crystal display device 520 in accordance with the third embodiment, a pixel electrode in the liquid crystal display device 540 in accordance with the present embodiment is comprised of an upper-layer pixel electrode 313 and a lower-layer pixel electrode 413. The lower-layer pixel electrode 413 is formed on the first interlayer insulating film 6, and the upper-layer pixel electrode 313 is formed on the second interlayer insulating film (passivation film) 15, that is, in an uppermost layer. The liquid crystal display device 540 in accordance with the present embodiment has the same structure as that of the liquid crystal display device 500 in accordance with the first embodiment except a location of the upper-layer pixel electrode 313.

The liquid crystal display device 540 in accordance with the present embodiment provides the same advantages as those provided by the liquid crystal display device 500 in accordance with the first embodiment.

In the liquid crystal display device 540 in accordance with the present embodiment, as illustrated in FIG. 12, the first island-shaped electrically insulating organic film 21 formed on the second interlayer insulating inorganic film 15 and the data line shield (common electrode) 26 covering the first island-shaped electrically insulating organic film 21 therewith may be formed only in an area in which images are displayed, and the first island-shaped electrically insulating organic film 21 and the second interlayer insulating inorganic film 15 and the data line shield (common electrode) 26 may not be formed in the vicinity of an area in which the data line 12 and the gate line 5 intersect with each other.

In the liquid crystal display device 500 in accordance with the first embodiment (see FIG. 3), the liquid crystal display device 510 in accordance with the second embodiment (see FIG. 6), the liquid crystal display device 520 in accordance with the third embodiment (see FIG. 8), and the liquid crystal display device 530 in accordance with the fourth embodiment (see FIG. 10), the first island-shaped electrically insulating organic film 21 exists as a wall to the data line 12. Hence, there is caused a problem that it is difficult to introduce the liquid crystal 220 into a panel. In contrast, since the first island-shaped electrically insulating organic film 21 is patterned so as to have openings in the liquid crystal display device 540, such a problem can be solved.

Sixth Embodiment

Figure 14:
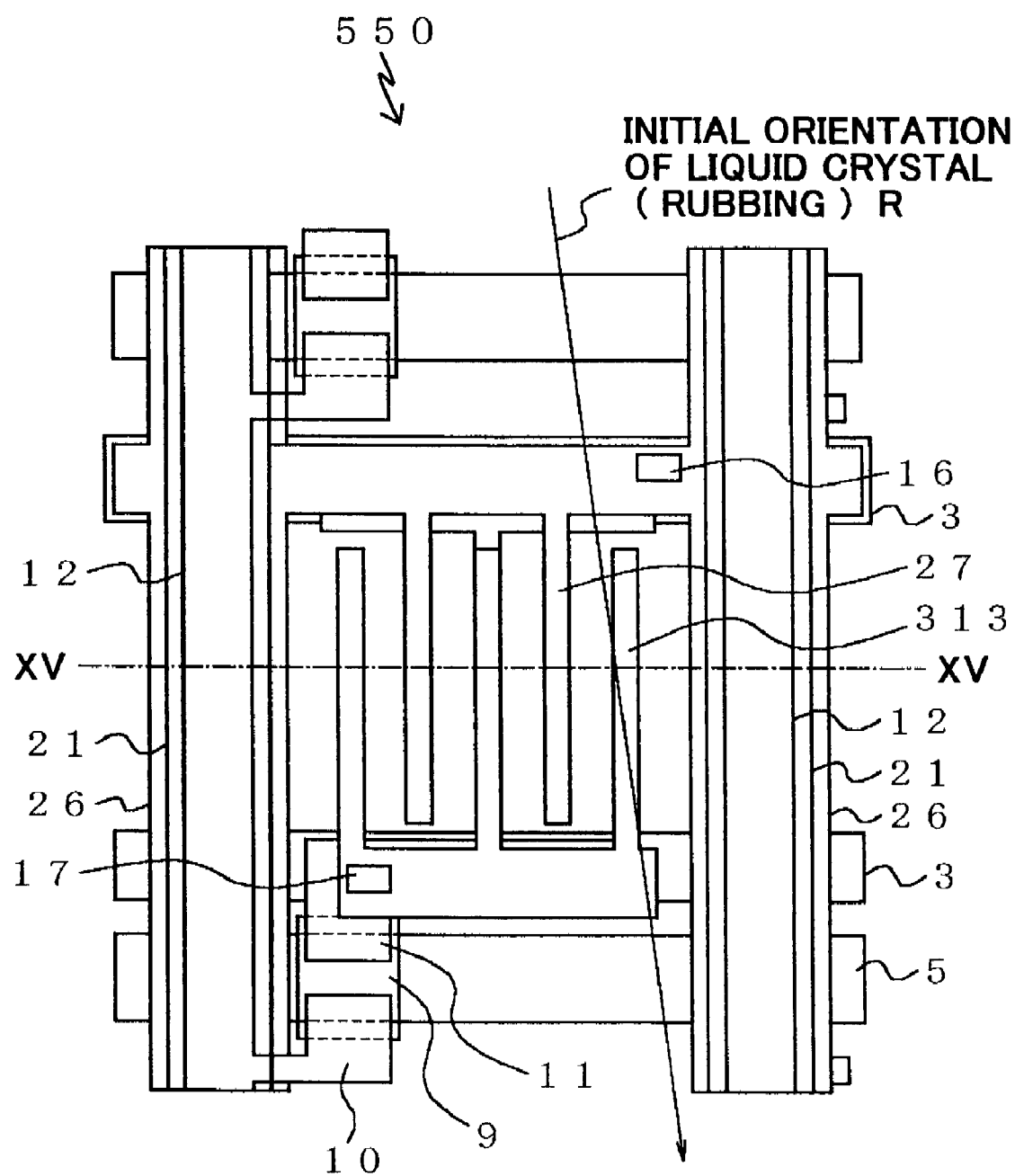
FIG. 14 is a plan view of a TFT substrate on which a thin film transistor (TFT) is fabricated, viewed from liquid crystal, in a liquid crystal display device in accordance with the sixth embodiment of the present invention.
Figure 15:
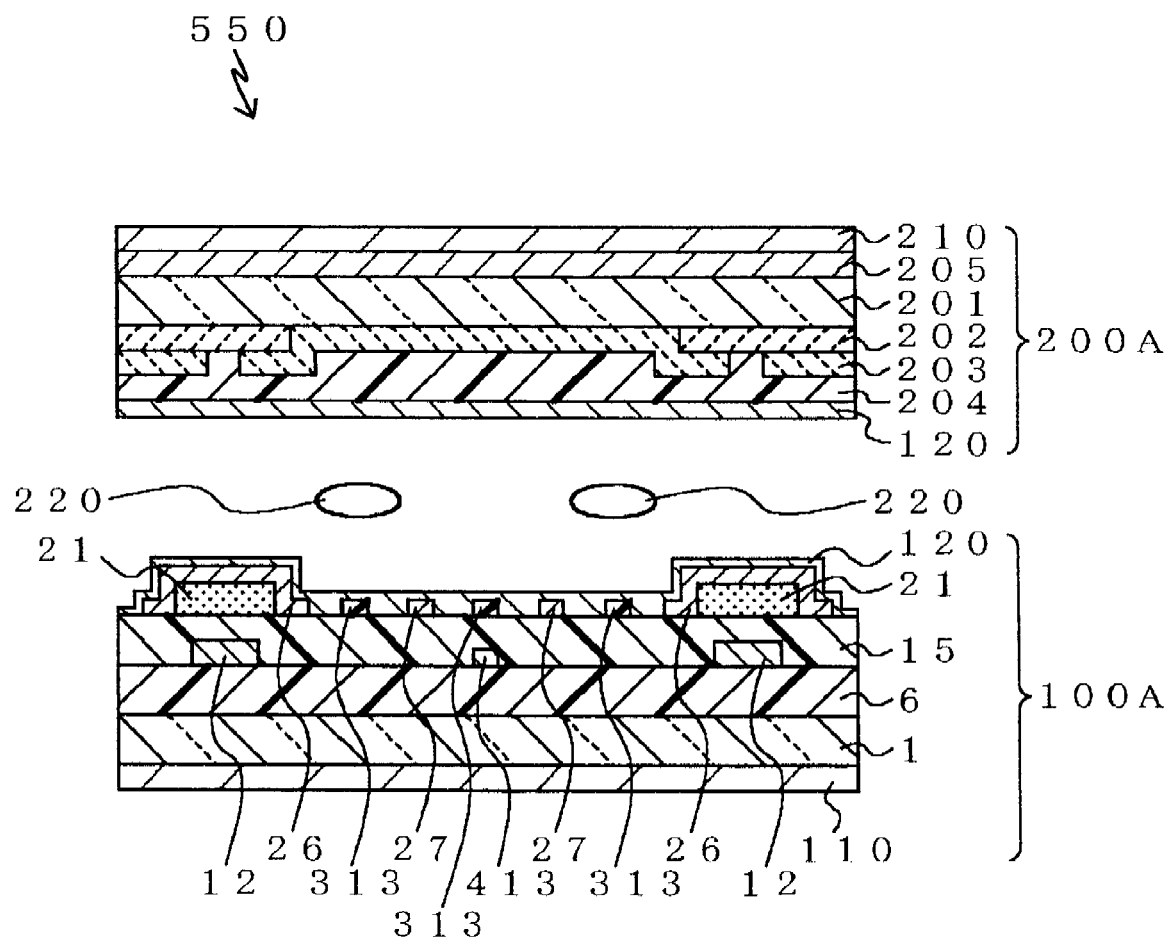
FIG. 15 is a cross-sectional view taken along the line XV-XV in FIG. 14.

FIGS. 14 and 15 illustrate an in-plane switching (IPS) active matrix type liquid crystal display device 550 in accordance with the sixth embodiment of the present invention. FIG. 14 is a plan view of a TFT substrate 100A on which a thin film transistor (TFT) is fabricated, viewed from liquid crystal, in the liquid crystal display device 550, and FIG. 15 is a cross-sectional view taken along the line XV-XV in FIG. 14.

The liquid crystal display device 520 in accordance with the third embodiment, illustrated in FIGS. 8 and 9, constitutes a multi-domain IPS.

As is obvious in view of the comparison of FIG. 14 with FIG. 8, the data line 12, the pixel electrode 13 and the common electrode 27 including the data line shield 26 in the liquid crystal display device 550 in accordance with the present embodiment are all designed to extend straight without being bent, in a direction perpendicular to the gate line 5 unlike the liquid crystal display device 520 in accordance with the third embodiment, illustrated in FIGS. 8 and 9.

That is, the liquid crystal display device 550 in accordance with the present embodiment constitutes a single-domain IPS. Except that, the liquid crystal display device 550 in accordance with the present embodiment has the same structure as that of the liquid crystal display device 520 in accordance with the third embodiment.

As mentioned above, the liquid crystal display device 520 in accordance with the third embodiment may be fabricated as a single-domain IPS as well as a multi-domain IPS. Similarly, the liquid crystal display device 530 in accordance with the fourth embodiment and the liquid crystal display device 540 in accordance with the fifth embodiment may be fabricated as a single-domain IPS as well as a multi-domain IPS.

Seventh Embodiment

FIGS. 16A to 16H are cross-sectional views of the TFT substrate 100A taken along the line IV-IV in FIG. 3 in the liquid crystal display device 500 in accordance with the first embodiment, illustrating respective steps of fabricating the same. Specifically, FIGS. 16A to 16H illustrate cross-sections of a thin film transistor (TFT), a pixel, a contact of a common electrode line, a data line terminal, a gate line terminal together with a common line terminal, and a gate line. A method of fabricating the liquid crystal display device 500 in accordance with the first embodiment is explained hereinbelow as the seventh embodiment of the present invention, with reference to FIGS. 16A to 16H.

Figure 16A:
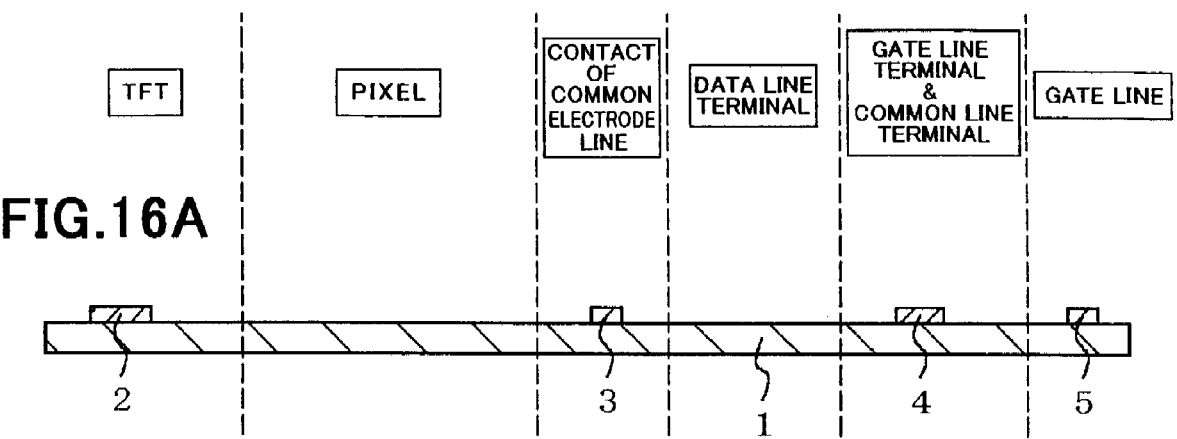
FIGS. 16A to 16H are cross-sectional views of a TFT substrate taken along the line IV-IV in FIG. 3 in a liquid crystal display device in accordance with the first embodiment of the present invention, illustrating respective steps of fabricating the same, and specifically illustrate cross-sections of a thin film transistor (TFT), a pixel, a contact of a common electrode line, a data line terminal, a gate line terminal together with a common line terminal, and a gate line.

First, as illustrated in FIG. 16A, molybdenum (Mo) is deposited on the first transparent substrate 1 by sputtering by a thickness of 400 nanometers. Then, the molybdenum is patterned by photolithography and etching into a gate electrode 2, a common electrode line 3, a gate terminal electrode 4 and a gate line 5.

There may be used metal other than molybdenum. For instance, there may be used chromium (Cr), aluminum (Al), copper (Cu), silver (Ag), titanium (Ti) or tungsten (W).

Figure 16B:
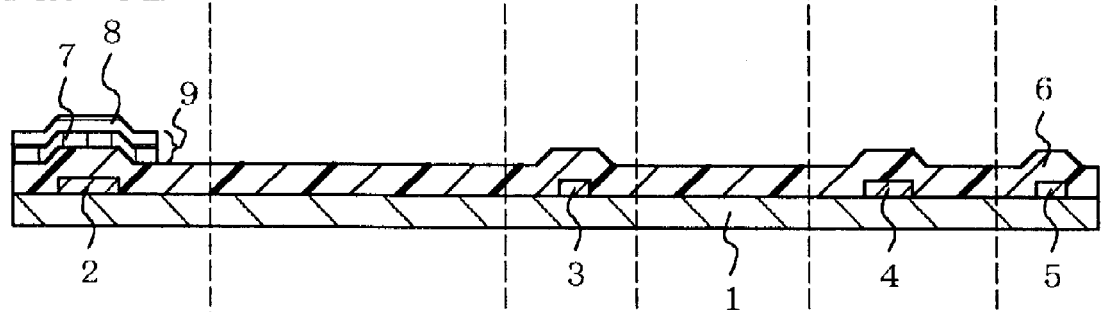

Then, as illustrated in FIG. 16B, a silicon dioxide ($SiO_2$) film is formed on the first transparent substrate 1 by CVD by a thickness of 100 nanometers such that the silicon dioxide film covers the gate electrode 2, the common electrode line 3, the gate terminal electrode 4 and the gate line 5 therewith. Then, a silicon nitride (SiNx) film is formed on the silicon dioxide ($SiO_2$) film by CVD by a thickness of 300 nanometers. The thus formed silicon dioxide ($SiO_2$) film and silicon nitride (SiNx) film constitute the first interlayer insulating film 6.

Then, an amorphous silicon (a-Si) film 7 is formed on the silicon nitride film by CVD by a thickness of 215 nanometers, and a n+ amorphous silicon (a-Si) film 8 is formed on the amorphous silicon film 7 by CVD by a thickness of 50 nanometers.

Then, unnecessary portions of the amorphous silicon film 7 and the n+ amorphous silicon film 8 are removed by photolithography and dry etching to thereby form an island 9, as illustrated in FIG. 16B.

Then, molybdenum (Mo) is deposited on the island 9 and the first interlayer insulating film 6 by sputtering by a thickness of 210 nanometers. Then, unnecessary portions of molybdenum is removed by photolithography and dry etching to thereby form a drain electrode 10 and a source electrode 11 of a thin film transistor, as illustrated in FIG. 16C.

Concurrently with the formation of the drain electrode 10 and the source electrode 11, there are also formed a data line 12, a pixel electrode 13 and a data line terminal electrode 14 on the first interlayer insulating film 6.

The drain electrode 10, the source electrode 11, the data line 12, the pixel electrode 13 and the data line terminal electrode 14 may be composed of metal other than molybdenum (Mo). For instance, they may be composed of chromium (Cr), aluminum (Al), copper (Cu), silver (Ag), titanium (Ti) or tungsten (W).

Figure 16C:
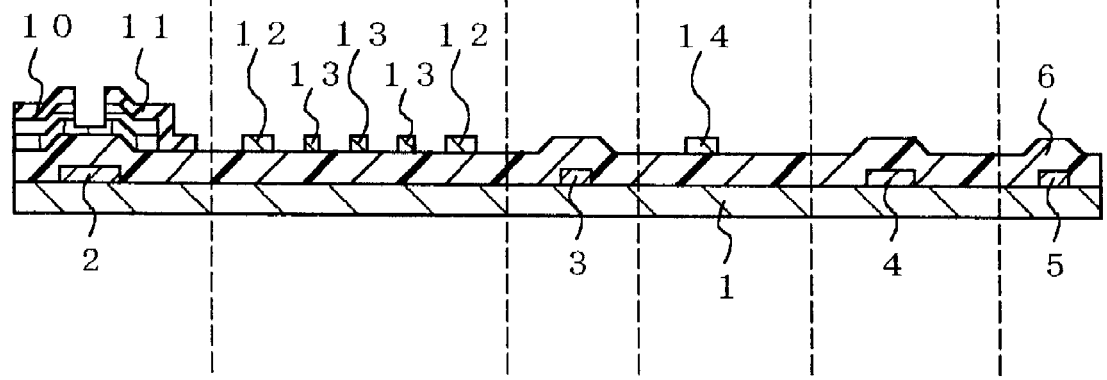

Then, an unnecessary portion of the n+ amorphous silicon (a-Si) film 8 in a back-channel of the thin film transistor is removed by dry etching, as illustrated in FIG. 16C.

Then, a passivation film 15 composed of silicon nitride (SiNx) and having a thickness of 300 nanometers is formed by CVD on the resultant illustrated in FIG. 16C. Then, the resultant is annealed at about 270 degrees centigrade. The annealing may be replaced with baking of a first island-shaped electrically insulating organic film 21 later formed.

Figure 16D:
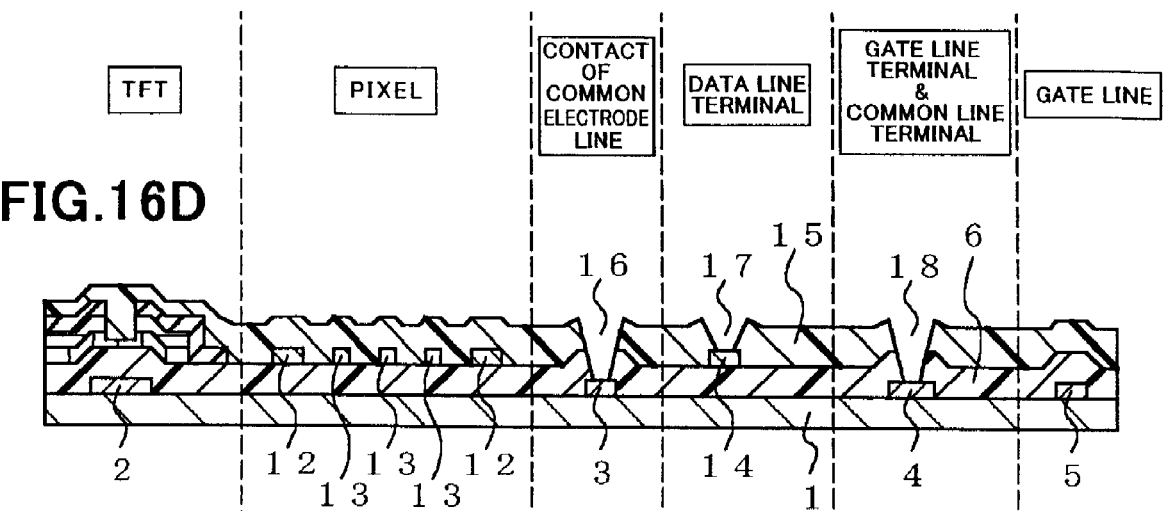

Then, contact holes 16, 17 and 18 are formed throughout the passivation film 15 and the first interlayer insulating film 6 (only the passivation film 15 exists above the data line terminal electrode 14) by photolithography and dry etching or a wet/dry process including both etching in which buffered hydrofluoric acid is used and dry etching, as illustrated in FIG. 16D. The contact hole 16 reaches the common electrode line 3, the contact hole 17 reaches the data line terminal electrode 14, and the contact hole 18 reaches the gate terminal electrode 4.

The formation of the contact holes 16, 17 and 18 prevents the electrodes from being damaged by resist-peeling solution used when the first island-shaped electrically insulating organic film 21 is patterned.

Figure 16E:
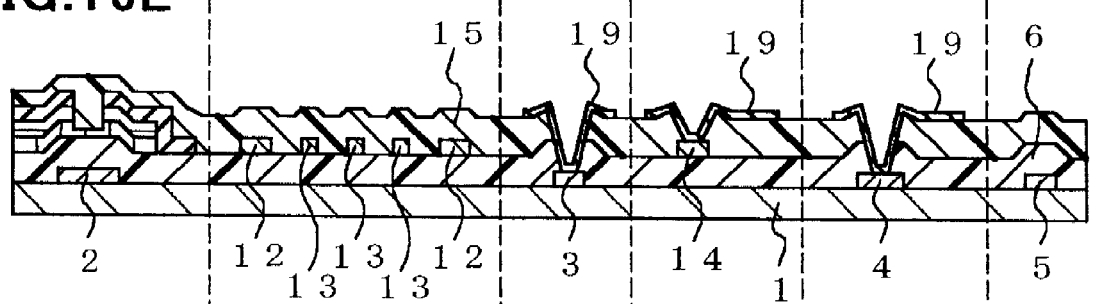

Then, first indium-tin oxide (ITO) is deposited on the passivation film 15 by sputtering by a thickness of 40 nanometers. Then, the thus deposited indium-tin oxide is patterned by photolithography and dry etching into interlayer contacts 19, as illustrated in FIG. 16E.

Thus, there is fabricated a reverse-stagger type TFT.

Figure 16F:
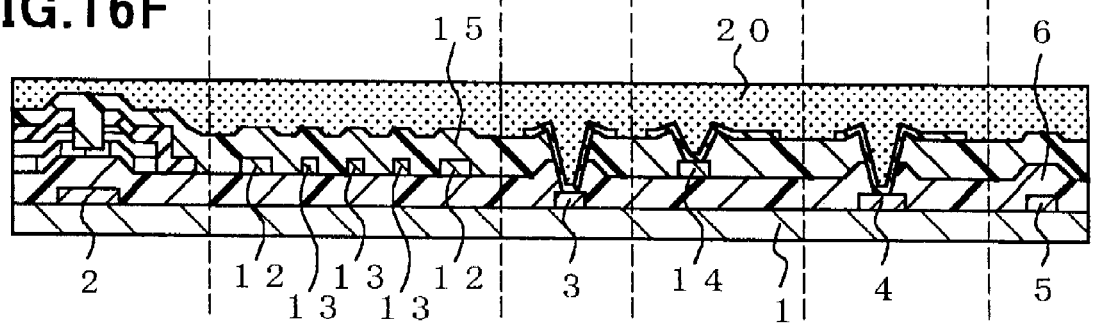

Then, as illustrated in FIG. 16F, photosensitive and heat-resistant novolak resist 20 is coated entirely over the passivation film 15 and the interlayer contacts 19 such that the novolak resist 20 will have a thickness of about 2 micrometers after baked.

Then, the novolak resist 20 is partially removed by photolithography and etching such that interlayer insulating novolak organic layers 21, 22, 23, 24 and 25 remain only above the data line 12, the common electrode line 3, the data line terminal electrode 14, the gate terminal electrode 4 and the gate line 5.

Figure 16G:
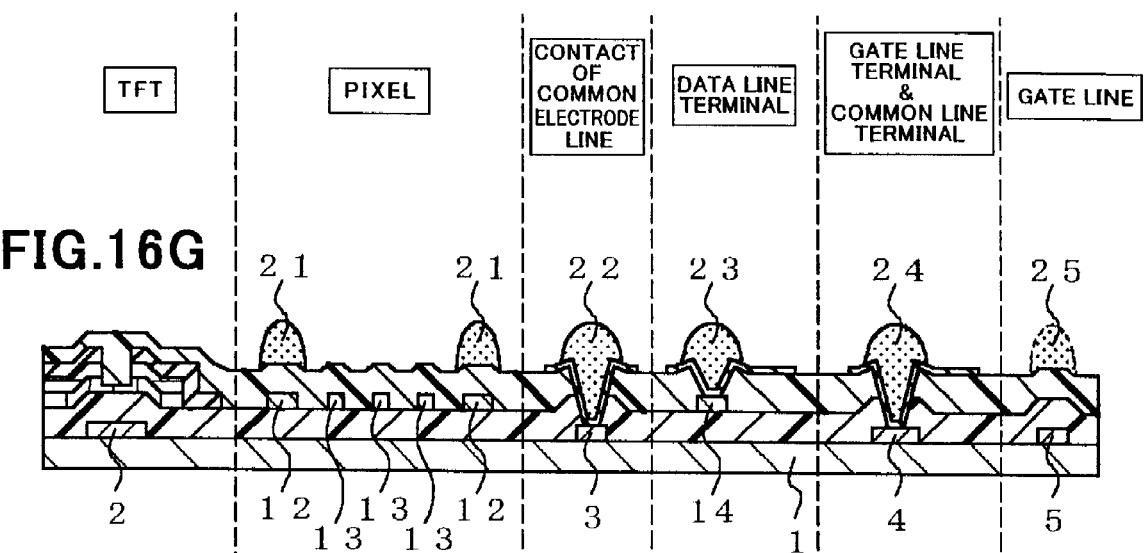
Figure 16H:
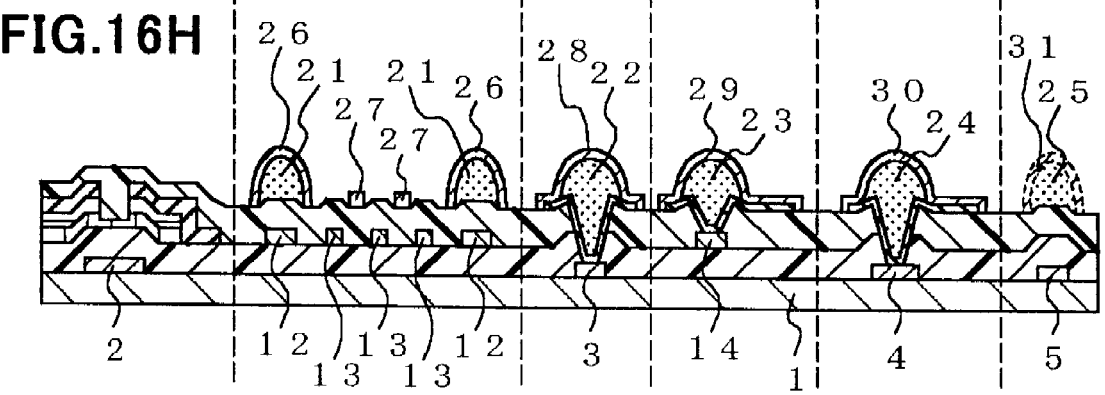

Then, the resultant is annealed at 140 degrees centigrade to thereby melt the interlayer insulating novolak organic layers 21, 22, 23, 24 and 25. As a result, as illustrated in FIG. 16G, the interlayer insulating novolak organic layers 21, 22, 23, 24 and 25 have a reverse-U-shaped cross-section. Then, the resultant is baked in a furnace at 240 degrees centigrade to be tightened.

Then, indium-tin oxide is deposited over the resultant illustrated in FIG. 16G by sputtering by a thickness of 40 nanometers. Then, the indium-tin oxide is patterned by photolithography and etching into a data line shield 26, a comb-shaped electrode 27, an ITO film 28 for a common electrode, an ITO film 29 for a data line terminal, and an ITO film 30 for a gate line terminal and a common line terminal.

Since the common electrode line 3, the data line terminal 14 and the gate terminal electrode 4 all composed of molybdenum (Mo) which is corroded in atmosphere are covered with the two layers, that is, the interlayer contact (first ITO) 19 and the ITO film (second ITO) 28, the molybdenum could have enhance corrosion-resistance.

Figure 17A:
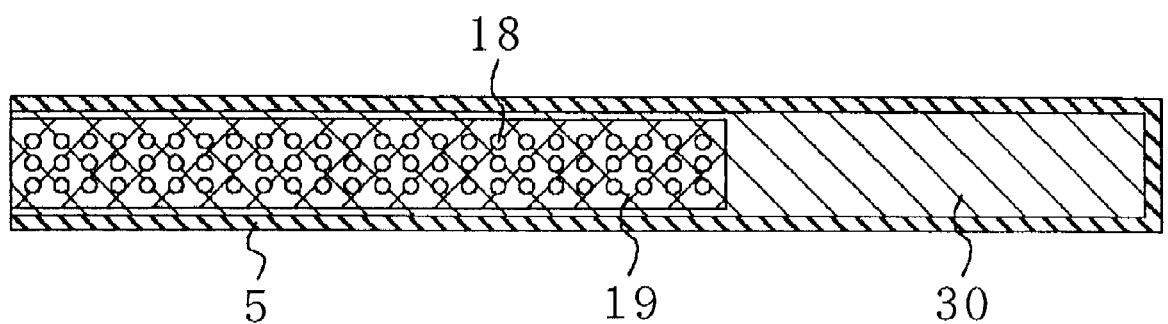
FIG. 17A is a plan view of an example of a gate terminal electrode.
Figure 17B:
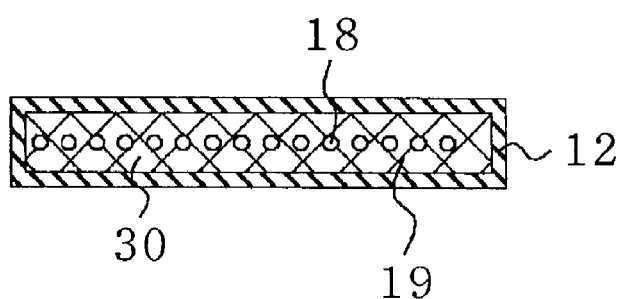
FIG. 17B is a plan view of an example of a data line terminal electrode.

FIG. 17A is a plan view of an example of the gate terminal electrode 4, and FIG. 17B is a plan view of an example of the data line terminal electrode 14.

The gate terminal electrode 4 composed of molybdenum (Mo) which is corroded in atmosphere makes contact with the interlayer contact (first ITO) 19 covering therewith an inner wall of the contact hole 18 formed throughout the passivation film (SiNx) 15 and the first interlayer insulating film 6. Furthermore, by covering the interlayer contact (first ITO) 19 with the ITO film (second ITO) 30, it would be possible to enhance corrosion-resistance of the gate terminal electrode 4.

Figure 18:
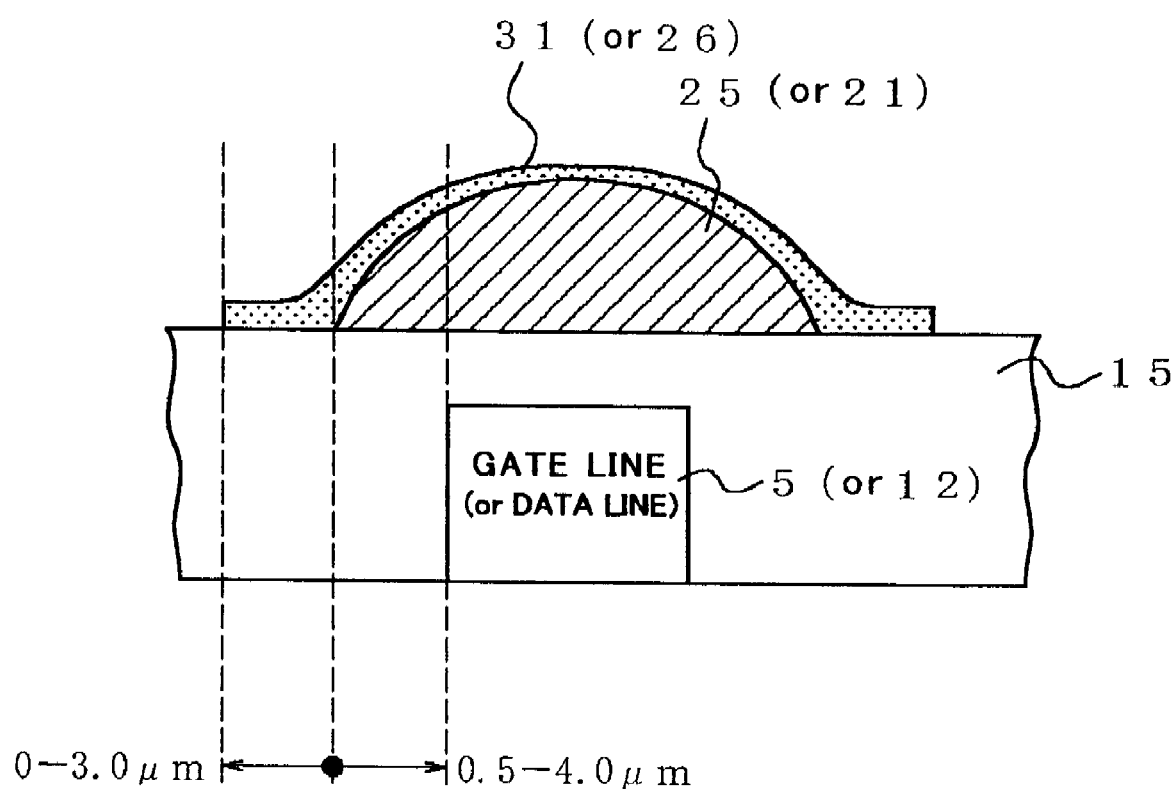
FIG. 18 is a cross-sectional view showing positional relation among an electrically insulating organic layer composed of novolak resin, a gate line shield or a data line shield covering the electrically insulating organic layer therewith, and a gate line or a data line.

FIG. 18 is a cross-sectional view showing positional relation among the electrically insulating organic layer 25 (or 21) composed of novolak resin, a gate line shield 31 (or the data line shield 26) covering the electrically insulating organic layer 25 therewith, and the gate line 5 (or the data line 12).

As illustrated in FIG. 18, the electrically insulating organic layer 25 horizontally extends beyond the gate line 5 by 0.5 to 4.0 micrometers, when vertically viewed from above. Similarly, the electrically insulating organic layer 21 horizontally extends beyond the data line 12 by 0.5 to 4.0 micrometers, when vertically viewed from above.

The gate line shield 31 (or the data line shield 26) horizontally extends beyond the electrically insulating organic layer 25 (or 21) by 0 to 3.0 micrometers, when vertically viewed from above. By so designing the gate line shield 31 (or the data line shield 26), it would be possible to reduce variance in a parasitic capacity between the data line 12 and the data line shield 26 and a parasitic capacity between the gate line 5 and the gate line shield 31, and to sufficiently shield an electric filed leaking out of the data line 12 (or both the data line 12 and the gate line 5).

In addition, since the electrically insulating organic layer 25 (or 21) is entirely covered with the gate line shield (ITO shield) 31 (or the data line shield 26), the electrically insulating organic layer 25 (or 21) is no longer exposed to ITO etchant and resist-peeling solution. This prevents the electrically insulating organic layer 25 (or 21) from being degraded by chemicals.

An electrically insulating organic layer composed of novolak typically has a dielectric constant of about 4.2, which is about two-thirds of a dielectric constant of a silicon nitride (SiNx) film. Hence, the electrically insulating organic layer 25 (or 21) can reduce a parasitic capacity in a smaller thickness than a thickness of a silicon nitride (SiNx) film.

Since the data line shield 26 composed of ITO and constituting a common electrode is arranged just above the data line 12 such that the data line shield 26 overlaps the data line 12 with the second interlayer insulating film 15 and the electrically insulating organic layer 21 being arranged therebetween, electric lines of force derived from the data line 12 can be terminated. Thus, it is possible to prevent electric lines of force generated at the data line 12, from entering the pixel electrode 13.

If there is formed a high parasitic capacity between the data line 12 and the data line shield 26, there would be caused problems of signal delay and an increase in power consumption. By designing the electrically insulating organic layer 21 composed mainly of novolak resin to have a greater thickness than a thickness of the second interlayer insulating film 15 for reducing the above-mentioned parasitic capacity, those problems can be solved.

Since electric lines of force generated at the data line 12 are terminated by the data line shield 26 arranged just above the data line 12, it is possible to arrange the pixel electrode 13 close to the data line 12, ensuring an increase in a numerical aperture.

Eighth Embodiment

Figure 19:
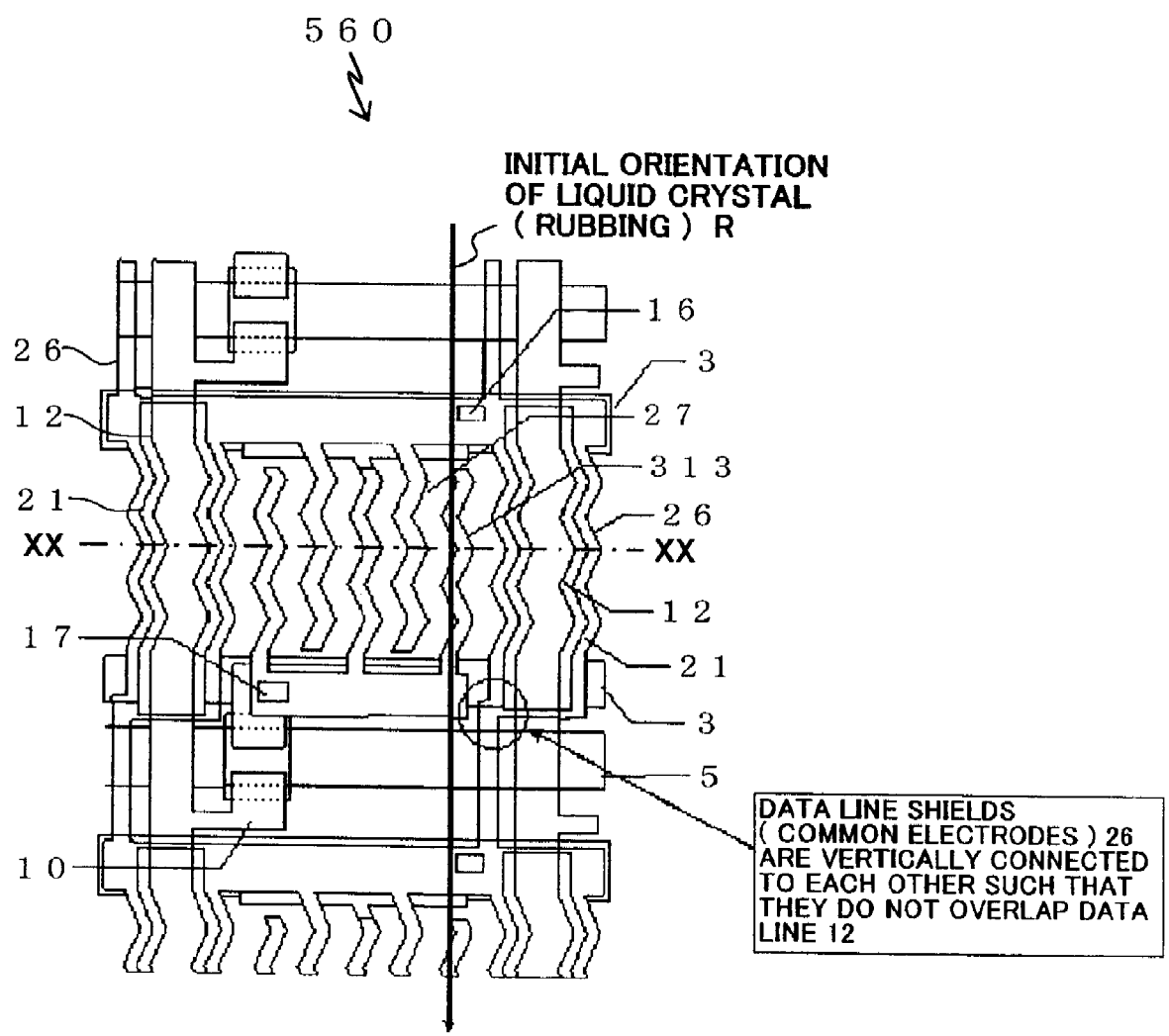
FIG. 19 is a plan view of a TFT substrate on which a thin film transistor (TFT) is fabricated, viewed from liquid crystal, in a liquid crystal display device in accordance with the eighth embodiment of the present invention.
Figure 20:
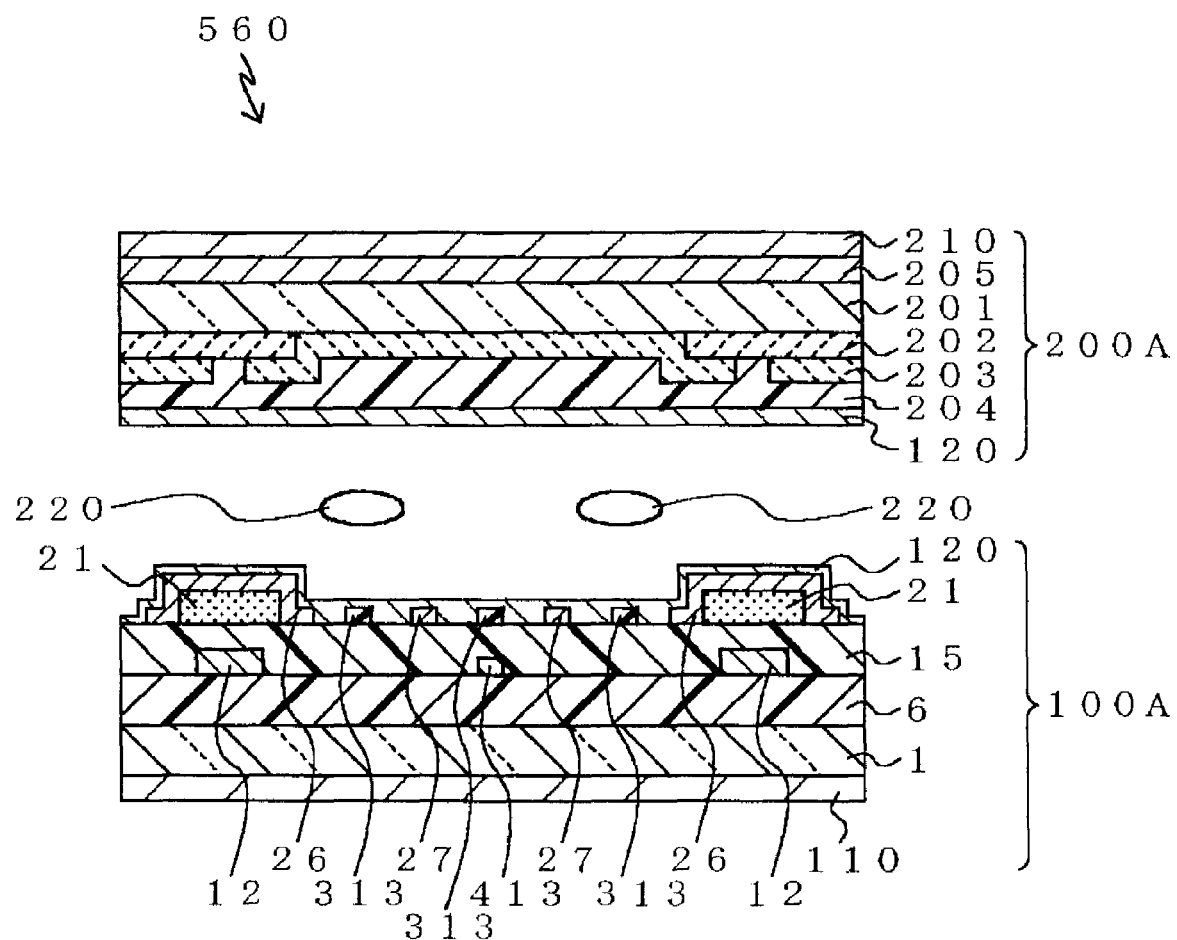
FIG. 20 is a cross-sectional view taken along the line XX-XX in FIG. 19.

FIGS. 19 and 20 illustrate an in-plane switching (IPS) active matrix type liquid crystal display device 560 in accordance with the eighth embodiment of the present invention. FIG. 19 is a plan view of a TFT substrate 100A on which a thin film transistor (TFT) is fabricated, viewed from liquid crystal, in the liquid crystal display device 560, and FIG. 20 is a cross-sectional view taken along the line XV-XV in FIG. 19.

The liquid crystal display device 560 in accordance with the present embodiment is a variant of the liquid crystal display device 540 in accordance with the fifth embodiment, illustrated in FIGS. 12 and 13.

As mentioned earlier, in the liquid crystal display device 540 in accordance with the fifth embodiment, illustrated in FIGS. 12 and 13, the electrically insulating organic layer 21 composed of novolak resin exists only above the data line 12 except an area in which the gate line 5 and the data line 12 intersect with each other, in order to raise an efficiency at which liquid crystal is introduced into a panel.

If the electrically insulating organic layer 21 is formed in the above-mentioned way, it is not possible to arrange the data line shield (common electrode) 26 above the data line 12 in an area in which the gate line 5 and the data line 12 intersect with each other, in order to avoid an increase in a capacity between the data line 12 and the data line shield (common electrode) 26. Accordingly, the data line shield (common electrode) 26 is formed independently for each of the gate lines (scanning lines) 5 in the liquid crystal display device 540 in accordance with the fifth embodiment.

In contrast, in the liquid crystal display device 560 in accordance with the present embodiment, the data line shields (common electrodes) 26 in pixels vertically adjacent to each other are electrically connected to each other such that they do not overlap the data line 12, in an area in which the gate line 5 and the data line 12 intersect with each other. That is, the data line shields (common electrodes) 26 are designed to extend above the data lines 12 so that the data line shields (common electrodes) 26 do not overlap the data lines 12, and the data line shields (common electrodes) 26 in pixels vertically adjacent to each other are electrically connected to each other through an electrically conductive layer formed in the same layer as the data line shields (common electrodes) 26. The liquid crystal display device 560 in accordance with the present embodiment has the same structure as that of the liquid crystal display device 540 in accordance with the fifth embodiment except the above-mentioned structural difference.

The common electrode 27 is arranged so as not to overlap the pixel electrode 313.

The liquid crystal display device 560 in accordance with the present embodiment provides the following advantages.

For instance in a large-scaled and highly accurate panel such as a panel having a diagonal line of 18 inches or more, it would be unavoidable to have a high time constant defined by a resistance Rc of the common electrode line 3 and a capacity Cp formed between the pixel electrode 13 and the common electrode 27 in each of pixels. As a result, in pixels into which signals are written through a certain gate line (scanning line) 5, voltages of the pixel electrodes 13 concurrently drop at a fall-down of a voltage of the certain gate line (scanning line) 5 due to capacitive coupling with a capacity of the gate line 5 (mainly, a parasitic capacity of a transistor). When the voltages drop, a voltage of the common electrode line 3 also drops due to the capacity Cp, resulting in that a delay is caused in the common electrode line 3 in accordance with a time constant proportional to a product of the resistance Rc and the capacity Cp.

If a delay is caused in the common electrode line 3, a voltage of the pixel electrode 13 instantaneously drops to a higher degree, resulting in a higher difference between a voltage of the data line 12 and a voltage of the pixel electrode 13 at a fall-down of a voltage of the gate line (scanning line) 5.

Since a delay is caused also in the gate line (scanning line) 5, if there is caused a difference between a voltage of the data line 12 and a voltage of the pixel electrode 13, electric charges run into the pixel electrode 13 from the data line 12, namely, signals are rewritten into the pixel electrode 13 before the gate line (scanning line) 5 turns completely off. Due to reduction in a voltage of the common electrode 27 caused by the delay in the common electrode line 3, signals are rewritten into the pixel electrode 13 to a high degree.

As a result, when a delay in the common electrode line 3 restores to a designed delay in a certain period of time, a voltage of the pixel electrode 13 becomes higher than an initial voltage. Hence, an average voltage among the pixel electrodes 13 is equal to a voltage of the common electrode 27 with a voltage of the common electrode 27 being high, and thus, there is not generated a DC voltage between those voltages. This ensures that flickers and after-images are suppressed.

Figure 21A:
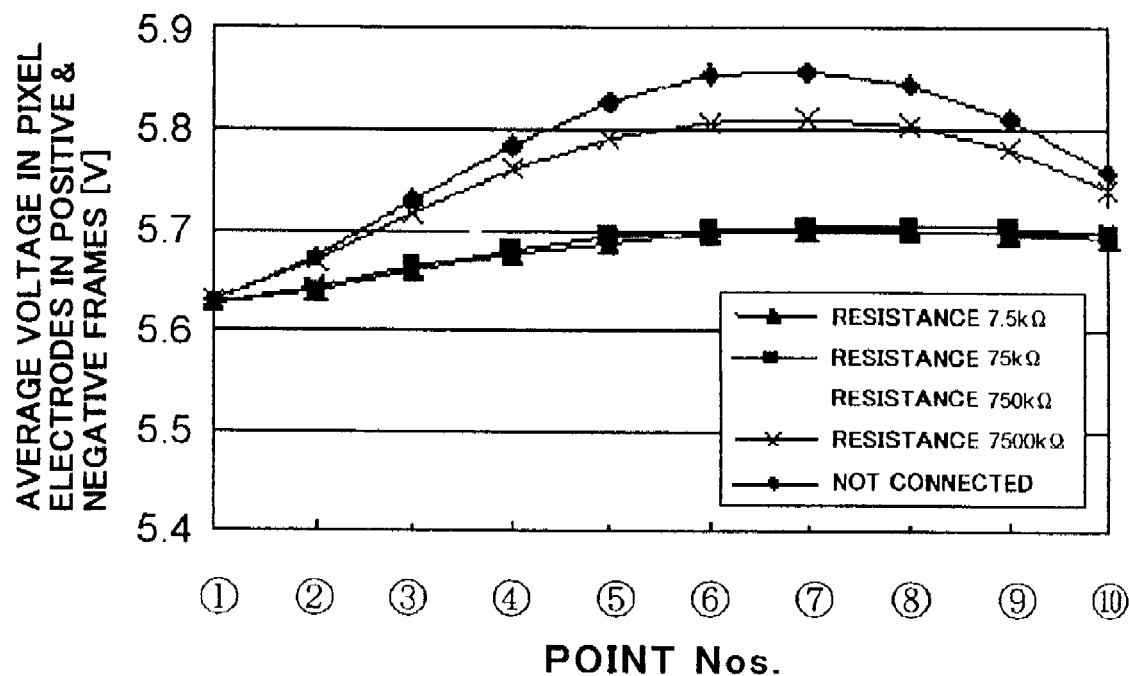
FIG. 21A is a graph showing a field-through voltage difference defined as an average of voltages of pixel electrodes in a panel in a direction in which a gate line or a scanning line extends in a 19-inch-sized SXGA panel fabricated as an sample.
Figure 21B:
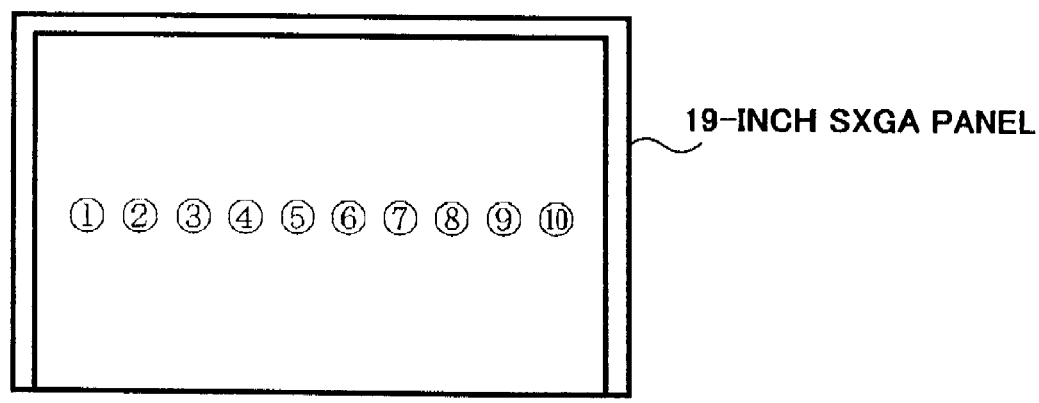
FIG. 21B is a plan view showing points at which field-through voltages were measured in the 19-inch-sized SXGA panel.

FIG. 21A is a graph showing a field-through voltage difference defined as an average of voltages of the pixel electrodes 13 in a panel in a direction in which the gate line (scanning line) 5 extends in a 19-inch-sized SXGA panel having been fabricated as an sample, and FIG. 21B is a plan view showing points at which field-through voltages were measured in the 19-inch-sized SXGA panel.

A field-through voltage difference illustrated in FIG. 21A indicates a variance of field-through voltages in a panel as a profile of an average of voltages of pixel electrode in positive and negative frames.

When the data line shields (common electrodes) 26 in pixels vertically adjacent to each other are not electrically connected to each other, for instance, in the liquid crystal display device 540 in accordance with the fifth embodiment, illustrated in FIGS. 12 and 13, an average voltage of the pixel electrodes 13 much vary in a panel along the gate line (scanning line) 5, as shown with plots "not vertically connected". As a result, it would be difficult to uniformly suppress flickers in a panel.

In contrast, the data line shields (common electrodes) 26 in pixels vertically adjacent to each other are electrically connected to each other in the liquid crystal display device 560 in accordance with the present embodiment. Hence, the data line shields (common electrodes) 26 are electrically connected to the common electrode line 3 which is electrically connected to a pixel in which a voltage of the gate line (scanning line) 5 does not fluctuate, ensuring that the above-mentioned reduction in a voltage of the common electrode line 3 is significantly suppressed.

The inventors conducted the experiment in which a resistance observed when the data line shields (common electrodes) 26 in pixels vertically adjacent to each other were electrically connected to each other was changed as shown in FIG. 21A, and an average voltage of the pixel electrodes 13 was measured. It was found that if the resistance was equal to or smaller than 750 kΩ per a pixel, it was possible to significantly suppress a variance of an average voltage of the pixel electrodes 13 in a direction in which the gate line (scanning line) 5 extends.

That is, it is understood in view of FIG. 21A that the arrangement of the data line shield (common electrode) 26 in a matrix reduces a variance of a field-through voltage in a panel, and that such a variance can be reduced when a resistance observed when the data line shields (common electrodes) 26 in pixels vertically adjacent to each other are electrically connected is equal to or smaller than 750 kΩ per a pixel.

By suppressing a delay in the common electrode 27, it would be possible to suppress a delay in the common electrode line 3 while the gate line (scanning line) 5 is on. This ensures suppression of lateral cross-talk.

In the liquid crystal display device 560, the data line shields (common electrodes) 26 in pixels vertically adjacent to each other are electrically connected to each other such that they do not overlap the data line 12 in the vicinity of an area in which the gate line 5 on which the electrically insulating organic layer 21 is not formed and the data line 12 intersect with each other. Hence, a capacity between the data line 12 and the data line shield (common electrode) 26 is not increased. Accordingly, a delay in the data line 12 and a delay in the common electrode line 3 are not increased, ensuring high quality in displaying images.

Ninth Embodiment

Figure 22:
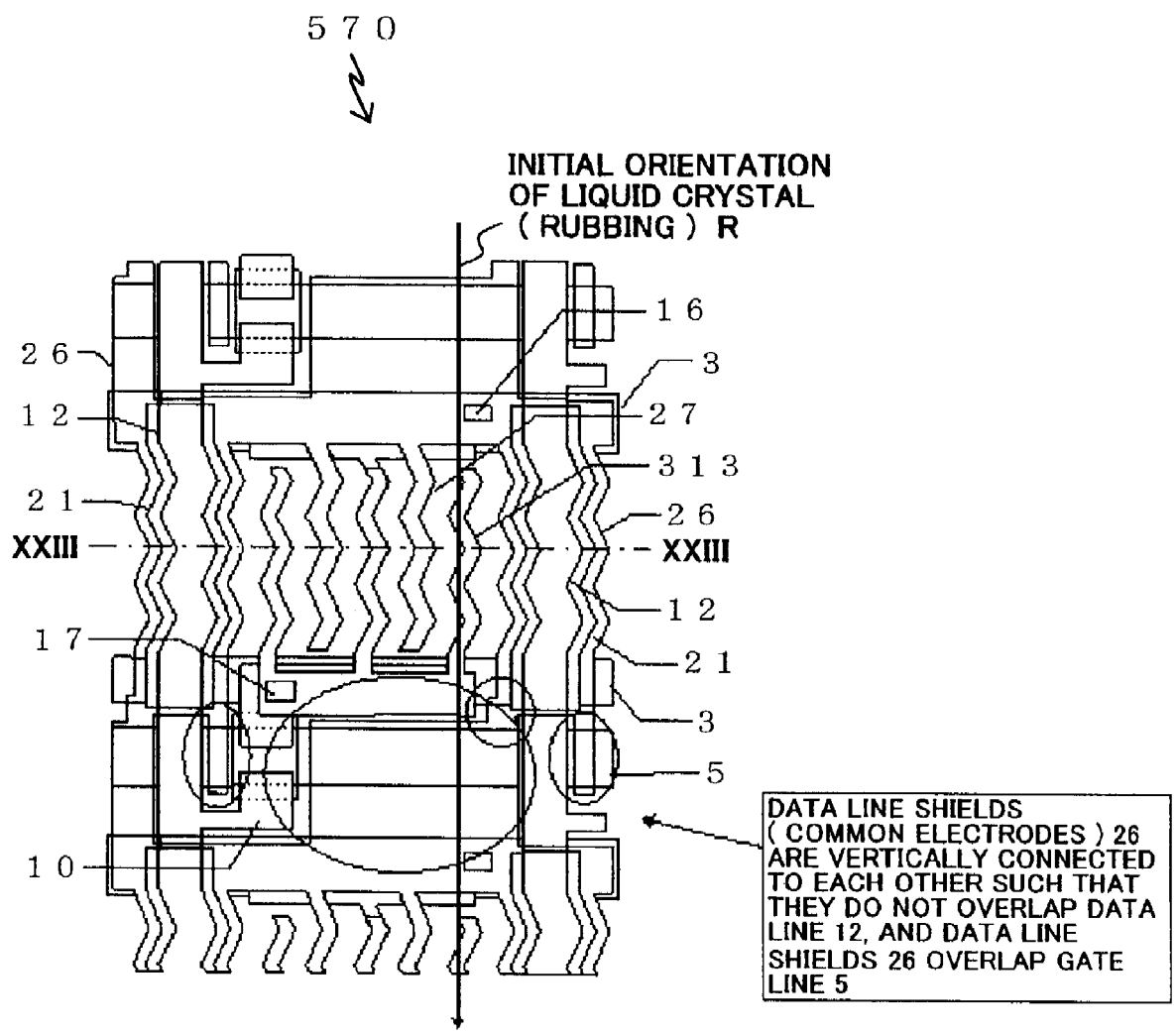
FIG. 22 is a plan view of a TFT substrate on which a thin film transistor (TFT) is fabricated, viewed from liquid crystal, in a liquid crystal display device in accordance with the ninth embodiment of the present invention.
Figure 23:
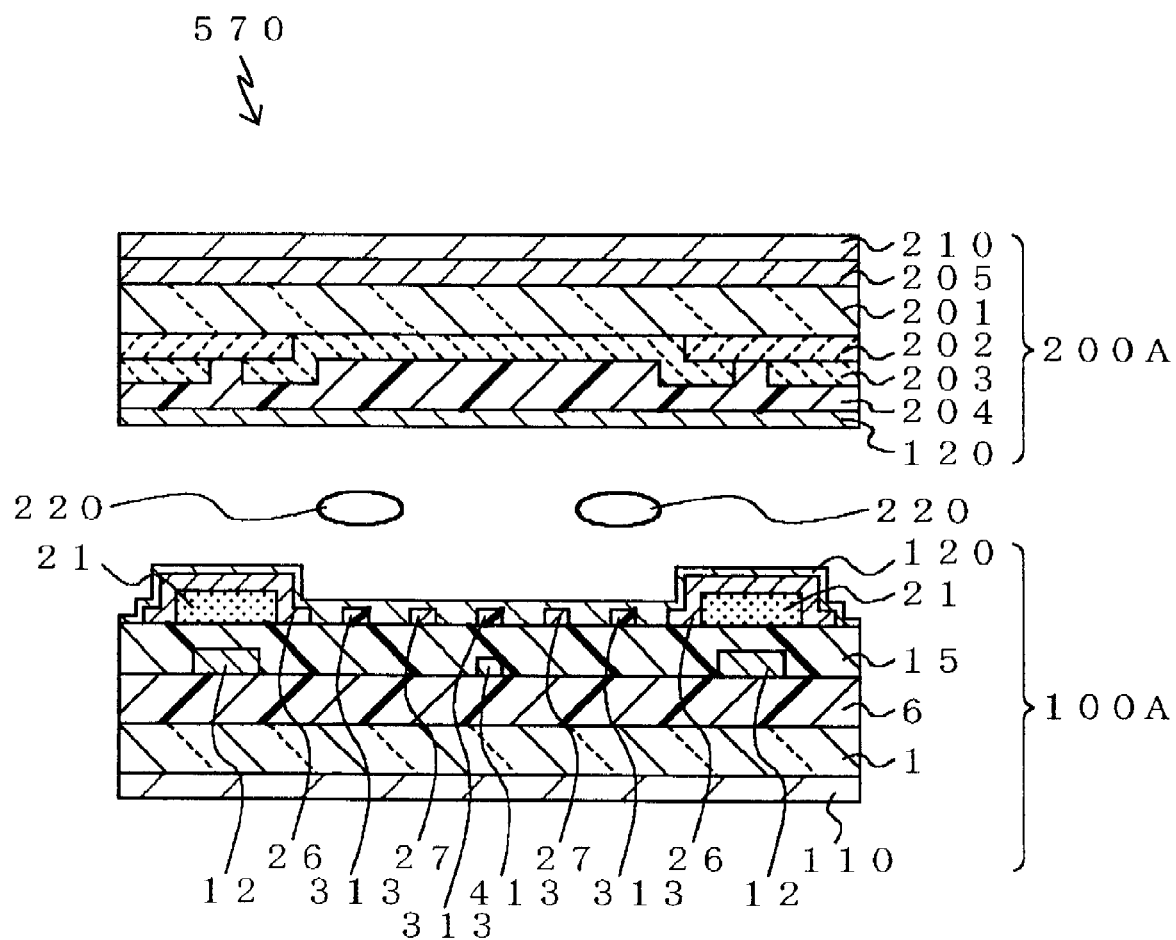
FIG. 23 is a cross-sectional view taken along the line XXIII-XXIII in FIG. 22.

FIGS. 22 and 23 illustrate an in-plane switching (IPS) active matrix type liquid crystal display device 570 in accordance with the ninth embodiment of the present invention. FIG. 22 is a plan view of a TFT substrate 100A on which a thin film transistor (TFT) is fabricated, viewed from liquid crystal, in the liquid crystal display device 570, and FIG. 23 is a cross-sectional view taken along the line XXIII-XXIII in FIG. 22.

In the liquid crystal display device 570 in accordance with the present embodiment, similarly to the liquid crystal display device 560 in accordance with the eighth embodiment, the data line shields (common electrodes) 26 in pixels vertically adjacent to each other are electrically connected to each other such that they do not overlap the data line 12. In addition, an area (hereinbelow, referred to as "connection area") in which the data line shields (common electrodes) 26 are electrically connected to each other is enlarged, and the thus enlarged area overlap the gate line 5. The liquid crystal display device 570 in accordance with the present embodiment has the same structure as that of the liquid crystal display device 540 in accordance with the fifth embodiment except the above-mentioned structural difference.

The liquid crystal display device 570 in accordance with the present embodiment provides the following advantages.

In the liquid crystal display device 570 in accordance with the present embodiment, the data line shields (common electrodes) 26 in pixels vertically adjacent to each other are electrically connected to each other, and the connection area having the same voltage as that of the data line shield (common electrode) 26 overlaps the gate line 5.

Thus, it is possible to reduce a delay in the common electrode line 3, and further reduce capacitive coupling between the gate line 5 and the black matrix layer 202. As a result, it is possible to prevent a voltage of the black matrix layer 202 from being biased to a negative voltage due to a negative voltage generated when the gate line 5 is off. Accordingly, it is possible to solve a problem of after-images and so on caused by fluctuation in a voltage of the black matrix layer 202 away from a voltage of the data line shield (common electrode) 26.

According to the experiments the inventors conducted, if the connection area having the same voltage as that of the data line shield (common electrode) 26 overlaps the gate line 5 not overlapped by other electrically conductive layers, by 60% or more, there was obtained remarkable advantages.

Since the data line shields (common electrodes) 26 in pixels vertically adjacent to each other are electrically connected to each other such that they do not overlap the data line 12, in the vicinity of an area in which the gate line 5 and the data line 12 intersect with each other in the liquid crystal display device 570 in accordance with the present embodiment, it is possible to prevent an increase in a capacity between the data line 12 and the data line shield (common electrode) 26. Accordingly, a delay in the data line 12 and a delay in the common electrode line 3 are not increased, ensuring high quality in displaying images.

In the liquid crystal display devices 500, 510, 520, 530, 540, 550, 560 and 570 in accordance with the first to sixth, eighth and ninth embodiments, an interlayer insulating film is comprised of the electrically insulating organic layer 21 composed of novolak resin.

Figure 24:
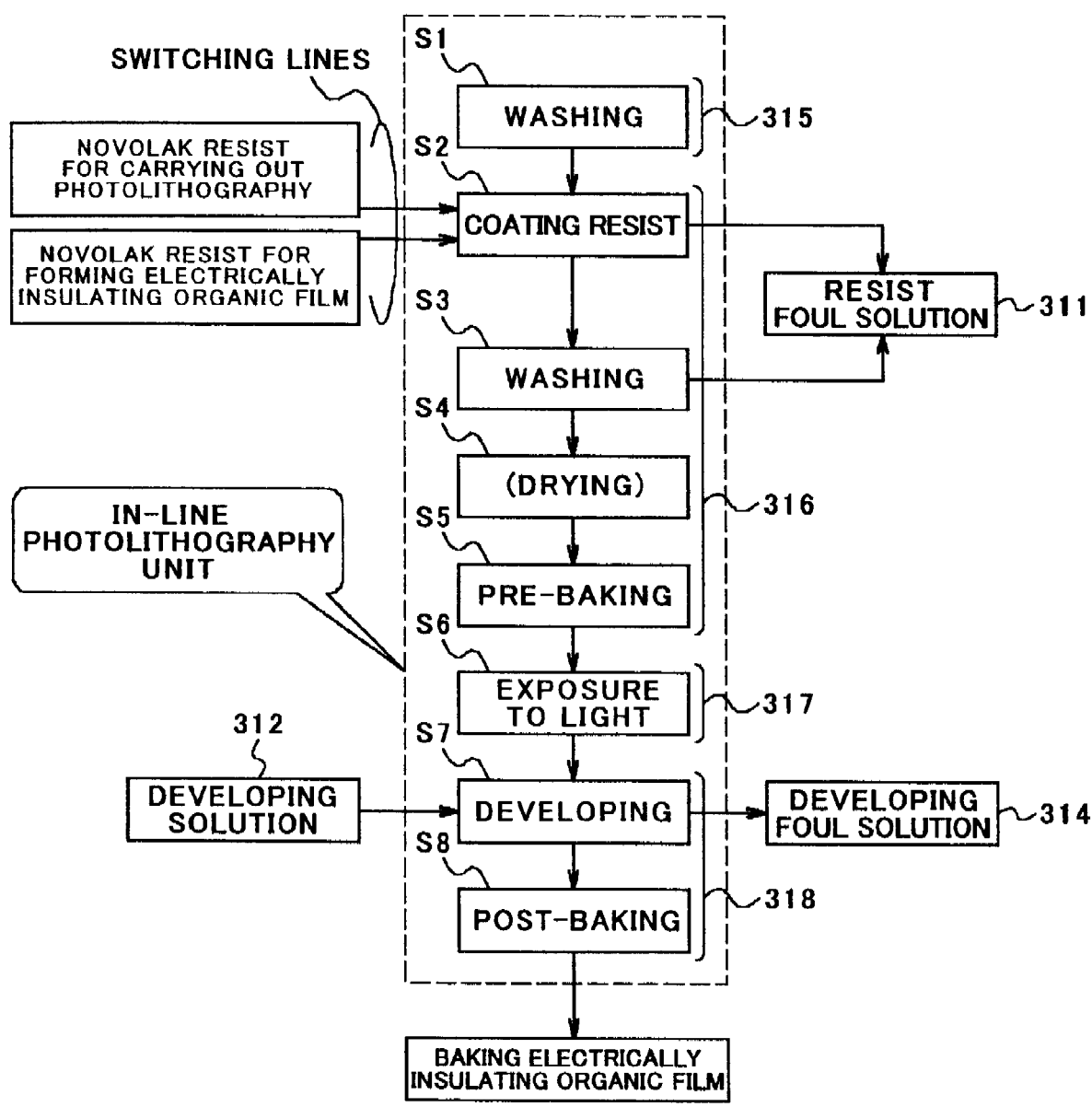
FIG. 24 is a flow-chart showing steps of fabricating an electrically insulating organic film composed of novolak resin.
Figure 25:
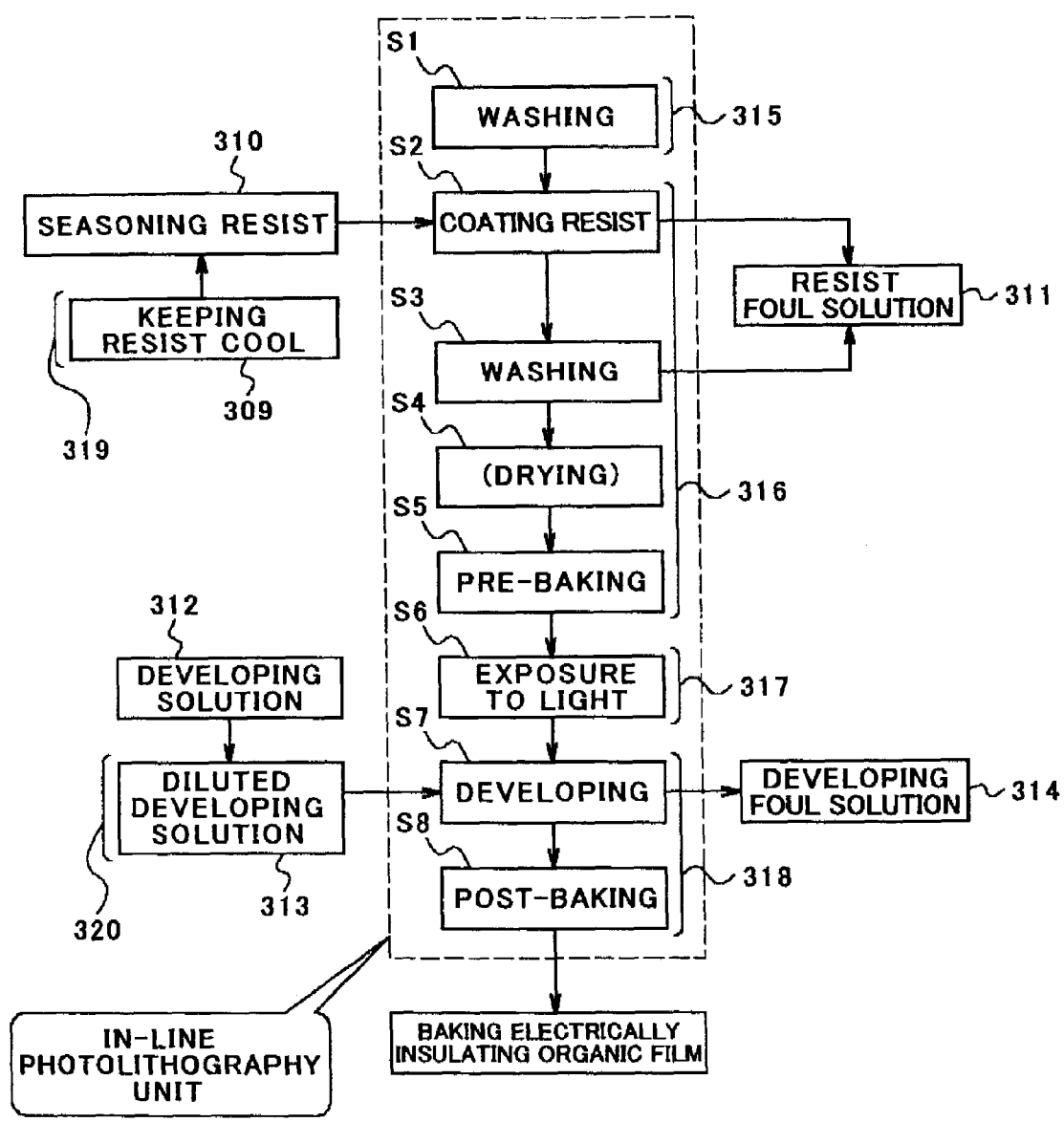
FIG. 25 is a flow-chart showing steps of fabricating an electrically insulating organic film composed of acrylic resin.

FIG. 24 is a flow-chart showing steps of fabricating an electrically insulating organic film composed of novolak resin, and FIG. 25 is a flow-chart showing steps of fabricating an electrically insulating organic film composed of acrylic resin.

Hereinbelow are explained advantages obtained by an interlayer insulating film comprised of the electrically insulating organic layer 21 composed of novolak resin, in comparison with an interlayer insulating film comprised of an electrically insulating organic film composed of acrylic resin, with reference to FIGS. 24 and 25.

As illustrated in FIGS. 24 and 25, a method of an interlayer insulating film comprised of the electrically insulating organic layer 21 composed of novolak resin and a method of an interlayer insulating film comprised of an electrically insulating organic film composed of acrylic resin have common basic steps. First, the basic steps are explained hereinbelow.

First, an object is washed by means of a washing unit 315 before resist is coated onto the object, in step S1.

Then, resist is coated onto the object in step S2. Resist is usually automatically coated onto the object by means of an in-line type photolithography unit. An in-line type photolithography unit usually has a first line through which novolak resist used for photolithography is coated onto an object, and a second line through which novolak resist used for forming an organic film is coated onto an object. When an electrically insulating organic film composed of novolak resin is to be formed, resist is coated onto an object through the second line. When an electrically insulating organic film composed of acrylic resin is to be formed, resist 309 having been kept cool in a refrigerator 319 is seasoned, and then, the resist 309 is coated onto an object.

Then, an object onto which resist was coated is washed, in step S3. When the resist is coated onto an object (step S2) and when an object onto which the resist was coated is washed (step S3), foul solution 311 of resist results.

Then, the resist is dried in a reduced pressure, in step S4.

Then, the resist is pre-baked, in step S5.

Coating the resist (step S2), washing an object (step S3), drying the resist (step S4) and pre-baking the resist (step S5) are all carried out by means of a resist-coating unit 316.

Then, the resist is exposed to light in a predetermined pattern by means of an exposure unit 317, in step S6.

Then, the thus light-exposed resist is developed by developing solution 312, in step S7. When the resist used for forming an electrically insulating organic film composed of novolak resin is developed, the developing solution 312 is used as it is. In contrast, when the resist used for forming an electrically insulating organic film composed of acrylic resin is developed, the developing solution 312 is diluted by means of a developing-solution dilution unit 320, and the thus diluted developing solution 313 is used for developing the resist.

When the resist is developed, there results foul developing solution 314.

Then, the developed resist is post-baked, in step S8. Exposing the resist to light (step S7) and post-baking the resist (step S8) are carried out by means of a developing unit 318.

As mentioned above, an electrically insulating organic film is patterned by photolithography and etching in the formation of both an electrically insulating organic film composed of novolak resin and an electrically insulating organic film composed of acrylic resin.

Resist composed of novolak resin is usually used in photolithography. If novolak resist used for carrying out photolithography and acrylic resist used for forming an electrically insulating organic film are mixed together, they may be solidified. Hence, when an electrically insulating organic film is formed through the use of acrylic resist, coating resist (step S2) and washing an object (step S3) have to be carried out separately between novolak resist and acrylic resist, and the foul solution 311 of novolak resist and the foul solution 311 of acrylic resist have to be separated from each other.

In addition, since developing solution for developing novolak resist usually has a concentration different from a concentration of developing solution for developing acrylic resist, two developing solutions having different concentrations from each other have to be prepared.

Furthermore, if foul developing solution derived from development of acrylic resist and foul developing solution derived from development of novolak resist are mixed with each other in the resist-developing step (step S7), they may be solidified. Hence, when an electrically insulating organic film is formed through the use of acrylic resist, developing resist has to be carried out separately between novolak resist and acrylic resist, and the diluted developing solution 313 and the foul developing solution 314 both for novolak resist have to be separated from those for acrylic resist.

On the other hand, since novolak resist used for carrying out photolithography and novolak resist used for forming an electrically insulating organic film are both composed mainly of novolak resin, a photolithography unit can be commonly used for carrying out photolithography and forming an electrically insulating organic film. Hence, it is not necessary to prepare an expensive photolithography unit used for forming an electrically insulating organic film. A photolithography unit used for carrying out photolithography may be used also for forming an electrically insulating organic film.

In addition, since acrylic resist is much degraded at room temperature, specifically, viscosity of acrylic resist raises at room temperature, it is necessary to prepare the refrigerator 309 only for acrylic resist. In contrast, novolak resist is not necessary to be kept in a refrigerator.

Furthermore, it is necessary to prepare a disposal unit only for acrylic foul solution. Hence, disposal of acrylic foul solution costs too much in comparison with disposal of novolak foul solution.

As mentioned above, the use of an interlayer insulating film comprised of an electrically insulating organic film composed of novolak resin provides many advantages in comparison with an interlayer insulating film comprised of an electrically insulating organic film composed of acrylic resin.

Tenth Embodiment

Hereinbelow are explained examples of a TFT substrate which is capable of preventing metal from being corroded in atmosphere in an active matrix type liquid crystal display device including an interlayer insulating film comprised of an electrically insulating organic film composed of novolak resin, and a layer formed below the interlayer insulating film which layer is composed of metal, such as molybdenum (Mo), having a relatively low resistance and readily being corroded in atmosphere.

FIRST EXAMPLE

Figure 26:
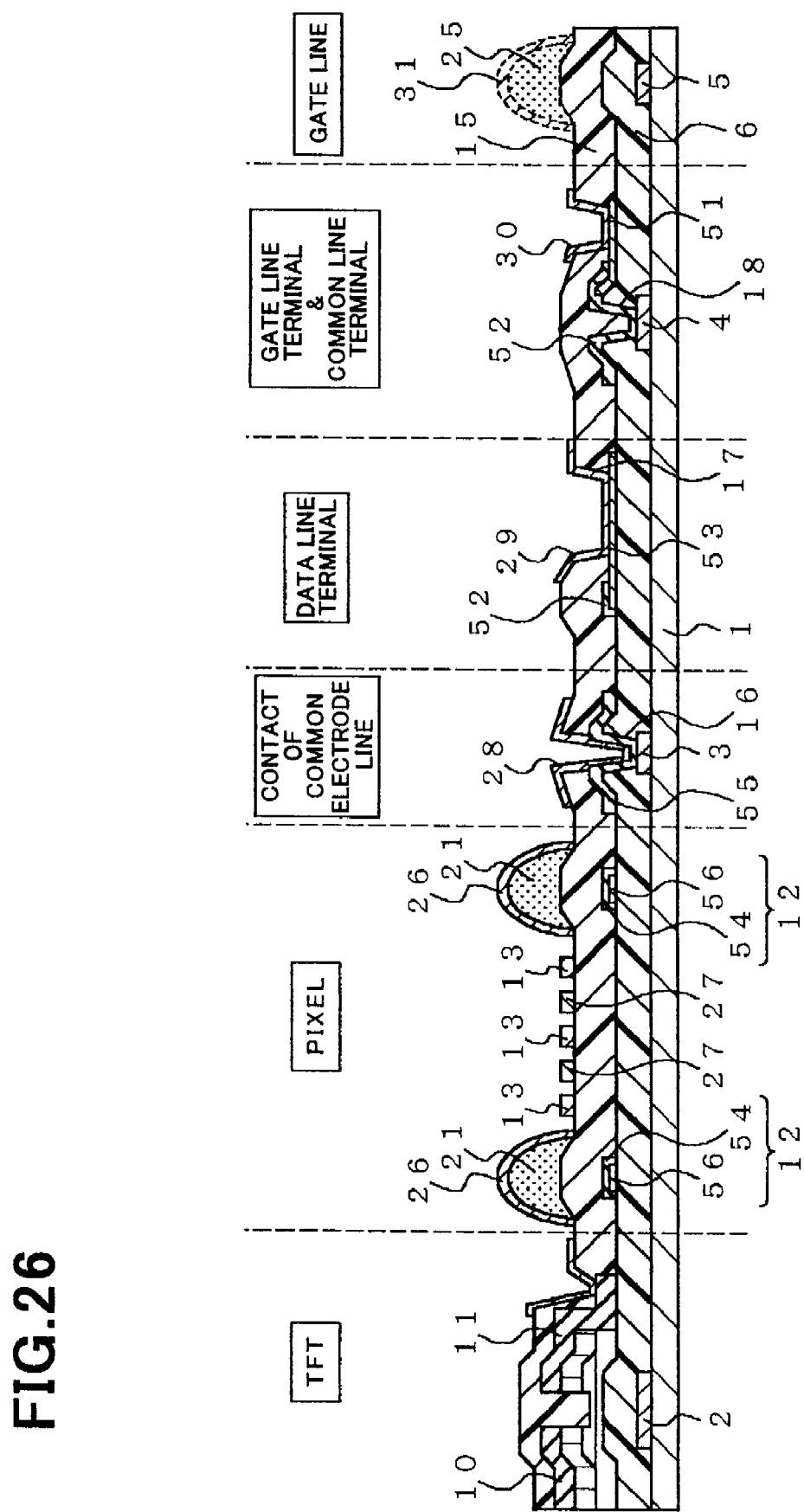
FIG. 26 is a cross-sectional view of a first example of a TFT substrate in an in-plane switching active matrix type liquid crystal display device which is capable of preventing corrosion of metal which is corroded in atmosphere.

FIG. 26 is a cross-sectional view of a first example of a TFT substrate in an in-plane switching active matrix type liquid crystal display device which is capable of preventing corrosion of metal which is corroded in atmosphere.

A thin film transistor (TFT) in the examples explained hereinbelow is a reverse-stagger type TFT.

In the TFT substrate in accordance with the first example, the data line 12 is comprised of an underlying ITO film (first electrically conductive transparent film) 56 and an overlapping metal film (drain metal film) 54. Above the data line 12 is formed a first island-shaped electrically insulating organic film 21 composed of novolak resin, which is shielded by the data line shield (electrically conductive transparent film) 26 constituting a common electrode.

A comb-shaped electrode in the common electrode 27 and a comb-shaped electrode in the pixel electrode 13 are comprised of an electrically conductive transparent film.

A terminal contact 52 composed of molybdenum is integral with a terminal ITO electrode (first electrically conductive transparent film) 53 of a data line terminal which terminal electrode extends from the terminal contact 52, and is entirely covered with the inorganic passivation film 15.

The contact hole 17 is covered with a data terminal ITO film (second electrically conductive transparent film) 29, defining a data line terminal.

A gate terminal electrode 4 composed of molybdenum is electrically connected to a terminal ITO electrode (first electrically conductive transparent film) 51 of a gate line terminal and a common line terminal through the contact hole 18.

A through-hole formed throughout the passivation film 15 above the terminal ITO electrode (first electrically conductive transparent film) 51 is covered at its inner wall with an ITO film (second electrically conductive transparent film) 30, thus defining a gate line terminal/common line terminal. The terminal ITO electrode 53 and the terminal ITO electrode 51 are formed in the same layer, specifically, in an electrically conductive film formed below the data line 12.

The TFT substrate in accordance with the first example can be fabricated by carrying out photolithography eight times.

SECOND EXAMPLE

Figure 27:
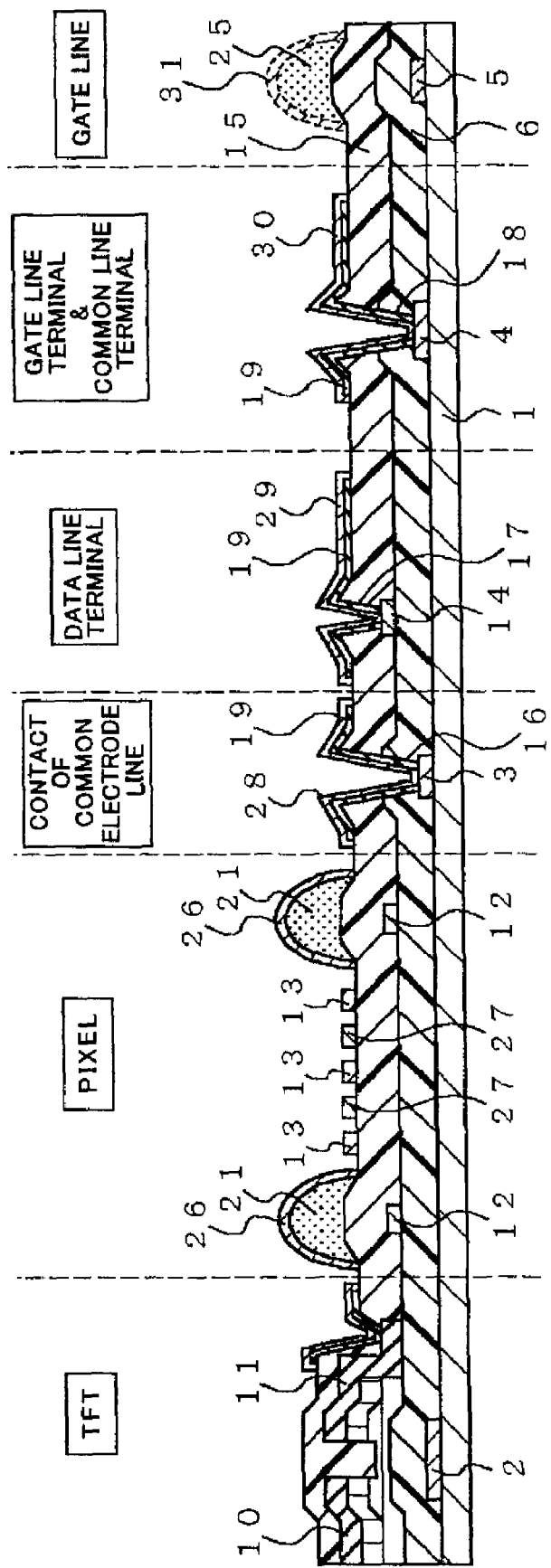
FIG. 27 is a cross-sectional view of a second example of a TFT substrate in an in-plane switching active matrix type liquid crystal display device which is capable of preventing corrosion of metal which is corroded in atmosphere.

FIG. 27 is a cross-sectional view of a second example of a TFT substrate in an in-plane switching active matrix type liquid crystal display device which is capable of preventing corrosion of metal which is corroded in atmosphere.

In the TFT substrate in accordance with the second example, above the data line 12 is formed a first island-shaped electrically insulating organic film 21 composed of novolak resin, which is shielded by the data line shield (electrically conductive transparent film) 26 constituting a common electrode.

A comb-shaped electrode in the common electrode 27 and a comb-shaped electrode in the pixel electrode 13 are comprised of an electrically conductive transparent film. The data line shield (electrically conductive transparent film) 26 and the comb-shaped electrode may be comprised of a first electrically conductive transparent film 19 or a second electrically conductive transparent film 28 (or 29, 30). As an alternative, the data line shield (electrically conductive transparent film) 26 and the comb-shaped electrode may be comprised only of the second electrically conductive transparent film 28 (or 29, 30).

The contact holes 17 and 18 reaching the data line terminal electrode 14 and the gate terminal electrode 4, respectively, are covered at their inner walls with the first electrically conductive transparent film 19, which is covered with the second electrically conductive transparent film 29 or 30. Thus, metal which is corroded in atmosphere can have enhanced corrosion-resistance. The data terminal ITO film (second electrically conductive transparent film) 29 extends from the data line 12 and acts as a terminal electrode of the data line 12, and the gate line terminal/common line terminal (second electrically conductive transparent film) 30 extends from the gate line 5 and acts as a terminal electrode of the gate line 5.

THIRD EXAMPLE

Figure 28:
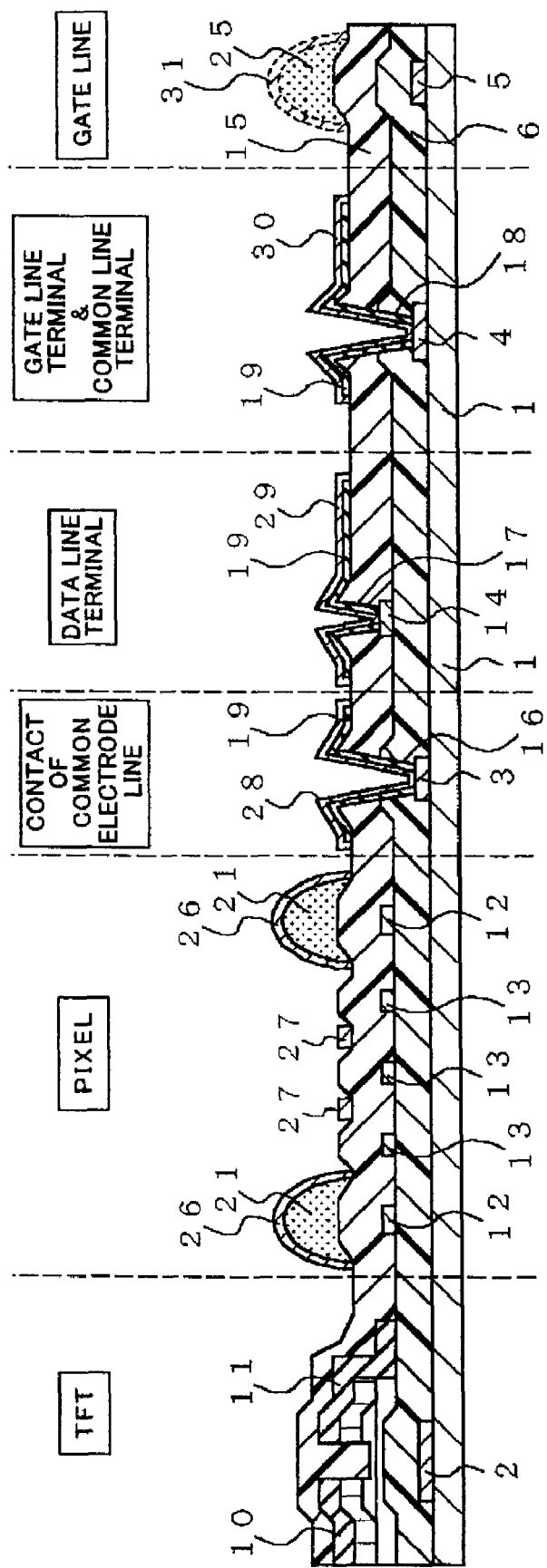
FIG. 28 is a cross-sectional view of a third example of a TFT substrate in an in-plane switching active matrix type liquid crystal display device which is capable of preventing corrosion of metal which is corroded in atmosphere.

FIG. 28 is a cross-sectional view of a third example of a TFT substrate in an in-plane switching active matrix type liquid crystal display device which is capable of preventing corrosion of metal which is corroded in atmosphere.

In the TFT substrate in accordance with the second example, above the data line 12 is formed a first island-shaped electrically insulating organic film 21 composed of novolak resin, which is shielded by the data line shield (electrically conductive transparent film) 26 constituting a common electrode.

A comb-shaped electrode of the pixel electrode 13 is formed in the same layer as the data line 12, and hence, is composed of the same metal as the metal of which the data line 12 is composed. A comb-shaped electrode of the common electrode 27 is comprised of an electrically conductive transparent film of which the data line shield 26 is comprised, on the inorganic passivation film 15.

The contact holes 17 and 18 reaching the data line terminal electrode 14 and the gate terminal electrode 4, respectively, are covered at their inner walls with the first electrically conductive transparent film 19, which is covered with the second electrically conductive transparent film 29 or 30. Thus, metal which is corroded in atmosphere can have enhanced corrosion-resistance.

FOURTH EXAMPLE

Figure 29:
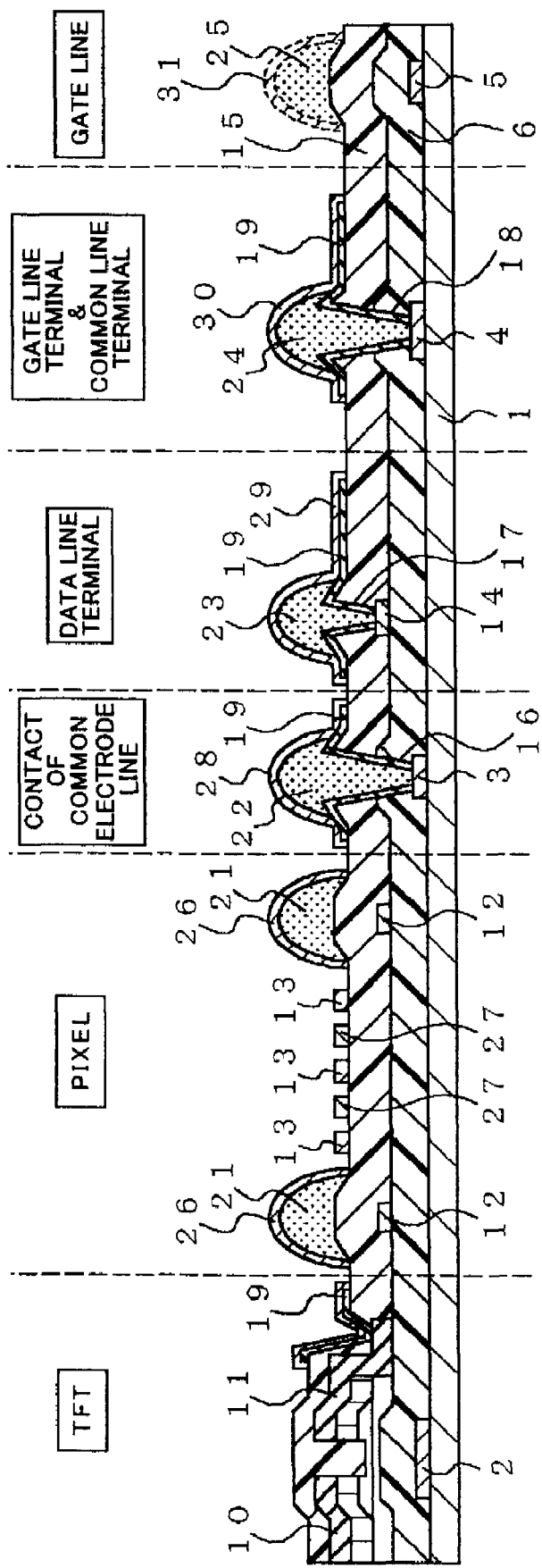
FIG. 29 is a cross-sectional view of a fourth example of a TFT substrate in an in-plane switching active matrix type liquid crystal display device which is capable of preventing corrosion of metal which is corroded in atmosphere.

FIG. 29 is a cross-sectional view of a fourth example of a TFT substrate in an in-plane switching active matrix type liquid crystal display device which is capable of preventing corrosion of metal which is corroded in atmosphere.

In the TFT substrate in accordance with the second example, above the data line 12 is formed a first island-shaped electrically insulating organic film 21 composed of novolak resin, which is shielded by the data line shield (electrically conductive transparent film) 26 constituting a common electrode.

A comb-shaped electrode in the common electrode 27 and a comb-shaped electrode in the pixel electrode 13 are comprised of an electrically conductive transparent film. The data line shield (electrically conductive transparent film) 26 and the comb-shaped electrode are comprised only of the second electrically conductive transparent film 28 (or 29, 30).

The contact hole 16 is formed throughout the first interlayer insulating inorganic film 6 and the second interlayer insulating inorganic film 15, and is covered at its inner wall with the first electrically conductive transparent film 19 to thereby define an interlayer contact. Then, the contact hole 16 covered by the first electrically conductive transparent film 19 is filled with an electrically insulating organic film 22 composed of novolak resin, which is covered with a second electrically conductive transparent film 28.

At the gate line terminal, the contact hole 18 is formed throughout the first interlayer insulating inorganic film 6 and the second interlayer insulating inorganic film 15 above the gate terminal electrode 4, and is covered at its inner wall with the first electrically conductive transparent film 19 to thereby define an interlayer contact. In order to prevent metal such as molybdenum from being corroded in atmosphere, the contact hole 18 covered by the first electrically conductive transparent film 19 is filled with an electrically insulating organic film 24 composed of novolak resin, which is covered with a second electrically conductive transparent film 30.

At the data line terminal, the contact hole 17 is formed throughout the inorganic passivation film 15 above the data line terminal electrode 4, and is covered at its inner wall with the first electrically conductive transparent film 19 to thereby define an interlayer contact. In order to prevent metal such as molybdenum from being corroded in atmosphere, the contact hole 17 covered by the first electrically conductive transparent film 19 is filled with an electrically insulating organic film 23 composed of novolak resin, which is covered with a second electrically conductive transparent film 29.

Hereinbelow, the electrodes 19 comprised of the first electrically conductive transparent film at the data line terminal, the gate line terminal and the common electrode terminal are called a data line terminal underlying electrode, a gate line terminal underlying electrode, and a common electrode terminal underlying electrode, respectively.

FIFTH EXAMPLE

Figure 30:
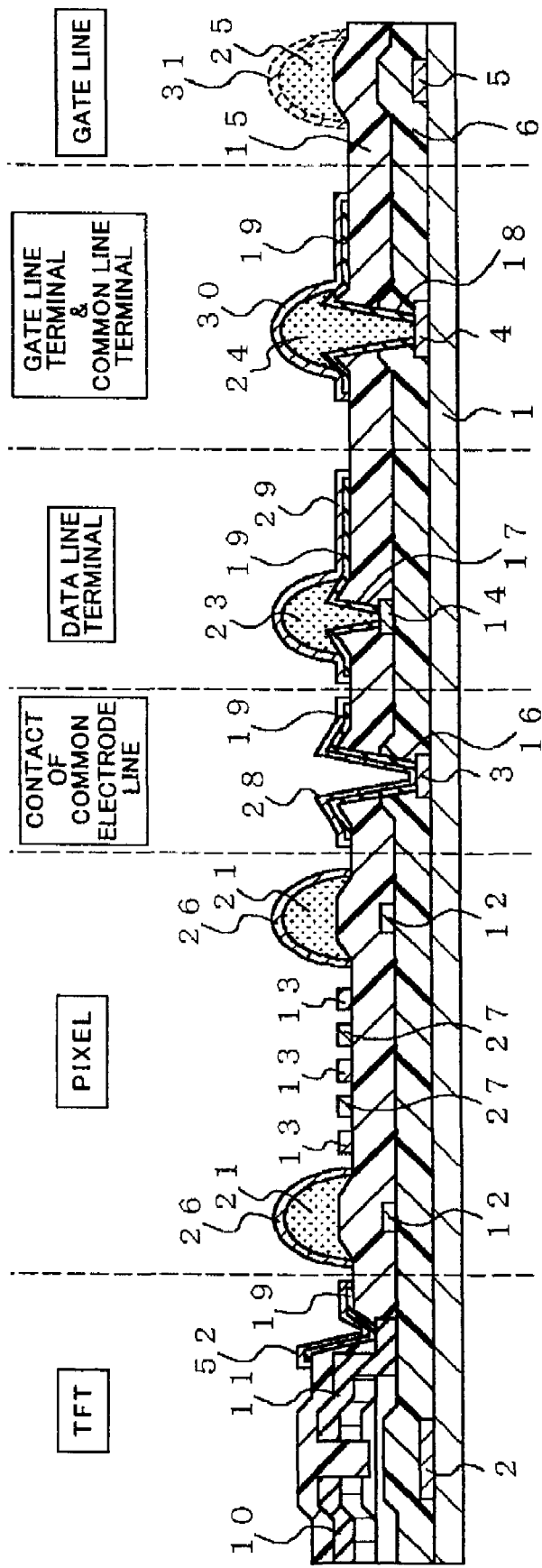
FIG. 30 is a cross-sectional view of a fifth example of a TFT substrate in an in-plane switching active matrix type liquid crystal display device which is capable of preventing corrosion of metal which is corroded in atmosphere.

FIG. 30 is a cross-sectional view of a fifth example of a TFT substrate in an in-plane switching active matrix type liquid crystal display device which is capable of preventing corrosion of metal which is corroded in atmosphere.

In the TFT substrate in accordance with the second example, above the data line 12 is formed a first island-shaped electrically insulating organic film 21 composed of novolak resin, which is shielded by the data line shield (electrically conductive transparent film) 26 constituting a common electrode.

A comb-shaped electrode in the common electrode 27 and a comb-shaped electrode in the pixel electrode 13 are comprised of an electrically conductive transparent film. The data line shield (electrically conductive transparent film) 26 and the comb-shaped electrode are comprised only of the second electrically conductive transparent film 28 (or 29, 30).

The contact hole 16 formed in association with a common electrode is covered at its inner wall with the first electrically conductive transparent film 19, which is covered with a second electrically conductive transparent film 28.

At the gate line terminal, the contact hole 18 is formed throughout the first interlayer insulating inorganic film 6 and the second interlayer insulating inorganic film 15 above the gate terminal electrode 4, and is covered at its inner wall with the first electrically conductive transparent film 19 to thereby define an interlayer contact. In order to prevent metal such as molybdenum from being corroded in atmosphere, the contact hole 18 covered by the first electrically conductive transparent film 19 is filled with an electrically insulating organic film 24 composed of novolak resin, which is covered with a second electrically conductive transparent film 30.

At the data line terminal, the contact hole 17 is formed throughout the inorganic passivation film 15 above the data line terminal electrode 4, and is covered at its inner wall with the first electrically conductive transparent film 19 to thereby define an interlayer contact. In order to prevent metal such as molybdenum from being corroded in atmosphere, the contact hole 17 covered by the first electrically conductive transparent film 19 is filled with an electrically insulating organic film 23 composed of novolak resin, which is covered with a second electrically conductive transparent film 29.

SIXTH EXAMPLE

Figure 31:
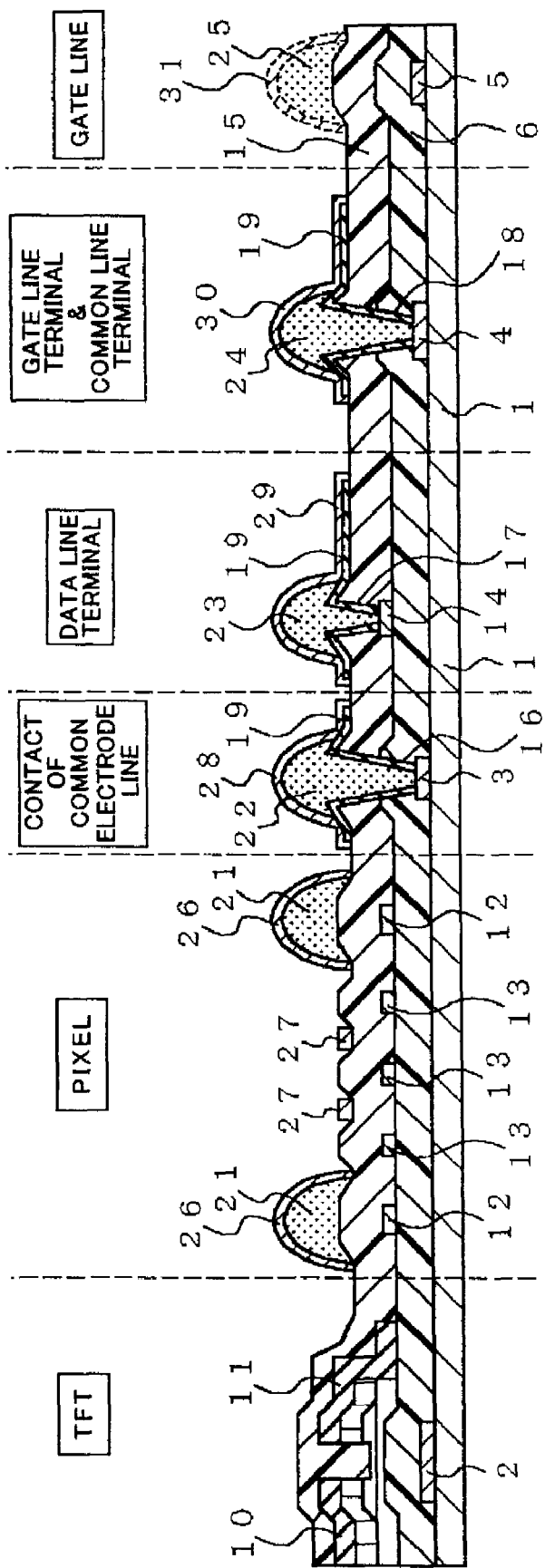
FIG. 31 is a cross-sectional view of a sixth example of a TFT substrate in an in-plane switching active matrix type liquid crystal display device which is capable of preventing corrosion of metal which is corroded in atmosphere.

FIG. 31 is a cross-sectional view of a sixth example of a TFT substrate in an in-plane switching active matrix type liquid crystal display device which is capable of preventing corrosion of metal which is corroded in atmosphere.

In the TFT substrate in accordance with the second example, above the data line 12 is formed a first island-shaped electrically insulating organic film 21 composed of novolak resin, which is shielded by the data line shield (electrically conductive transparent film) 26 constituting a common electrode.

A comb-shaped electrode of the pixel electrode 13 is formed in the same layer as the data line 12, and hence, is composed of the same metal as the metal of which the data line 12 is composed. A comb-shaped electrode of the common electrode 27 is comprised of an electrically conductive transparent film of which the data line shield 26 is comprised, on the inorganic passivation film 15.

The contact hole 16 is formed throughout the first interlayer insulating inorganic film 6 and the second interlayer insulating inorganic film 15, and is covered at its inner wall with the first electrically conductive transparent film 19 to thereby define an interlayer contact. Then, in order to prevent metal such as molybdenum from being corroded in atmosphere, the contact hole 16 covered by the first electrically conductive transparent film 19 is filled with an electrically insulating organic film 22 composed of novolak resin, which is covered with a second electrically conductive transparent film 28.

At the gate line terminal, the contact hole 18 is formed throughout the first interlayer insulating inorganic film 6 and the second interlayer insulating inorganic film 15 above the gate terminal electrode 4, and is covered at its inner wall with the first electrically conductive transparent film 19 to thereby define an interlayer contact. In order to prevent metal such as molybdenum from being corroded in atmosphere, the contact hole 18 covered by the first electrically conductive transparent film 19 is filled with an electrically insulating organic film 24 composed of novolak resin, which is covered with a second electrically conductive transparent film 30.

At the data line terminal, the contact hole 17 is formed throughout the inorganic passivation film 15 above the data line terminal electrode 4, and is covered at its inner wall with the first electrically conductive transparent film 19 to thereby define an interlayer contact. In order to prevent metal such as molybdenum from being corroded in atmosphere, the contact hole 17 covered by the first electrically conductive transparent film 19 is filled with an electrically insulating organic film 23 composed of novolak resin, which is covered with a second electrically conductive transparent film 29.

SEVENTH EXAMPLE

Figure 32:
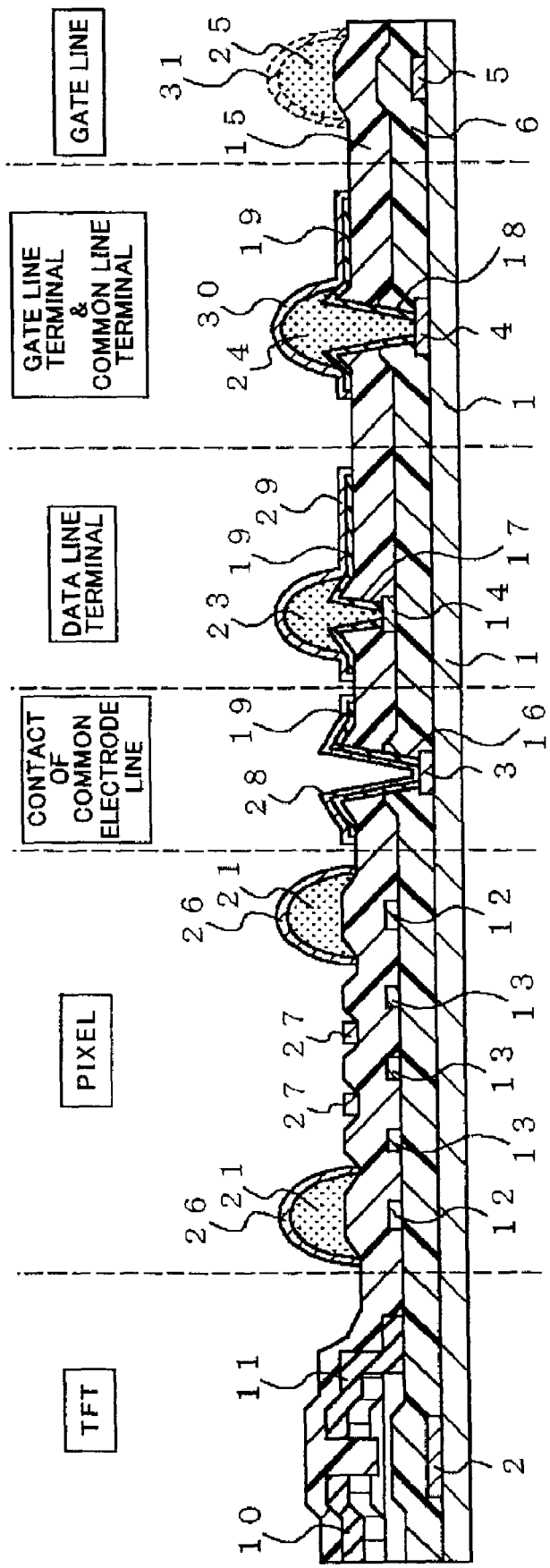
FIG. 32 is a cross-sectional view of a seventh example of a TFT substrate in an in-plane switching active matrix type liquid crystal display device which is capable of preventing corrosion of metal which is corroded in atmosphere.

FIG. 32 is a cross-sectional view of a seventh example of a TFT substrate in an in-plane switching active matrix type liquid crystal display device which is capable of preventing corrosion of metal which is corroded in atmosphere.

In the TFT substrate in accordance with the second example, above the data line 12 is formed a first island-shaped electrically insulating organic film 21 composed of novolak resin, which is shielded by the data line shield (electrically conductive transparent film) 26 constituting a common electrode.

A comb-shaped electrode of the pixel electrode 13 is formed in the same layer as the data line 12, and hence, is composed of the same metal as the metal of which the data line 12 is composed. A comb-shaped electrode of the common electrode 27 is comprised of an electrically conductive transparent film of which the data line shield 26 is comprised, on the inorganic passivation film 15.

The contact hole 16 is formed throughout the first interlayer insulating inorganic film 6 and the second interlayer insulating inorganic film 15, and is covered at its inner wall with the first electrically conductive transparent film 19 and the second electrically conductive transparent film 28.

At the gate line terminal, the contact hole 18 is formed throughout the first interlayer insulating inorganic film 6 and the second interlayer insulating inorganic film 15 above the gate terminal electrode 4, and is covered at its inner wall with the first electrically conductive transparent film 19 to thereby define an interlayer contact. In order to prevent metal such as molybdenum from being corroded in atmosphere, the contact hole 18 covered by the first electrically conductive transparent film 19 is filled with an electrically insulating organic film 24 composed of novolak resin, which is covered with a second electrically conductive transparent film 30.

At the data line terminal, the contact hole 17 is formed throughout the inorganic passivation film 15 above the data line terminal electrode 4, and is covered at its inner wall with the first electrically conductive transparent film 19 to thereby define an interlayer contact. In order to prevent metal such as molybdenum from being corroded in atmosphere, the contact hole 17 covered by the first electrically conductive transparent film 19 is filled with an electrically insulating organic film 23 composed of novolak resin, which is covered with a second electrically conductive transparent film 29.

In the above-mentioned second to seventh examples, the first electrically conductive transparent film 19 covering inner walls of the contact holes 16, 17 and 18 is composed of metal which is corroded in atmosphere, such as molybdenum. The first electrically conductive transparent film 19 may be composed of metal such as chromium (Cr) which is less corroded in atmosphere than molybdenum, in which case, the first electrically conductive transparent film 19 could have a function of blocking atmospheric moisture, and hence, have enhanced corrosion-resistance.

As an alternative, the first electrically conductive transparent film 19 may be designed to have a multi-layered structure including a layer composed of metal such as chromium (Cr) which is less corroded in atmosphere than molybdenum, and a layer composed of metal such as indium-tin oxide (ITO) which has high surface-contact characteristic. The first electrically conductive transparent film 19 having such a multi-layered structure could have a function of blocking atmospheric moisture and enhanced corrosion-resistance. In addition, it would be possible to reduce a contact resistance between the first electrically conductive transparent film 19 and the second electrically conductive transparent film 29, and hence, reduce a resistance between a terminal and a line, ensuring qualified images having no cross-talk.

In the above-mentioned second to seventh examples, the data line shield 26 covering the electrically insulating organic film 21 composed of novolak resin is comprised of the first or second electrically conductive transparent film. As an alternative, the data line shield 26 may be designed to have a multi-layered structure including an opaque film composed of, for instance, chromium (Cr), and a transparent film. Such a multi-layered structure can shield a light passing in the vicinity of the electrically insulating organic film when a pixel is in dark (black) display, ensuring that a brightness in dark display can be reduced, and hence, contrast can be enhanced.

ELEVENTH EMBODIMENT

Hereinbelow are explained examples of a TFT substrate as a part of an active matrix type liquid crystal display device including an interlayer insulating film comprised of an electrically insulating organic film composed of novolak resin, and a layer formed below the interlayer insulating film which layer is composed of metal, such as chromium (Cr), having a relatively high resistance and not corroded in atmosphere.

FIRST EXAMPLE

Figure 33:
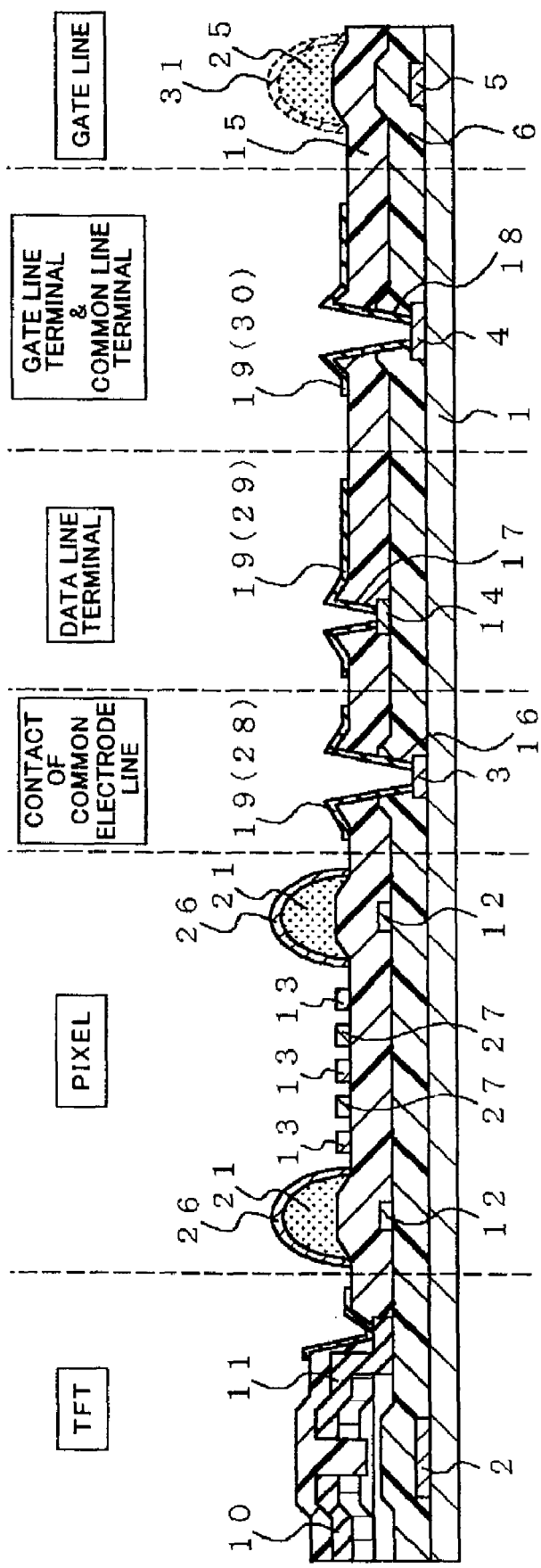
FIG. 33 is a cross-sectional view of a first example of a TFT substrate in an in-plane switching active matrix type liquid crystal display device including a line composed of metal which is not corroded in atmosphere.

FIG. 33 is a cross-sectional view of a first example of a TFT substrate in an in-plane switching active matrix type liquid crystal display device including a line composed of metal which is not corroded in atmosphere.

In the TFT substrate in accordance with the second example, above the data line 12 is formed a first island-shaped electrically insulating organic film 21 composed of novolak resin, which is shielded by the data line shield (electrically conductive transparent film) 26 constituting a common electrode.

A comb-shaped electrode in the common electrode 27 and a comb-shaped electrode in the pixel electrode 13 are comprised of an electrically conductive transparent film.

The common electrode line 3, the data line terminal electrode 14 and the gate terminal electrode 4 exposed through the contact holes 16, 17 and 18, respectively, may be covered with an electrically conductive transparent film, or may be exposed to atmosphere.

In the first example, there are formed electrodes extending from the common electrode line 3, the data line terminal electrode 14 and the gate terminal electrode 4 which electrodes are comprised of the first electrically conductive transparent film 19 or the second electrically conductive transparent film 28, 29 or 30.

SECOND EXAMPLE

Figure 34:
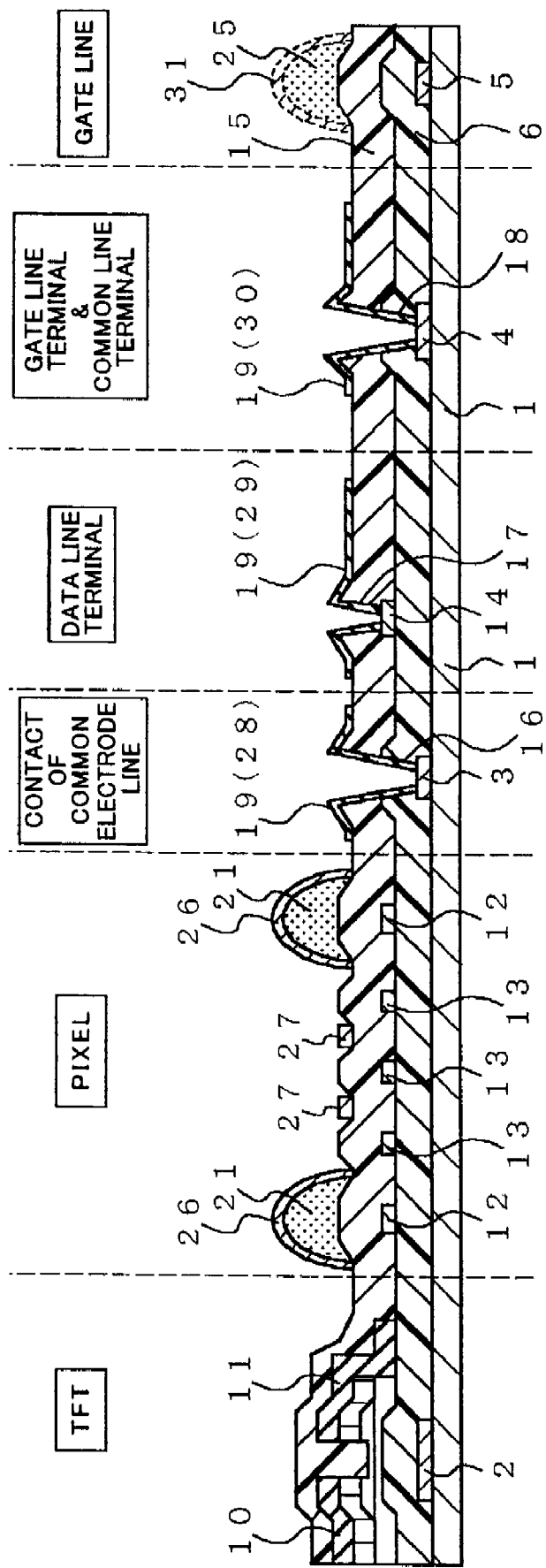
FIG. 34 is a cross-sectional view of a second example of a TFT substrate in an in-plane switching active matrix type liquid crystal display device including a line composed of metal which is not corroded in atmosphere.

FIG. 34 is a cross-sectional view of a second example of a TFT substrate in an in-plane switching active matrix type liquid crystal display device including a line composed of metal which is not corroded in atmosphere.

In the TFT substrate in accordance with the second example, above the data line 12 is formed a first island-shaped electrically insulating organic film 21 composed of novolak resin, which is shielded by the data line shield (electrically conductive transparent film) 26 constituting a common electrode.

A comb-shaped electrode of the pixel electrode 13 is formed in the same layer as the data line 12, and hence, is composed of the same metal as the metal of which the data line 12 is composed. A comb-shaped electrode of the common electrode 27 is comprised of an electrically conductive transparent film of which the data line shield 26 is comprised, on the inorganic passivation film 15.

The common electrode line 3, the data line terminal electrode 14 and the gate terminal electrode 4 exposed through the contact holes 16, 17 and 18, respectively, may be covered with an electrically conductive transparent film, or may be exposed to atmosphere.

In the second example, there are formed electrodes extending from the common electrode line 3, the data line terminal electrode 14 and the gate terminal electrode 4 which electrodes are comprised of the first electrically conductive transparent film 19 or the second electrically conductive transparent film 28, 29 or 30.

In the first to seventh examples in the tenth embodiment and the first and second examples in the eleventh embodiment, the electrically insulating organic film 21 composed of novolak resin is formed only above the data line 12, and is shielded with the data line shield (electrically conductive transparent film) 26 constituting a common electrode. As illustrated in FIG. 34 with a broken line, the electrically insulating organic film 21 may be formed not only above the data line 12, but also above the gate line 5, in which case, the electrically insulating organic film 21 is shielded with the data line shield (electrically conductive transparent film) 26.

As an alternative, the electrically insulating organic film 21 shielded with the data line shield (electrically conductive transparent film) 26 may be formed above a thin film transistor. This ensures that an effective display area in a pixel can be enlarged, and images can be displayed with a high numerical aperture.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

For instance, a terminal electrode composed of corrosive metal may be comprised of two electrically conductive transparent films electrically connected to each other. Such a terminal electrode can be fabricated by carrying out photolithography eight times.

In a terminal, a through-hole reaching metal which is corroded in atmosphere, such as molybdenum (Mo) or copper (Cu), may be covered at its inner wall with a first electrically conductive transparent film, and then, filled with an electrically insulating organic film. Then, the electrically insulating organic film is covered with a second electrically conductive transparent film. Concurrently with formation of the second electrically conductive transparent film, a comb-shaped pixel electrode is formed. This structure can be fabricated by carrying out photolithography seven or six times.

As an alternative, in a terminal exposed to atmosphere, a through-hole reaching metal which is corroded in atmosphere, such as molybdenum (Mo) or copper (Cu), may be covered at its inner wall with a first electrically conductive transparent film, and then, filled with an electrically insulating organic film. In contrast, a through-hole in a pixel, not exposed to atmosphere, is not filled with an electrically insulating organic film, but is covered with a second electrically conductive transparent film. Concurrently with formation of the second electrically conductive transparent film, a comb-shaped pixel electrode is formed. This structure can be fabricated by carrying out photolithography seven or six times.

As an alternative, in a terminal exposed to atmosphere, a through-hole reaching metal which is corroded in atmosphere, such as molybdenum (Mo) or copper (Cu), may be covered at its inner wall with a first electrically conductive transparent film, and then, the first electrically conductive transparent film is covered with a second electrically conductive transparent film. Such a two-layered structure can block corrosive metal from atmospheric moisture. Concurrently with formation of the second electrically conductive transparent film, a comb-shaped pixel electrode is formed. This structure can be fabricated by carrying out photolithography seven or six times.

The data line 12 may be designed to have a multi-layered structure comprised of an inorganic layer and an organic layer, in which case, the multi-layered structure is covered with an electrically insulating film. The common electrode is formed above the data line 12 so as to overlap the data line 12. An electrically insulating organic film composed mainly of novolak resin or analogous material is formed above the data line 12, above the data line 12 and the gate line 5, or in the vicinity of the data line 12 and the gate line 5. The common electrode may be formed so as to overlap the gate line 5 as well as the data line 12.

As an alternative, the electrically insulating organic film may be formed so as to overlap the data line 12 or both of the data line 12 and the gate line 5, and the comb-shaped common and pixel electrodes may be formed commonly in an uppermost layer.

As an alternative, the electrically insulating organic film may be formed so as to overlap the data line 12 or both of the data line 12 and the gate line 5, and the comb-shaped common and pixel electrodes may be formed to sandwich an electrically insulating inorganic film therebetween. The electrically insulating inorganic film has such a thickness that common and pixel electrodes are not short-circuited with each other, and an appropriate electric field is applied to the liquid crystal 220. Specifically, it is preferable for the electrically insulating inorganic film to have a thickness in the range of 100 to 600 nanometers both inclusive.

As an alternative, the electrically insulating organic film may be formed so as to overlap the data line 12 or both of the data line 12 and the gate line 5, in which case, it is preferable that the electrically insulating organic film may extend beyond the data line 12 or the gate line 5 by 0.5 to 4.0 micrometers, and the gate line shield may extend beyond the electrically insulating organic film by 0.5 to 6.0 micrometers.

An area in which the data line 12 and the gate line 5 intersect with each other may be covered with an electrically insulating film having a multi-layered structure comprised of an inorganic film and an organic film. This structure prevents chemicals from penetrating the area, protecting the data line 12 from breakage caused by chemicals.

As an alternative, the data line 12 may be covered with an electrically insulating film having a multi-layered structure comprised of an inorganic film and an organic film, and may be shielded with a common electrode except an area in which the data line 12 and the gate line 4 intersect with each other. This ensures reduction in a capacity formed between the data line 12 and the common electrode shield As an alternative, the data line 12 and the gate line 4 may be covered with an electrically insulating film having a multi-layered structure comprised of an inorganic film and an organic film, and may be shielded with a common electrode except an area in which the data line 12 and the gate line 4 intersect with each other. This ensures reduction in both a capacity formed between the data line 12 and the common electrode shield and a capacity formed between the gate line 5 and the common electrode shield.

By baking the electrically insulating organic film composed of novolak resin, at 200 to 270 degrees centigrade both inclusive for 30 to 120 minutes, the electrically insulating organic film could have enhanced resistant to alkali chemicals, organic solvent and acid chemicals such as ITO etchant, and would be stabilized in subsequent steps. For instance, in a photolithography carried out, after formation of the electrically insulating organic film composed of novolak resin, for forming a common electrode, the electrically insulating organic film would not be damaged. In a heating step carried out after formation of the electrically insulating organic film composed of novolak resin, for instance, in a step for baking an alignment film, it would be possible to prevent the novolak resin from being decomposed to thereby generate gas. Hence, it is possible to avoid impurity from being absorbed into a liquid crystal panel. It is more preferable to bake the electrically insulating organic film at 235 to 255 degrees centigrade both inclusive.

If a contact hole is formed throughout an electrically insulating inorganic film after formation of an electrically insulating organic film, when a resist pattern used for forming the contact hole is peeled off, the electrically insulating organic film may be exposed to resist-peeling solution, and hence, degraded. However, since a contact hole in the present invention is formed throughout an electrically insulating inorganic film before formation of an electrically insulating organic film, the electrically insulating organic film is not exposed to resist-peeling solution, ensuring maintaining a shape of the electrically insulating organic film.

By annealing the electrically insulating organic film composed of novolak resin, at about 100 to about 150 degrees centigrade for 30 seconds to 15 minutes before baking, but after development of the same, the electrically insulating organic film would have a reverse-U-shaped cross-section above the data line 12 and the gate line 5. This ensures that a shape of the electrically insulating organic film exerts less influence on liquid crystal alignment in a rubbing step, and hence, more uniform homogeneous alignment can be obtained.

As an alternative, the electrically insulating organic film may be baked at a temperature-increasing rate of 5 to 15 degrees centigrade per a minute without being annealing before being baked. As a result, the electrically insulating organic film would have a reverse-U-shaped cross-section above the data line 12 and the gate line 5. This ensures that a shape of the electrically insulating organic film exerts less influence on liquid crystal alignment in a rubbing step, and hence, more uniform homogeneous alignment can be obtained.

As an alternative, the electrically insulating organic film may be kept heated at a fixed temperature in the range of 100 to 150 degrees centigrade in a certain period of time while being baked, to thereby melt the electrically insulating organic film, in which case, the electrically insulating organic film is not annealed before being baked. Thereafter, the electrically insulating organic film is heated and baked at 200 degrees centigrade or higher. For instance, the electrically insulating organic film is baked at 200 to 270 degrees centigrade for 30 to 120 minutes. As a result, the electrically insulating organic film would have a reverse-U-shaped cross-section above the data line 12 and the gate line 5. This ensures that a shape of the electrically insulating organic film exerts less influence on liquid crystal alignment in a rubbing step, and hence, more uniform homogeneous alignment can be obtained.

The step of annealing TFT to be carried out after the formation of the passivation (SiNx) film 15 may be omitted, in which case, the step of baking the electrically insulating organic film composed of novolak resin acts also as the step of annealing TFT. This shortens steps to be carried out after the annealing step.

The entire disclosure of Japanese Patent Applications Nos. 2003-76169 and 2004-70110 filed on Mar. 19, 2003 and Mar.

12, 2004, respectively, including specification, claims, drawings and summary is incorporated herein by reference in its entirety.

What is claimed is:

1. A method of fabricating a liquid crystal display device comprising a first substrate, a second substrate, and liquid crystal sandwiched between said first and second substrates, said first substrate comprising a gate line, a data line intersecting with said gate line, a pixel electrode, a common electrode extending in parallel with said pixel electrode, and a plurality of thin film transistors located at intersections of said gate line and said data line, said pixel electrode being fabricated concurrently with a source electrode of each of said thin film transistors, said method comprising:

forming said common electrode so as to be closer to said liquid crystal than said data line, to overlap said data line, and to have a shield common electrode which covers a first island-shaped electrically insulating organic film formed on an electrically insulating inorganic film formed above said data line, wherein said first island-shaped electrically insulating organic film is formed so as not to cover a pixel area therewith, and wherein said first island-shaped electrically insulating organic film comprises novolak resin.

2. The method as set forth in claim 1, wherein said first island-shaped electrically insulating organic film is covered at its surface facing said liquid crystal with said shield common electrode.

3. The method as set forth in claim 2, and further comprising baking said first island-shaped electrically insulating organic film at a temperature in the range of 200 to 270 degrees centigrade both inclusive for 30 to 120 minutes both inclusive.

4. The method as set forth in claim 3, further comprising thermally annealing said first island-shaped electrically insulating organic film at a temperature in the range of 100 to 150 degrees centigrade both inclusive for 30 seconds to 15 minutes both inclusive before said first island-shaped electrically insulating organic film is baked.

5. The method as set forth in claim 3, wherein said first island-shaped electrically insulating organic film is baked at a temperature-raising rate of 5 to 15 degrees per a minute both inclusive.

6. The method as set forth in claim 3, wherein said first island-shaped electrically insulating organic film is heated at a fixed temperature in the range of 100 to 150 degrees centigrade both inclusive for a certain period of time before said first island-shaped electrically insulating organic film is baked at a temperature in the range of 200 to 270 degrees centigrade both inclusive.

7. The method of fabricating a liquid crystal display device as set forth in claim 1, wherein said pixel electrode extends in parallel with said common electrode, wherein each of said pixel electrode, said data line, said first island-shaped electrically insulating organic film, and said common electrode are comprised of a zigzag-shaped electrode, wherein said zigzag-shaped electrodes extend in parallel with each other.

* * * * *